(12) United States Patent
Shimamori

(10) Patent No.: US 6,177,786 B1
(45) Date of Patent: Jan. 23, 2001

(54) POWER SUPPLY APPARATUS AND METHOD OF CONTROLLING POWER SUPPLY CIRCUIT

(75) Inventor: Hiroshi Shimamori, Kanagawa (JP)

(73) Assignee: Fujitsu Limited, Kawasaki (JP)

( * ) Notice: Under 35 U.S.C. 154(b), the term of this patent shall be extended for 0 days.

(21) Appl. No.: 09/266,874

(22) Filed: Mar. 12, 1999

(30) Foreign Application Priority Data

Mar. 31, 1998 (JP) .................................................. 10-086314

(51) Int. Cl.$^7$ ....................................................... G05F 1/40
(52) U.S. Cl. ............................................................ 323/283
(58) Field of Search .................................. 363/20, 21, 97, 363/131; 323/222, 282, 283, 285, 286

(56) References Cited

U.S. PATENT DOCUMENTS

| 5,349,523 | * | 9/1994 | Inou et al. ............................. 363/97 |
| 5,475,296 | * | 12/1995 | Vinsant et al. ........................ 323/223 |
| 5,594,324 | * | 1/1997 | Canter et al. .......................... 323/282 |
| 5,675,240 | * | 10/1997 | Fujisawa et al. ..................... 323/282 |
| 5,801,935 | * | 9/1998 | Sugden et al. ......................... 363/89 |

FOREIGN PATENT DOCUMENTS

| 60-178076 | 9/1985 | (JP) . |
| 2-55573 | 2/1990 | (JP) . |
| 4-275063 | 9/1992 | (JP) . |
| 7-143741 | 6/1995 | (JP) . |

* cited by examiner

Primary Examiner—Matthew Nguyen
(74) Attorney, Agent, or Firm—Armstrong, Westerman, Hattori, McLeland & Naughton

(57) ABSTRACT

The DC output of a power conversion unit is controlled based on a pulse signal generated by a PWM unit. An operations unit detects an output current Iout, and determines the operation mode of a load based on the detected current value. When the output current Iout is weak, a value smaller than usual is written to a cycle register. The PWM unit generates a pulse signal according to the data stored in the cycle register and an on-time register.

19 Claims, 42 Drawing Sheets

| INPUT VOLTAGE | FACTOR A | FACTOR B | FACTOR C |
|---|---|---|---|
| 0 V | $A_0$ | $B_0$ | $C_0$ |
| 1 | $A_1$ | $B_1$ | $C_1$ |
| 2 | $A_2$ | $B_2$ | $C_2$ |
| 3 | $A_3$ | $B_3$ | $C_3$ |
| ⋮ | ⋮ | ⋮ | ⋮ |

FIG. 13

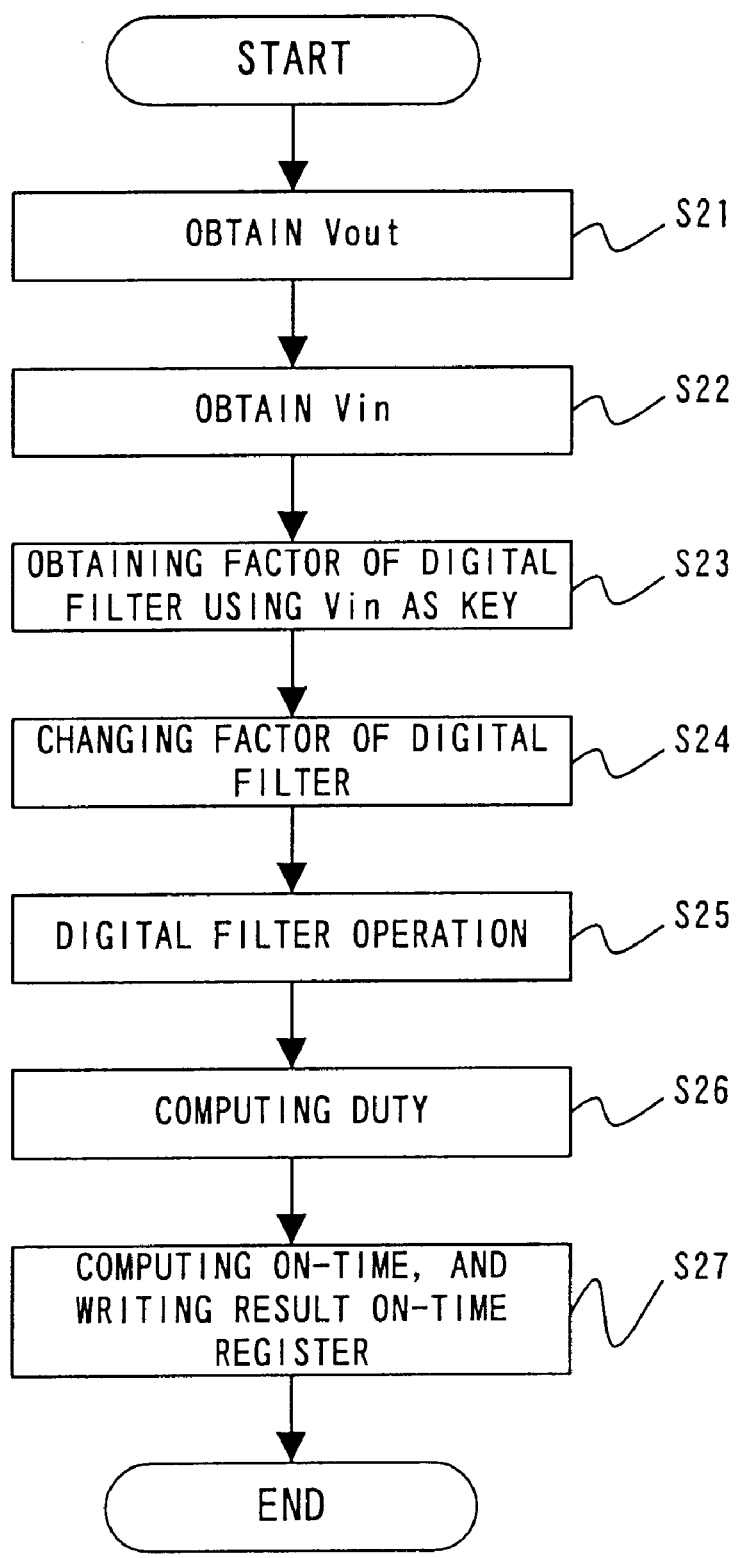
F I G. 1 4

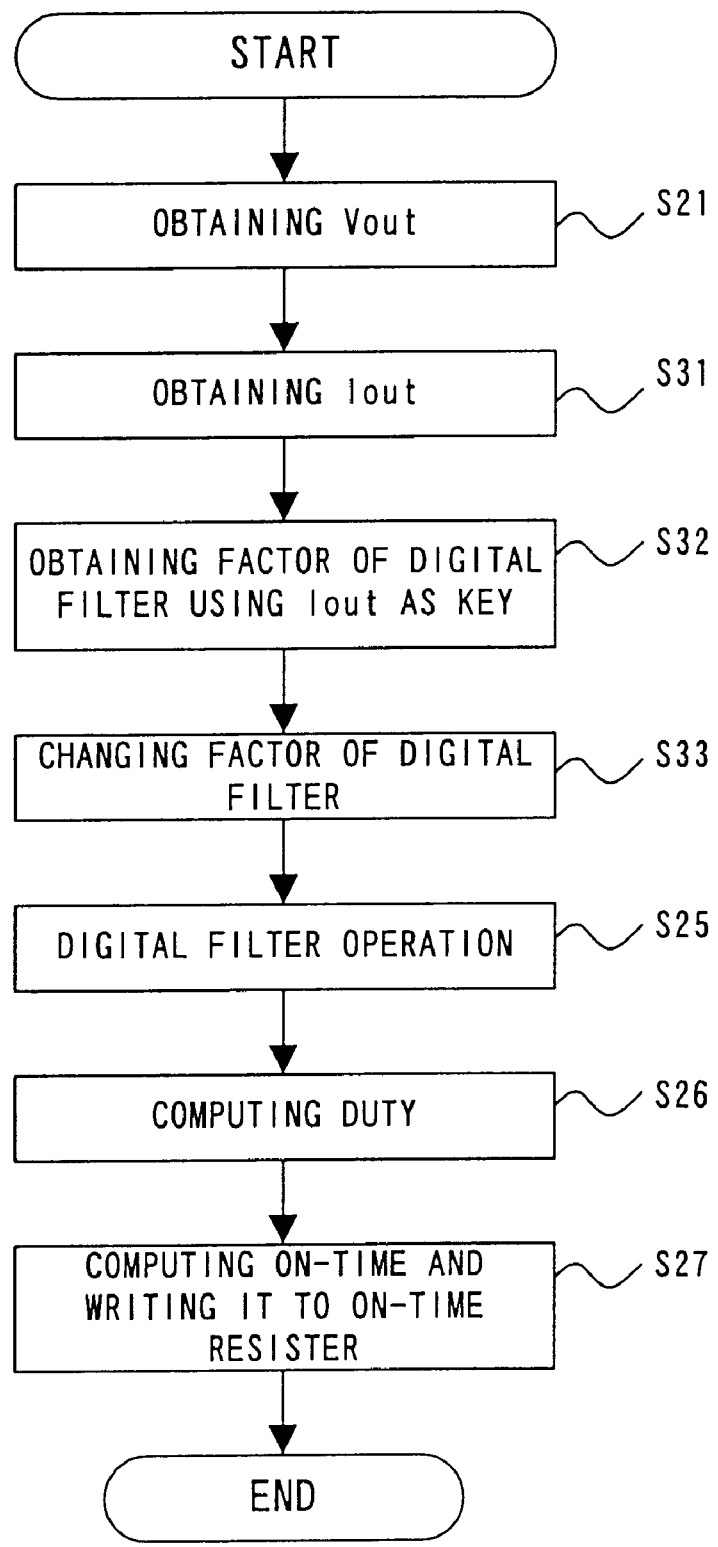
F I G. 1 7

| TIME | COMPUTED ON-TIME (RESULT OF DIGITAL FILTER OPERATION) | BAROMETER VALUE (CARRY-OVER VALUE) | ON-TIME CORRECTION VALUE | ON-TIME TO BE OUTPUT |
|---|---|---|---|---|
| ... | ... | ... | ... | ... |
| $T_0$ | ... | -0.07 | ... | ... |
| $T_1$ | 3.35 μs | -0.02 | 3.28 | 3.3 |
| $T_2$ | 3.35 | -0.07 | 3.33 | 3.4 |
| $T_3$ | 3.35 | -0.02 | 3.28 | 3.3 |
| $T_4$ | 3.35 | -0.07 | 3.33 | 3.4 |
| $T_5$ | 3.35 | -0.02 | 3.28 | 3.3 |
| ... | ... | ... | ... | ... |

FIG. 21

| TIME | COMPUTED ON-TIME (RESULT OF DIGITAL FILTER OPERATION) | BAROMETER VALUE (CARRY-OVER VALUE) | ON-TIME CORRECTION VALUE | ON-TIME TO BE OUTPUT |
|---|---|---|---|---|
| | . . . | . . . | . . . | . . . |
| $T_0$ | . . . | +0.03 | . . . | . . . |
| $T_1$ | 3.35 μs | +0.08 | 3.38 | 3.3 |
| $T_2$ | 3.35 | +0.03 | 3.43 | 3.4 |
| $T_3$ | 3.35 | +0.08 | 3.38 | 3.3 |
| $T_4$ | 3.35 | +0.03 | 3.43 | 3.4 |
| $T_5$ | 3.35 | +0.08 | 3.38 | 3.3 |
| | . . . | . . . | . . . | . . . |

FIG. 22

| TIME | COMPUTED ON-TIME (RESULT OF DIGITAL FILTER OPERATION) | BAROMETER VALUE (CARRY-OVER VALUE) | ON-TIME CORRECTION VALUE | ON-TIME TO BE OUTPUT |
|---|---|---|---|---|
| | . . . | . . . | . . . | . . . |
| $T_0$ | . . . | +0.03 | . . . | . . . |
| $T_1$ | 3.35 μs | −0.02 | 3.38 | 3.4 |
| $T_2$ | 3.35 | +0.03 | 3.33 | 3.3 |
| $T_3$ | 3.35 | −0.02 | 3.38 | 3.4 |
| $T_4$ | 3.35 | +0.03 | 3.33 | 3.3 |
| $T_5$ | 3.35 | −0.02 | 3.38 | 3.4 |
| | . . . | . . . | . . . | . . . |

FIG. 23

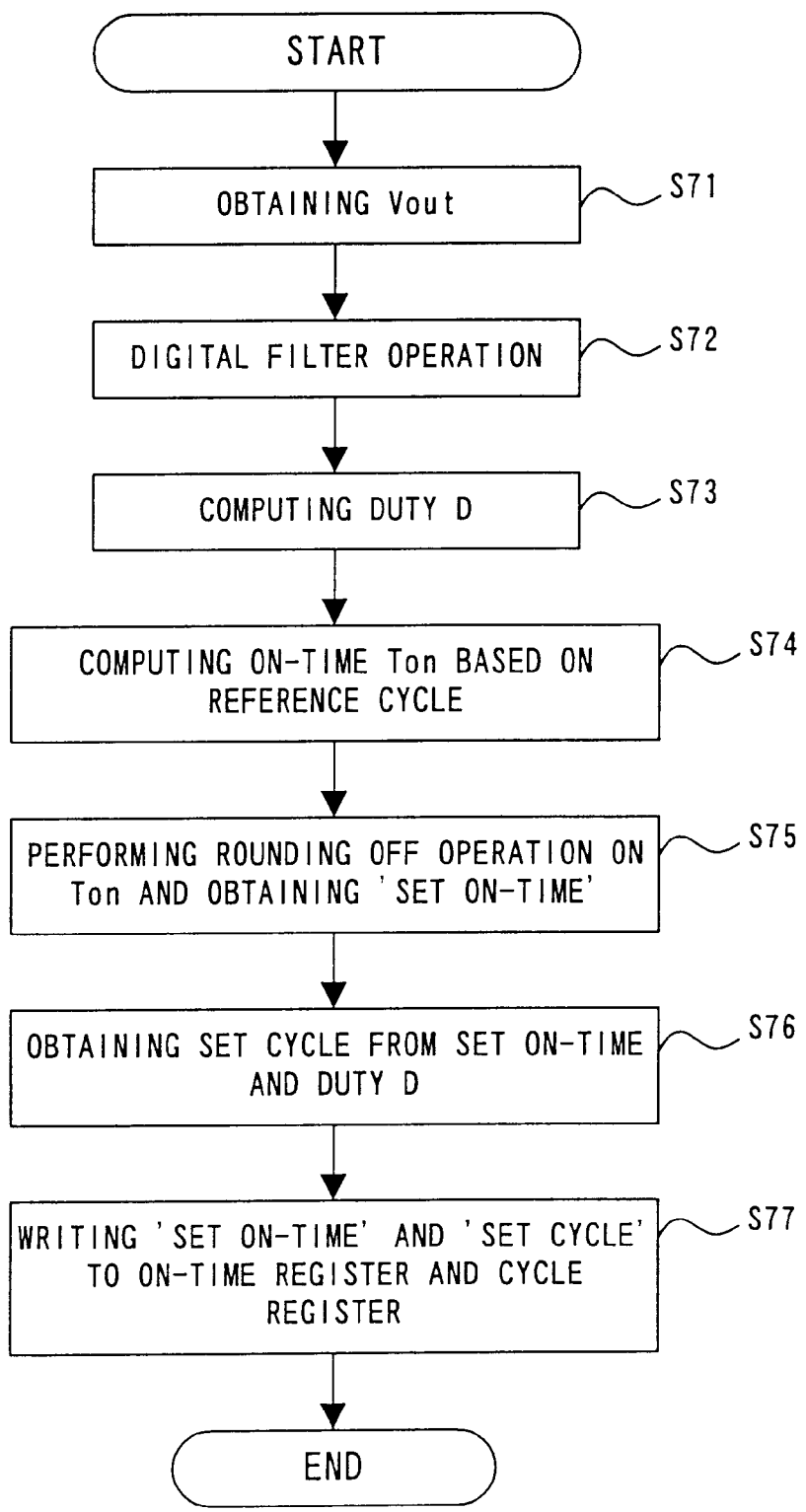
F I G. 2 7

<NORMAL MODE PROGRAM>

$Y_{(n)} = A_1 \cdot X_{(n)} + B_1 \cdot X_{(n-1)} + C_1 \cdot Y_{(n-1)}$

SAMPLING CYCLE = $T_{S1}$

POLLING CYCLE = $T_{P1}$

.
.
.

<SUSPEND MODE PROGRAM>

$Y_{(n)} = A_2 \cdot X_{(n)} + B_2 \cdot X_{(n-1)} + C_2 \cdot Y_{(n-1)}$

SAMPLING CYCLE = $T_{S2}$

POLLING CYCLE = $T_{P2}$

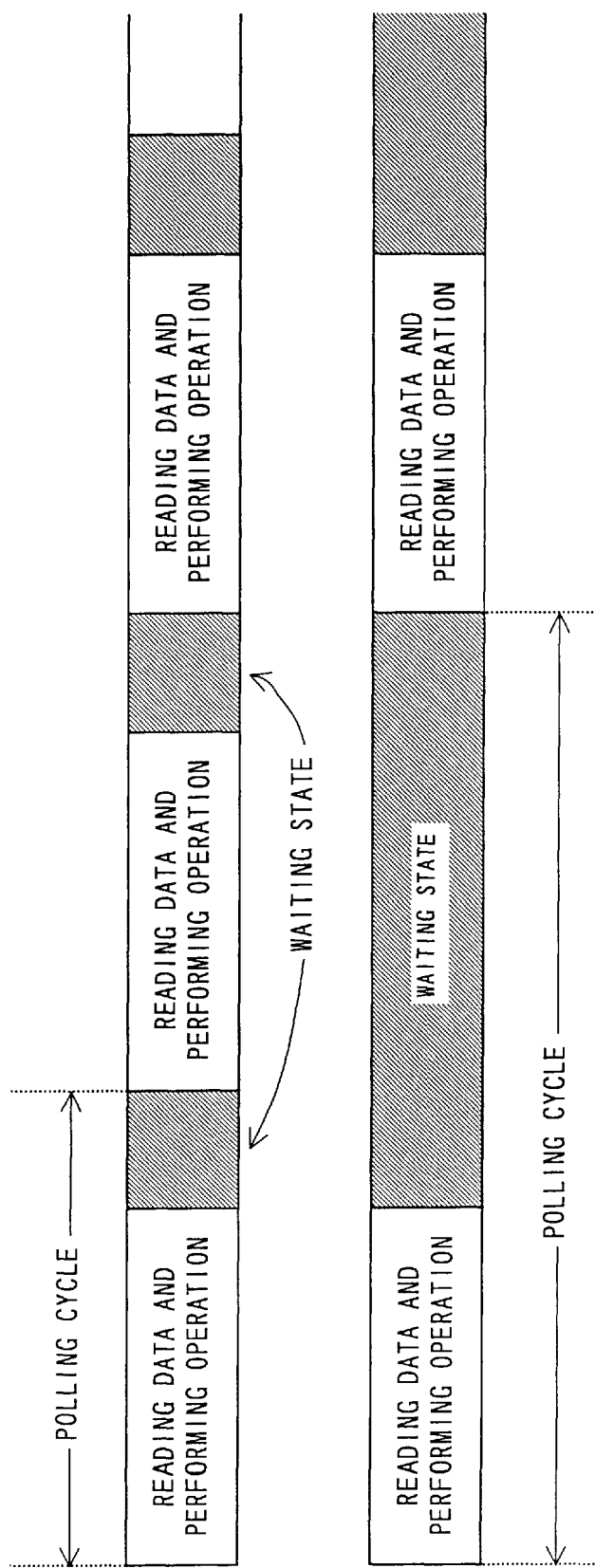
F I G. 32

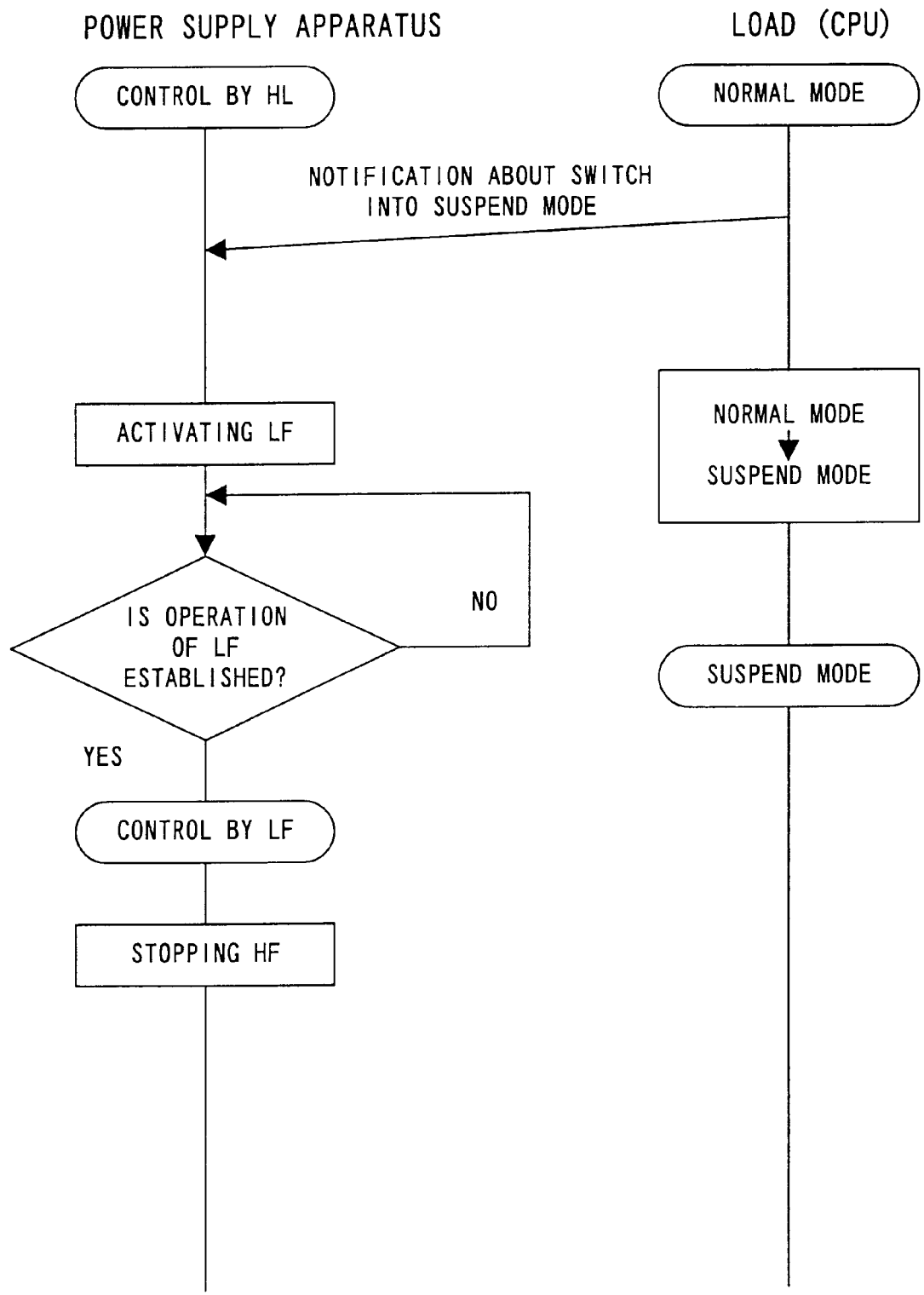
F I G. 3 3

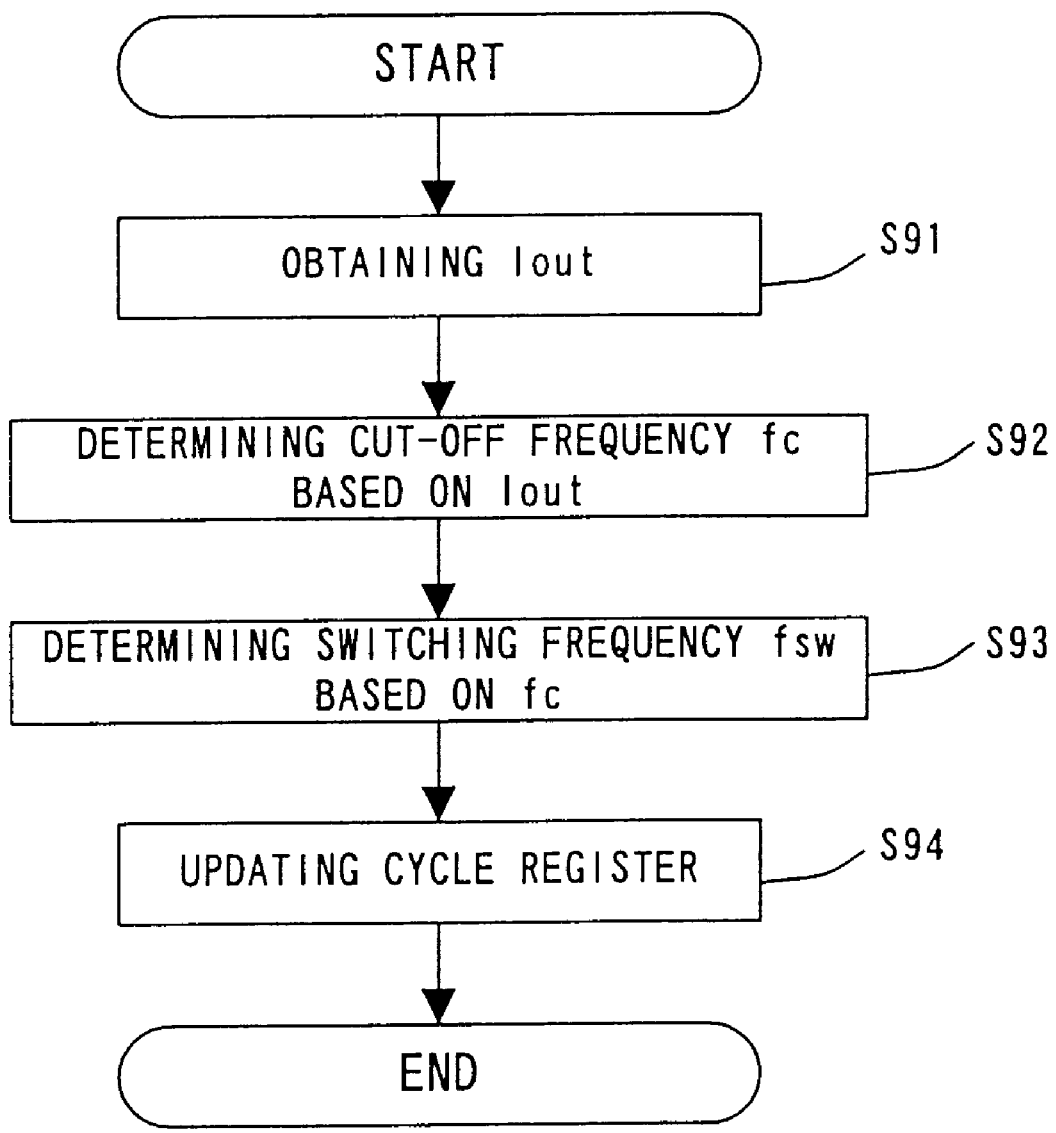
F I G. 3 7

POWER SUPPLY APPARATUS AND METHOD OF CONTROLLING POWER SUPPLY CIRCUIT

BACKGROUND OF THE INVENTION

1. Field of the Invention

The present invention relates to a power supply apparatus provided with a power supply circuit for generating a DC output.

2. Description of the Related Art

A power supply apparatus such as an AC/DC converter, a DC/DC converter, a charger, etc. is popular in various fields. Generally, a power supply apparatus should be small in loss. Particularly, it is very important to reduce loss in a power supply apparatus used in a portable personal computer, a terminal unit in a mobile communications device, etc.

FIG. 1 shows the configuration of the charger or the DC power supply provided in the conventional power supply apparatus. The charger and the DC power supply have the same basic configurations, and each includes an electric power converter 510 and an analog circuit unit 520. In this example, the DC power supply is a DC/DC converter.

The electric power converter 510 includes a switching element (MOSFET) controlled according to the instruction from the PWM control circuit 524; a rectifying diode; an inductor for storing/discharging energy; a resistor for detecting an inductor current or an output current; and an output capacitor for smoothing an output. While the switching element is in the ON state, the inductor current ramps up with the electric current provided for the load, thereby storing residual charge in the output capacitor. While the switching element is in the OFF state, the inductor current ramps down and the electric charge stored in the output capacitor is discharged as necessary with the electric current provided for the load.

The analog circuit unit 520 includes an amplifier 521 for amplifying an inductor current; an amplifier 522 for amplifying the difference between the output from the amplifier 521 and a reference voltage Vref1; an amplifier 523 for amplifying the difference between the output voltage and a reference voltage Vref2; a PWM control circuit 524 for generating a PWM signal for controlling the switching element based on the output from these amplifiers, etc.; and an oscillator 525 for providing a clock at a predetermined frequency for the PWM control circuit 524.

When the output voltage drops below the reference voltage Vref2, the PWM control circuit 524 makes the duty (duty cycle) of the PWM signal to be provided for the switching element higher so that the inductor current can be increased and the output voltage will increase. On the other hand, when the output voltage becomes higher than the reference voltage Vref2, the PWM control circuit 524 makes the duty of the PWM signal lower so that the inductor current can be reduced and the output voltage will drop. Thus, the output voltage can be maintained at a constant level. When the PWM control circuit 524 detects an overcurrent based on the output from the amplifier 522, it reduces the duty of the PWM signal or forcibly turns off the switching element.

Thus, an analog circuit has been used to control the output from a charger provided in the conventional power supply apparatus, or each DC power supply.

As described above, an analog circuit has been used to control the output from the conventional power supply apparatus. Therefore, the characteristics or specification of a power supply circuit cannot be easily changed. If they can be changed, a number of circuits have to be added for amendments. Considering a smaller or a lower cost power supply apparatus, the conventional technology has been impractical and unrealistic. Described below are some of the problems with the conventional power supply apparatus.

(1) Precision in Output Voltage

To control and maintain the output voltage of a power supply circuit, the output voltage is normally used as a feedback signal. However, a transfer function for a feedback system changes with external factors (input voltage, output current, temperature, etc.). Therefore, if such factors are not taken into account, oscillation may occur in the feedback system.

Therefore, in the conventional power supply apparatus, an amplifier for the feedback system is designed for the worst possible case in order to avoid the above described oscillation. However, this design reduces a gain in the normal operation, thereby lowering the precision in control of an output voltage. This problem is due to the characteristic of an amplifier, which cannot be flexibly changed depending on various factor such as input voltage, output current, and temperature, in the conventional analog circuit.

(2) Error in Digitalizing Data

In newly developed technology, the functions of a conventional analog circuit can be replaced with digital control. For example, a power supply apparatus has been designed such that an output voltage as a feedback signal is converted into digital data from which numeral data for control of a switching element is generated, and then, the switching element is controlled according to the numeral data. However, under the control, an unavoidable digital error (quantization error) occurs. The error may cause a ripple in an output voltage.

To reduce the above described error, the quantization step should be reduced. However, reducing the quantization step raises the cost and increases the electric power consumption in the power supply apparatus.

(3) Power Consumption

When an electric current required by a load is small, for example, in the suspense mode of a personal computer, etc., it is particularly important to reduce the power consumption of a power supply apparatus itself. This technology has long been studied, but has not been satisfactorily developed, and therefore should be improved.

SUMMARY OF THE INVENTION

The present invention aims at providing a power supply apparatus for flexibly changing its characteristic or specification. It also aims at improving the precision in output voltage. The present invention further aims at realizing smaller power consumption.

The power supply apparatus according to the present invention includes a power supply circuit for generating DC output according to a given pulse signal; a conversion unit for converting a parameter relating to the output of the power supply circuit into digital data; an amplification unit for amplifying the difference between the digital data obtained from the conversion unit and a reference value; an adjustment unit for adjusting the characteristic of the amplification unit based on the input voltage of the power supply circuit; and a generation unit for generating a pulse signal applied to the power supply circuit according to the amplification unit. The characteristic of the amplification unit can be adjusted by an output current or the temperature around the power supply apparatus in addition to the input voltage.

With the above described configuration, even if various parameters relating to the operation of the power supply apparatus or the vicinal environment are changed, the precision in voltage control can be improved because the gain and the phase of the power supply apparatus can be optimized according to the changes.

The power supply apparatus, according to another aspect of the present invention, is based on the configuration including a power supply circuit in which DC output is controlled by the PWM system. The power supply apparatus includes a computation unit for computing the pulse width of a pulse signal to be provided for the power supply circuit based on a parameter relating to output of the power supply circuit; a correction unit for correcting the pulse width data computed by the computation unit according to a stored carry-over value; a conversion unit for converting the pulse width data corrected by the correction unit into pulse width data that is a predetermined number of digits in length; a generation unit for generating a pulse signal according to the pulse width data converted by the conversion unit, and providing it for the power supply circuit; and a storage unit for storing the difference between the pulse width data corrected by the correction unit and the pulse width data converted by the conversion unit as a carry-over value. The conversion unit performs operations such as rounding up, rounding down, rounding off, etc.

With the above described configuration, the carry-over value indicates a digital error (quantization error). The digital error is averaged by the correction unit. Therefore, the ripple of the output voltage can be reduced.

The power supply apparatus according to a further aspect of the present invention includes a power supply circuit for generating DC output according to a given pulse signal; a detection unit for detecting the operating state of the load connected to the power supply circuit; a sampling unit for sampling a parameter for use in controlling the output of the power supply circuit; a conversion unit for converting the parameter sampled by the sampling unit; an amplification unit for amplifying the difference between the digital data obtained from the conversion unit and the reference value; a characteristic adjustment unit for adjusting the characteristic of the amplification unit according to the detection result from the detection unit; and a generation unit for generating a pulse signal to be provided for the power supply circuit based on the output from the amplification unit.

With the above described configuration, since the switching frequency changes with the operating state of a load, the switching loss can be reduced, particularly if the output current is small.

BRIEF DESCRIPTION OF THE DRAWINGS

FIG. 13 shows an example of the table indicating the correspondence between an input voltage and the factor of a digital filter;

FIG. 14 is a flowchart of the process of controlling the output voltage while changing the characteristic of an amplifier based on the input voltage;

FIG. 17 is a flowchart of the process of controlling an output voltage while changing the characteristic of the amplifier depending on an output current;

FIG. 21 shows an example (of performing a rounding up operation) of the process of averaging a digital error;

FIG. 22 shows an example (of performing a rounding down operation) of the process of averaging a digital error;

FIG. 23 shows an example (of performing a rounding off operation) of the process of averaging a digital error;

FIG. 27 is a flowchart of the process of suppressing the digital error while changing the pulse cycle;

FIG. 29 shows a part of a program executed by the processor;

FIG. 32 shows the effect obtained by lowering the polling frequency;

FIG. 33 shows the sequence (1) of the process of switching the operation according to a notice from the load;

FIG. 37 is a flowchart of the process of changing the switching frequency depending on an output current;

DESCRIPTION OF THE PREFERRED EMBODIMENTS

The power supply apparatus according to the present embodiment is provided in a device such as a personal computer, etc., and comprises a charger for charging a battery provided in the device; and a plurality of DC power supplies each generating a plurality of DC voltages used in the device. The charger and DC power supplies can be generally referred to as a power supply circuit.

Each power supply circuit maintains each output voltage at a constant level by PWM (pulse width modulation). With PWM control of the output voltage, the duty (duty cycle) of the pulse provided for the power supply circuit is normally modified based on the difference between the output voltage of the power supply circuit and the reference voltage. The power supply circuit adjusts the output voltage according to the pulse signal. That is, the feedback control is performed. According to the present embodiment, the processor in the power supply apparatus performs feedback control.

Figure 2:
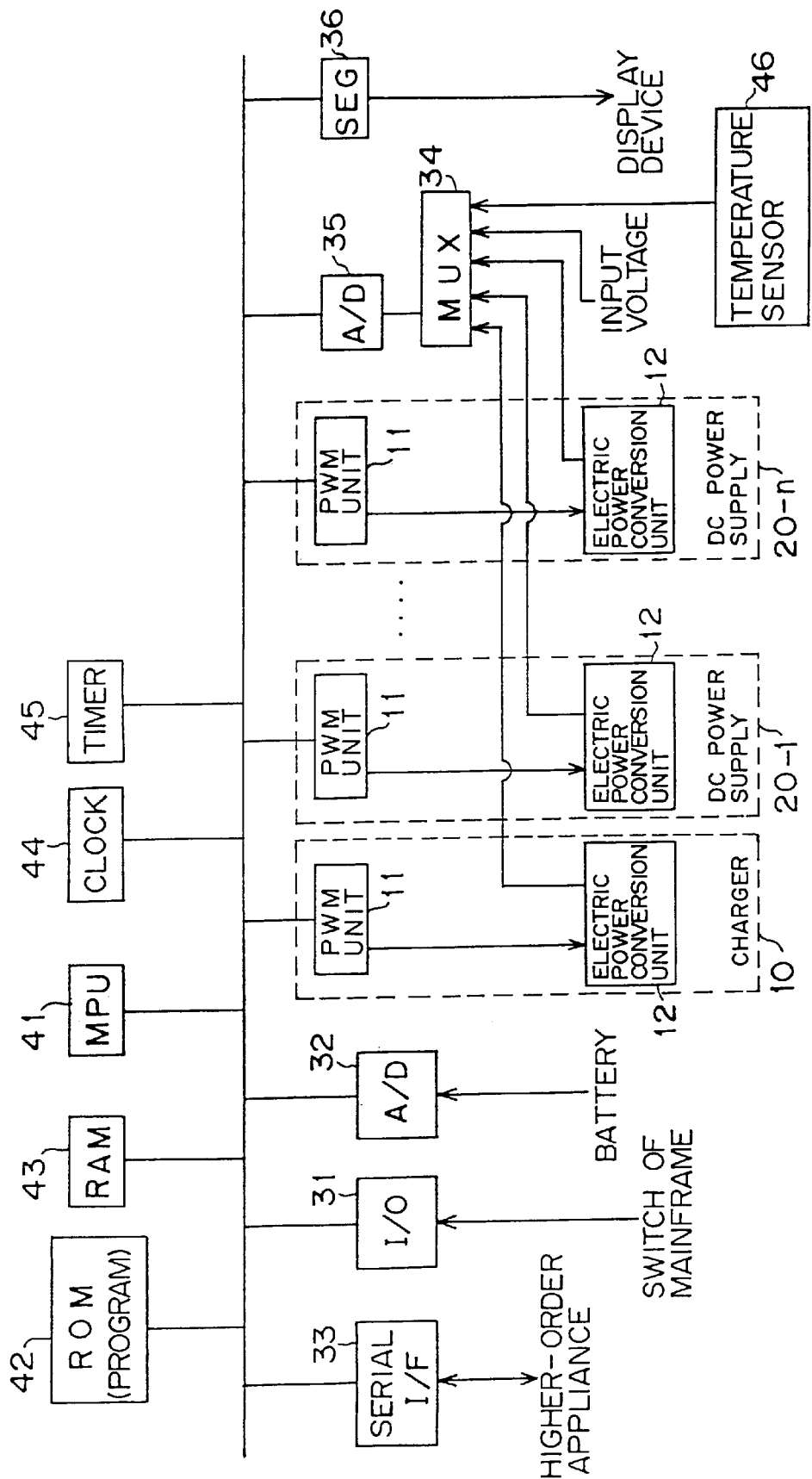
FIG. 2 shows the configuration of the power supply apparatus according to the present embodiment.

FIG. 2 shows the configuration of the power supply apparatus according to the present embodiment. A charger 10 charges a battery (not shown in FIG. 3) provided in the mainframe (personal computer, etc.) comprising the power supply apparatus. DC power supplies 20-1 through 20-n generate respective DC voltages and each provides the generated DC voltage for a load. The charger 10 and the DC power supplies 20-1 through 20-n have the same basic configurations, and comprise a PWM unit 11 and an electric power conversion unit 12.

An I/O unit 31 receives an ON/OFF signal from a switch in the mainframe comprising the power supply apparatus, and notifies a processor (MPU) 41 of the signal. An A/D conversion unit 32 converts the information (for example, the remainder in the battery) relating to the battery charged by the charger 10 into digital data, and transmits it to the processor 41. A serial I/F unit 33 controls the transmission and reception of the information between the processor 41 and a higher-order appliance. A higher-order appliance refers to, for example, the CPU (main processor) in the mainframe comprising the power supply apparatus. In this example, the higher-order appliance transmits a signal indicating the reduction of an output voltage to the power supply apparatus when the operation mode is switched from the normal mode to the resume mode.

A multiplexing unit (MUX) 34 receives a parameter relating to the output from the electric power conversion unit 12 in each power supply circuit (the charger 10 and the DC power supplies 20-1 through 20-n), an input voltage provided to each power supply circuit, and an output signal from the temperature sensor 46, and selects and outputs a designated signal according to the instruction from the processor 41. A parameter relating to the output from the electric power conversion unit 12 is, for example, an output voltage, an output current, etc. from each power supply circuit. An A/D conversion unit 35 converts an output from the multiplexing unit 34 into digital data. The digital data converted by the A/D conversion unit 35 is read by the processor 41. A segment controller (SEG) 36 outputs a signal for display the amount of power remaining in the battery, etc. on the display device not shown in FIG. 2.

The processor 41 executes the program stored in ROM 42 using RAM 43. In the program executed by the processor 41, the procedure of the process for controlling the operation of the power supply apparatus according to the digital data from the I/O unit 31, the A/D conversion unit 32, the serial I/F unit 33, and the A/D conversion unit 35 is described. The program is stored in the ROM area in FIG. 2, and can be designed to be rewritten. Additionally, a DSP (digital signal processor) can be used as the processor 41.

With the above described configuration, the processor 41 performs the sequence control for determining the powering order and disconnecting order of a plurality of power supply circuits, the battery management for monitoring the amount of power remaining in a battery, the state monitor/display of each power supply circuit, etc., and controls the output voltage of the power supply circuit so that the output voltage can be maintained at a predetermined level. The power supply apparatus further comprises a clock generation unit 44 for generating a clock signal, a timer 45, and a temperature sensor 46 for detecting the temperature around the power supply apparatus.

Figure 1:
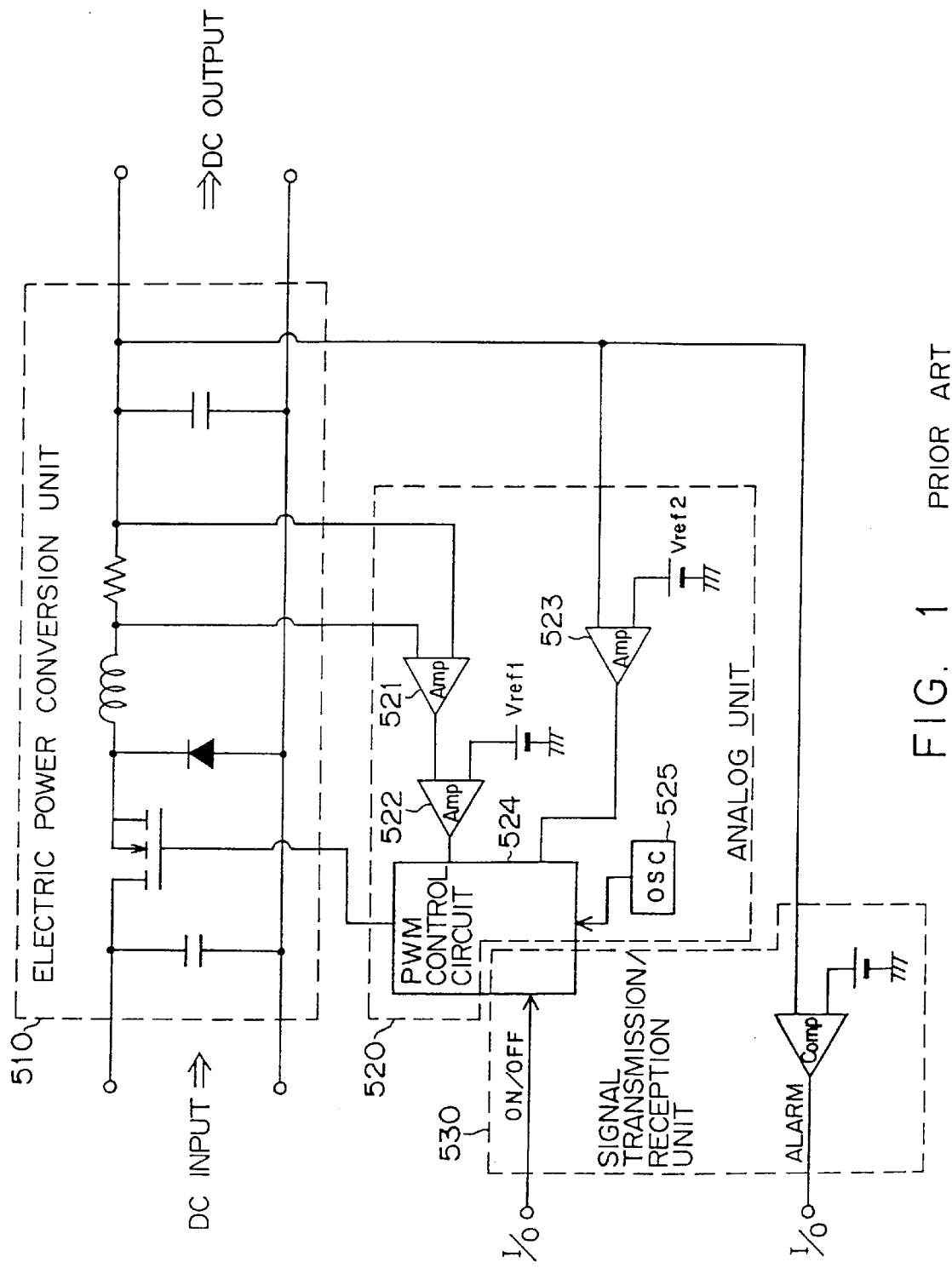
FIG. 1 shows the configuration of the charger or a DC power supply provided in the conventional power supply apparatus.
Figure 3:
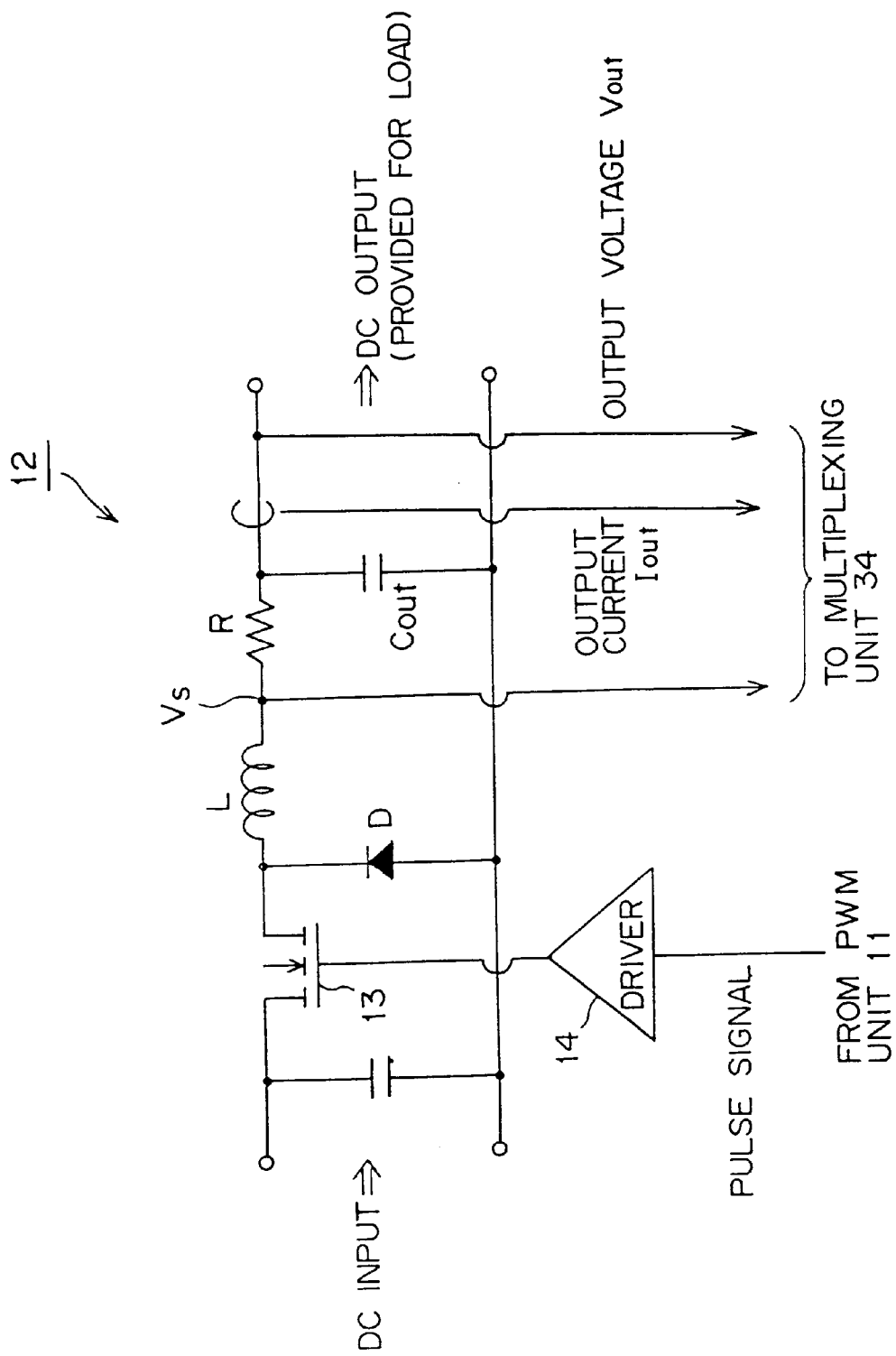
FIG. 3 shows the configuration of the electric power conversion unit.

FIG. 3 shows the configuration of the electric power conversion unit 12. The electric power conversion unit 12 is basically the same as the conventional electric power conversion unit shown in FIG. 1. That is, the electric power conversion unit 12 comprises a switching element 13 (MOSFET in FIG. 3) controlled according to an instruction from the PWM unit 11, a rectifying diode D, an inductor L for storing/discharging energy, a resistor R for detecting an inductor current or an output current, and an output capacitor Cout for smoothing output. The electric power conversion unit 12 comprises a driver (driving circuit) 14 for driving the switching element 13 by amplifying a pulse signal from the PWM unit 11. The above described rectifying diode D can be replaced by a MOS transistor, etc. In this case, two MOS transistors are turned on/off according to switching control signals with opposite phases to each other so that they cannot be simultaneously in an ON state.

A DC input is generated by an AC/DC converter or a DC/DC converter. The output is provided for a load (including a battery).

With the above described configuration, the inductor current ramps up while the switching element 13 is in the ON state, and an electric current is provided for a load with the residual charge stored in the output capacitor Cout. While the switching element 13 is in the OFF state, the inductor current ramps down, and the electric current is provided for the load with the charge stored in the output capacitor Cout discharged as necessary. Therefore, the output voltage from the electric power conversion unit 12, that is, the output voltage from each power supply circuit, can be modified according to the ON-to-OFF rate of the switching element 13.

The ON/OFF state of the switching element 13 can be controlled according to a pulse signal generated by the PWM unit 11. In the present embodiment, H of the pulse signal corresponds to the ON state of the switching element 13, and L of the pulse signal corresponds to the OFF state of the switching element 13. Thus, the output voltage of the power supply circuit can be controlled according to a ratio between a time period during which the pulse signal is at H level and a time period during which the pulse signal is at L level.

In the existing PWM, the duty of a pulse signal provided for a switching element is normally used as a parameter for control of an output voltage of the power supply apparatus. The duty of a pulse signal is normally represented as the ratio of the cycle of the pulse signal to the time during which the signal is at the H level. Therefore, according to the present embodiment, the duty of the pulse signal can be specified by designating the cycle of the pulse signal and the time during which the signal is at the H level. According to the present embodiment, since the H level of the pulse signal corresponds to the ON state of the switching element, the time during which the pulse signal is at the H level can be hereinafter referred to as an ON time. That is, according to the present embodiment, the duty of the pulse signal is designated by specifying the cycle and the ON time of the pulse signal.

In the PWM, the cycle of a pulse signal is normally constant. In this case, the duty of the pulse signal can be adjusted by changing only the ON time. However, in the power supply apparatus according to the present embodiment, the switching frequency of the switching element 12 is not always constant. Therefore, in this case, the duty of the pulse signal is determined by dynamically specifying the cycle and the ON time of the pulse signal. When the switching frequency is changed, the switching frequency is not unconditionally changed. This will be described later in detail.

The electric power conversion unit 12 provides the controlled DC voltage for a load not shown in the drawings, and outputs a parameter relating to the output of the power supply circuit to the multiplexing unit 34. The output voltage is an electric potential of the output terminal of the power supply circuit. The output current is detected by, for example, a current sensor. The current sensor can be realized by a shunt resistor. In this case, the value obtained by dividing the voltage at both ends of the shunt resistor by the resistance value of the shunt resistor corresponds to the output current. These parameters (output voltage and output current) are converted by the A/D conversion unit 35 into digital data. Then, the processor 41 reads the output from the A/D conversion unit M35.

The output current can also be computed by transmitting each potential at both ends of the resistor R shown in FIG. 3 to the processor 41 through the A/D conversion unit 35, and computing through the processor 41 the value by dividing by R the difference of the potential values at both ends of the resistor R. The merit of this method is that there are fewer parts.

Explained simply, it is assumed that the electric power conversion unit 12 outputs a voltage value corresponding to the output current Iout of the power supply circuit. The voltage value corresponding to the output current is converted into digital data by the A/D conversion unit 35 at the instruction from the processor 41, and is read by the processor 41.

Figure 4:
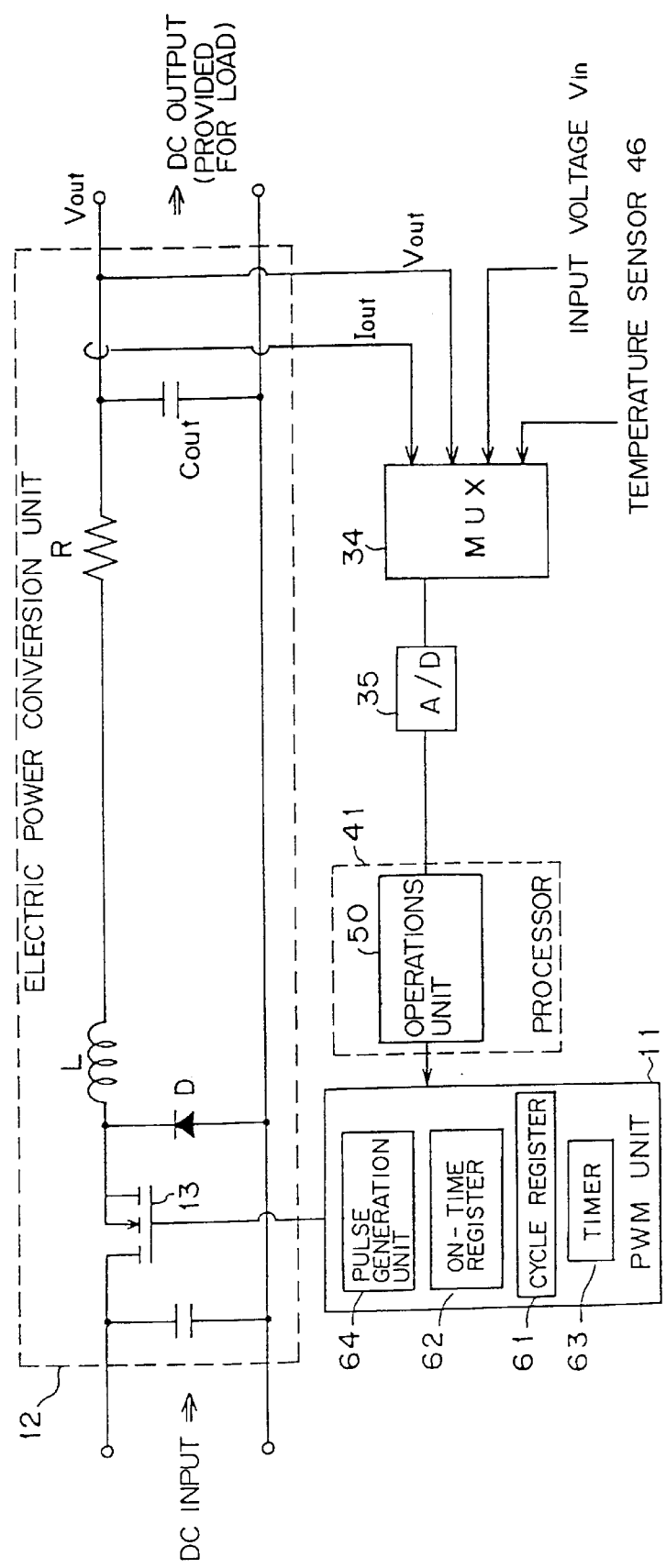
FIG. 4 shows the control of the output voltage according to an embodiment of the present invention.

FIG. 4 shows the output voltage control according to the embodiment of the present invention. In this example, the charger 10 and an optional one of the power supply circuits of the DC power supplies 20-1 through 20-n of the charger 10 shown in FIG. 2 are explained. In FIG. 4, the elements not directly associated with the output voltage control are omitted.

The operation unit 50 is realized by the processor 41 executing a predetermined program stored in the ROM 42, and generates a signal (data) for control of the output voltage of the power supply circuit. Practically, the operation unit 50 calculates the duty of the pulse signal for control of the switching element 13 of the electric power conversion unit 12. A parameter used in the present embodiment is an output voltage and an output current of the power supply circuit.

The output voltage and current of the power supply circuit, the output from the temperature sensor 46, and an applied voltage of a load are input to the multiplexing unit 34. This operation is performed at a sampling instruction from the processor 41. The sampling cycle is, for example, 50 μs. The processor 41 transmits a selection signal (polling signal) to the multiplexing unit 34 to read required data from the sampled data. The multiplexing unit 34 selects an input signal according to the selection signal from the processor 41. In the input signals input to the multiplexing unit 34, the 'output voltage' is always selected for each sampling, and other signals are selected as necessary.

The output from the multiplexing unit 34 is converted into digital data by the A/D conversion unit 35. The processor 41 reads the output from the A/D conversion unit 35.

When the processor 41 reads the digital data from the A/D conversion unit 35, it activates the operation unit 50, and calculates the duty of the pulse signal. The 'output voltage' is used in this operation. However, the 'output current', 'temperature', and 'applied voltage to a load' can also be used as necessary in an operation performed when the duty is determined. The method of performing the operation is described later.

When the operation unit 50 determines the duty of the pulse signal to be provided for the switching element 13, it computes the 'on-time' based on the duty. The on-time can be obtained by the following equation.

$$Ton=D/Ts$$

where D indicates the duty of the pulse signal provided for the switching element 13, and Ts indicates the cycle of the pulse signal.

The 'on-time Ton' computed by the operation unit 50 is written to the on-time register 62 of the PWM unit 11.

The PWM unit 11 comprises a cycle register 61, the on-time register 62, a timer 63, and a pulse generation unit 64. The cycle register 61 is a storage area for storing cycle information which indicates the cycle of an output pulse signal. The cycle of the pulse signal is the switching cycle of the switching element 13, and is written to the cycle register 61 in the initialization sequence of the power supply apparatus. The cycle register 61 can be designed to be updated by the operation unit 50. The on-time register 62 is a storage area for storing on-time information which indicates the on-time computed by the operation unit 50. The timer 63 counts the elapsed time from the leading edge to the trailing edge of a generated pulse signal. The pulse generation unit 64 uses the timer 63 to generate the pulse signal based on the cycle information stored in the cycle register 61 and the on-time information stored in the on-time register 62.

As described above, the output from the PWM unit 11 is used as a switching signal for control of the switching element 13 in the electric power conversion unit 12.

Figure 5:
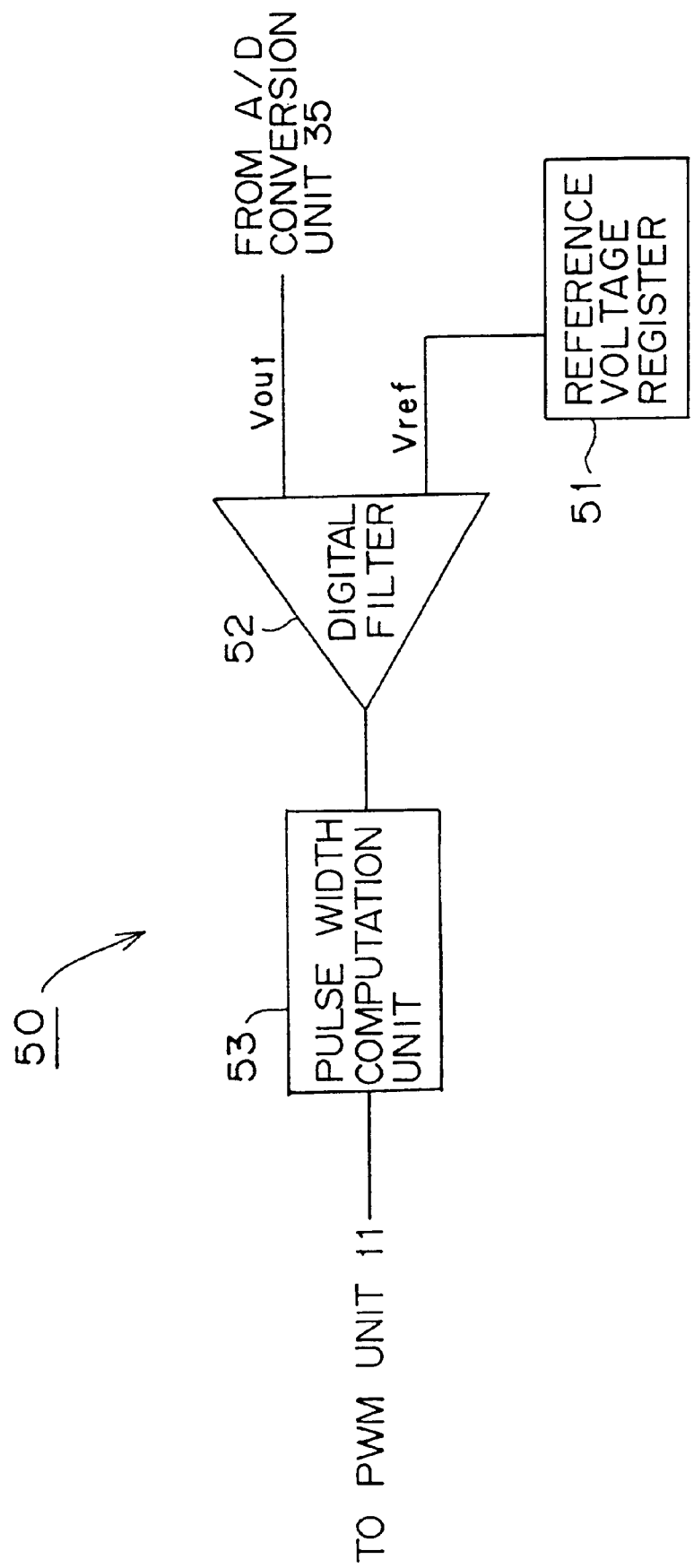
FIG. 5 shows the basic configuration of an operation unit.

FIG. 5 shows the basic configuration of the operation unit 50. The operation unit 50 comprises a reference voltage register 51, a digital filter 52, and a pulse width computation unit 53. The reference voltage register 51 stores a reference value Vref indicating an output voltage to be maintained by the power supply circuit. Assuming that, for example, the output voltage to be maintained by the power supply circuit is 5V, the reference value Vref refers to the digital data which will be obtained if '5V' is input to the A/D conversion unit 35.

The output voltage of the power supply circuit is feedback controlled such that the voltage can match the reference value Vref. That is, the operation unit 50 obtains and outputs the duty (on-time of the pulse signal provided for the switching element 13) depending on which the output voltage Vout of the power supply circuit matches the reference value Vref. Therefore, when the reference value Vref is changed, the output voltage Vout of the power supply circuit is changed correspondingly.

The digital filter 52 amplifies and outputs the difference between the output voltage Vout and the reference value Vref. The digital filter 52 is basically designed to implement the characteristic (especially the G-Φ characteristic) of the amplifier 523 used in the conventional power supply apparatus shown in FIG. 1. The pulse width computation unit 53 computes the 'on-time Ton' based on the output from the digital filter 52. The on-time refers to a time during which the switching element 13 is in an ON state on the switching cycle of the switching element 13. The pulse width computation unit 53 writes the on-time to the on-time register 62 of the PWM unit 11.

Figure 6A:
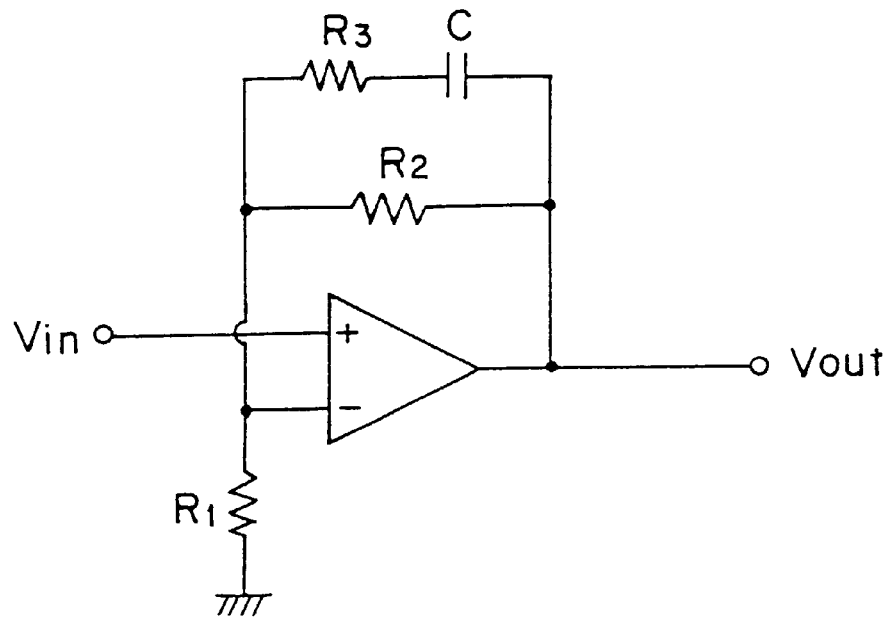
FIG. 6A shows a practical circuit of an amplifier used in the conventional power supply apparatus.

Described below is the method of realizing the operation unit 50. As described above, the digital filter 52 is basically designed to implement the characteristics as is (especially the G-Φ characteristic) of the amplifier 523 used in the conventional power supply apparatus shown in FIG. 1. FIG. 6A shows an example of a practical circuit of the amplifier 523 used in the conventional power supply apparatus. The transfer function of the analog amplifier is described below.

$$G_{(s)} = \frac{R_1 + R_2}{R_1} \cdot \frac{1 + sc(R_3 + R_1 // R_2)}{1 + sc(R_2 + R_3)}$$

$$= \frac{\alpha(1 + s\gamma)}{1 + s\beta}$$

$$G(j\omega) = \frac{\alpha\{1 + \omega^2\beta\gamma + j\omega(\gamma - \beta)\}}{1 + \omega^2\beta^2}$$

$$\left(\alpha = \frac{R_1 + R_2}{R_1}, \gamma = c(R_3 + R_1 // R_2), \beta = c(R_2 + R_3)\right)$$

As a digital filter, for example, an FIR (finite impulse response) filter and an IIR (infinite impulse response) filter are popular. The digital filter 52 can be realized by using either of them, the IIR filter is used in the present embodiment.

To assign the characteristics of an analog amplifier (analog filter) to an IIR filter, the s-z transformation is adopted. The s-z transformation refers to a method of converting a transfer function G(s) of an analog filter in an s area into a z area.

Figure 6B:
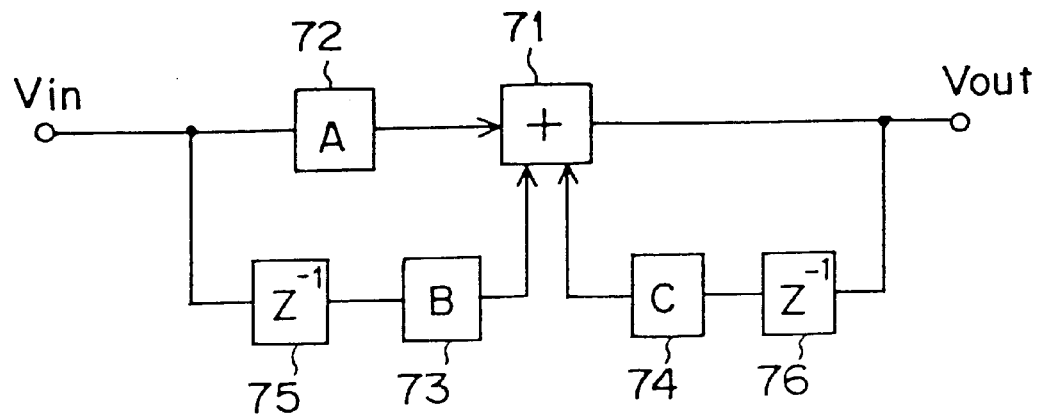
FIG. 6B shows a digital filter equivalent to the amplifier generated using the IIR and shown in FIG. 6A.

FIG. 6B shows a digital filter which is generated using the IIR and is equivalent to the amplifier (analog filter) shown in FIG. 6A. The digital filter comprises an adder 71, factor multipliers 72 through 74, and unit delay elements 75 and 76. The method of replacing the amplifier shown in FIG. 6A with the digital filter shown in FIG. 6B is well-known, but is described below for confirmation.

Described below is the transfer function in the area.

$$s = \frac{2(1 - Z^{-1})}{T_s(1 + Z^{-1})}$$

$$G_{(Z)} = \frac{R_1 + R_2}{R_1} \cdot \frac{T_s + 2c(R_3 + R_1 // R_2) + \{T_s - 2c(R_3 + R_1 // R_2)\} \cdot Z^{-1}}{T_s + 2c(R_2 + R_3) + \{T_s - 2c(R_2 + R_3)\} \cdot Z^{-1}}$$

$$= \frac{\alpha \cdot \{T_s + 2\gamma + (T_s - 2\gamma) \cdot Z^{-1}\}}{T_s + 2\beta + (T_s - 2\beta) \cdot Z^{-1}}$$

$$= \alpha \cdot \frac{T_s - 2\gamma}{T_s - 2\beta} \cdot \frac{\frac{T_s + 2\gamma}{T_s - 2\gamma} + Z^{-1}}{\frac{T_s + 2\beta}{T_s - 2\beta} + Z^{-1}}$$

$$= \alpha \cdot a \cdot \frac{b + Z^{-1}}{c + Z^{-1}}$$

$$\left(a = \frac{T_s - 2\gamma}{T_s - 2\beta}, b = \frac{T_s + 2\gamma}{T_s - 2\gamma}, c = \frac{T_s + 2\beta}{T_s - 2\beta}\right)$$

$$G(e^{j\omega T_s}) = \alpha \cdot a \cdot \frac{b + \cos(\omega T_s) - j \cdot \sin(\omega T_s)}{c + \cos(\omega T_s) - j \cdot \sin(\omega T_s)}$$

$$= \frac{\alpha \cdot a\{(b + \cos(\omega T_s)) \cdot (c + \cos(\omega T_s)) + \sin^2(\omega T_s) + j(b - c) \cdot}{(c + \cos(\omega T_s))^2 + \sin^2(\omega T_s)}$$

The following results are obtained from the above listed equations (1) and (2).

$$Y_{(n)} = \frac{\alpha \cdot a \cdot b}{c} \cdot X_{(n)} + \frac{\alpha \cdot a}{c} \cdot X_{(n-1)} - \frac{1}{c} \cdot Y_{(n-1)} \quad (3)$$

$$= A \cdot X_{(n)} + B \cdot X_{(n-1)} C \cdot Y_{(n-1)}$$

$$A = \frac{R_1 + R_2}{R_1} \cdot \frac{T_s + 2c(R_3 + R_1 // R_2)}{T_s + 2c(R_2 + R_3)} \quad (4)$$

$$B = \frac{R_1 + R_2}{R_1} \cdot \frac{T_s - 2c(R_3 + R_1 // R_2)}{T_s + 2c(R_2 + R_3)} \quad (5)$$

$$C = -\frac{T_s - 2c(R_2 + R_3)}{T_s + 2c(R_2 + R_3)} \quad (6)$$

The configuration shown in FIG. 6B can be obtained from equation (3) above. The factors set by the factor multipliers 72 through 74 are represented by equations (4) through (6) above.

Equation (3) above (including equations (4) through (6)) is described in a software program, and the digital filter 52 can be realized by the processor 41 performing the program. Thus, according to the present embodiment, the operations and the characteristics of an analog amplifier used in the conventional power supply apparatus are described by a software program, and the program is executed to provide the operations of the analog amplifier. Therefore, the characteristics of the analog amplifier can be changed simply by rewriting the program.

Figure 7:
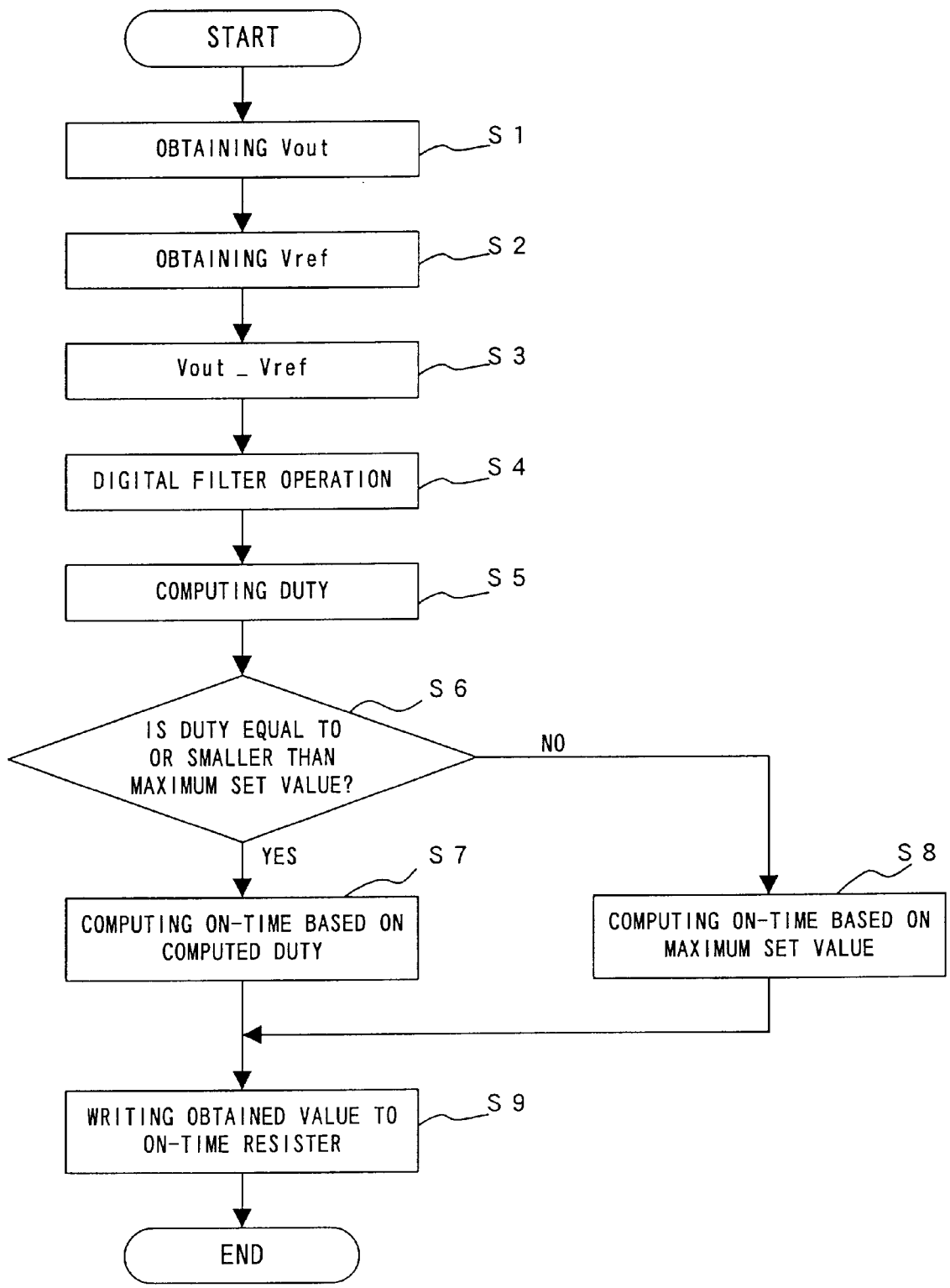
FIG. 7 is a flowchart showing the basic operation performed by the operation unit.

FIG. 7 is a flowchart showing the operation of the operation unit 50. In this example, as described by referring to FIG. 4, an optional power supply circuit in the DC power supplies 20-1 through 20-n is selected for description. It is assumed that the reference value Vref is stored in the reference voltage register 51. The process shown in this flowchart is performed for each of the very short intervals (for example, 50 μs.) by a timer interruption, etc.

An output voltage Vout is obtained in step S1. Practically, the processor 41 first notifies the multiplexing unit 34 that the output voltage Vout of the power supply circuit is selected. The output voltage Vout from the power supply circuit, the output current Iout from the power supply circuit, the input voltage Vin provided for the power supply circuit, and the output signal from the temperature sensor 46 are input to the multiplexing unit 34. According to the notification from the processor 41, the multiplexing unit 34 outputs the output voltage from the power supply circuit to the A/D conversion unit 35. The processor 41 reads digital data (output voltage Vout), that is, the conversion result from the A/D conversion unit 35.

The reference value Vref is obtained from the reference voltage register 51 in step S2. In step S3, the difference between the output voltage Vout obtained in step S1 and the reference value Vref obtained in step S2 is computed. In step S4, a digital filter operation is performed. In this process, the computation result in step S3 is input to the digital filter shown in FIG. 6B. The computation result in step S3 is substituted for the equation (3) above.

Figure 8:
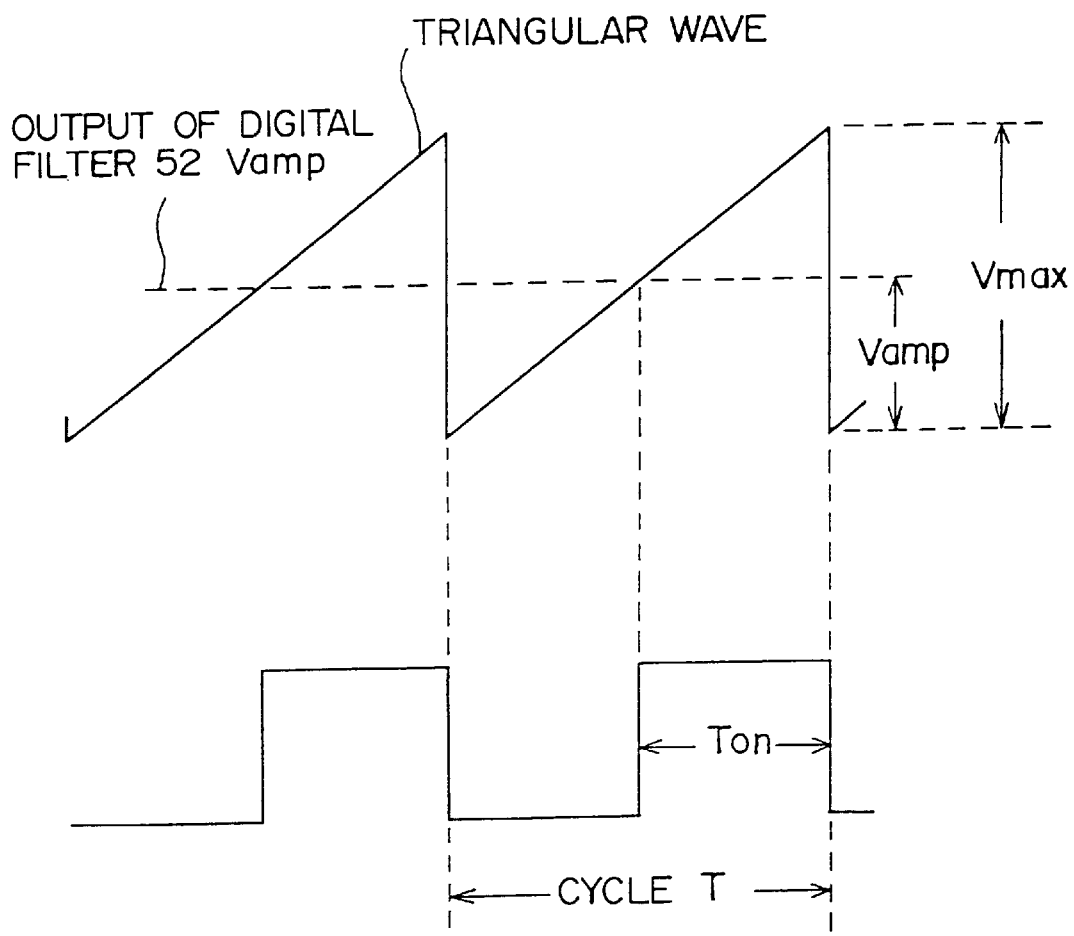
FIG. 8 shows the duty of a pulse signal.

In step S5, the duty of the pulse signal generated by the PWM unit 11 is computed based on the result of the operation by the digital filter. Briefly described below by referring to FIG. 8 is the duty of the pulse signal.

The pulse signal is normally generated using a triangular wave in an analog circuit. Using a triangular wave, the process performed in step S5 corresponds to the process of comparing the level of the triangular wave with the result of the operation by the digital filter. Assuming that the output from the digital filter 52 is Vamp, the cycle of the triangular wave is T, and the maximum value of the triangular wave is Vmax, the duty of the generated pulse signal is represented by the following equation.

$$D = Ton/T = (Vmax - Vamp)/Vmax \qquad (7)$$

Therefore, according to the present embodiment, the duty of a pulse signal is obtained using a predetermined maximum value Vmax of the triangular wave by substituting the output from the digital filter 52 in the equation (7) above.

In step S6, it is checked whether or not the duty obtained in step S5 is equal to or smaller than a predetermined maximum set value. If it is determined that the duty obtained in step S5 is equal to or smaller than the predetermined maximum set value, then the on-time Ton is computed using the computed duty from equation (7) above in step S7. That is, the operation Ton=D·T is performed. However, if the duty obtained in step S5 is larger than the predetermined value, the on-time Ton is obtained using the maximum set value Dmax instead of the duty D obtained in step S5. That is, the operation Ton=Dmax·T is performed.

In step S9, the on-time computed in step S7 or S8 is written to the on-time register 62 in the PWM unit 11.

The processes in the above described steps S1 through S9 are repeated at very short predetermined intervals. Therefore, the on-time corresponding in real time to the output voltage of a power supply circuit is constantly written to the on-time register 62. The above described process is cyclically performed on a plurality of power supply circuits. Each operation result is written to the on-time register 62 of the PWM unit 11.

Figure 9A:
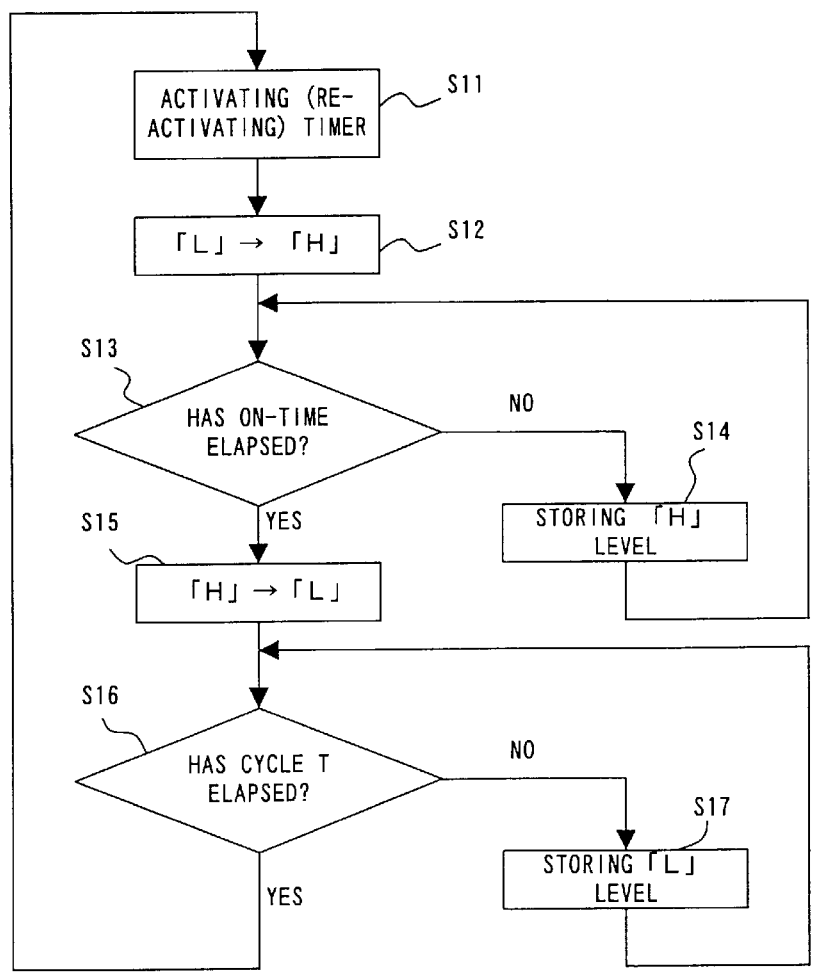
FIG. 9A is a flowchart showing the operation performed by the pulse generation unit.

FIG. 9A is a flowchart showing the operations of the pulse generation unit 64. In step S11, the timer 63 is activated. Upon activation of the timer, the output from the PWM unit 11 is switched from the L level to the H level in step S12. In steps S13 and S14, the output from the PWM unit 11 is maintained at the H level until the time that has elapsed since the activation of the timer 63 reaches the on-time Ton stored in the on-time register 62.

When the time that has elapsed since the activation of the timer 63 reaches the on-time Ton, the output from the PWM unit 11 is switched from the H level to the L level in step S15. In steps S16 and S17, the output from the PWM unit 11 is maintained at the L level until the time that has elapsed since the activation of the timer 63 reaches the cycle T stored in the cycle register 61. When the time that has elapsed since the activation of the timer reaches the cycle T, control is passed to step S11 to re-activate the timer 63.

Figure 9B:
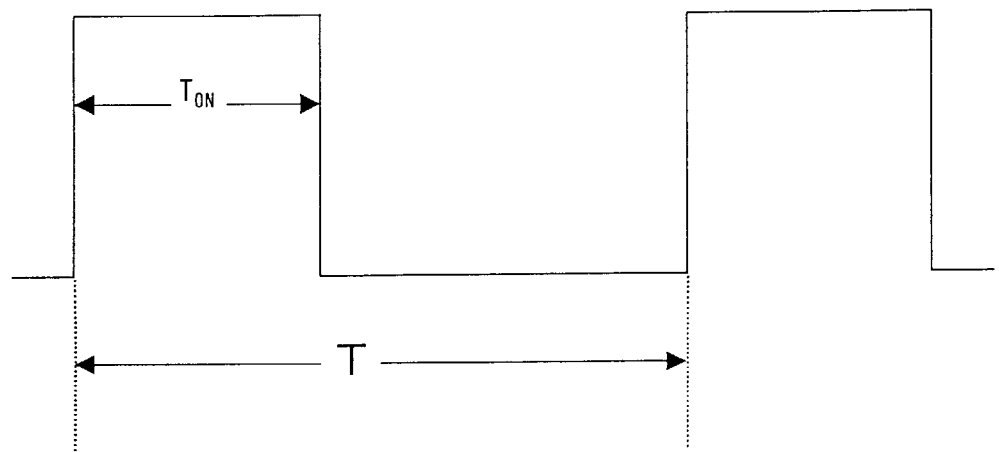
FIG. 9B shows an example of a generated pulse signal.

The pulse signal shown in FIG. 9B is generated by repeatedly performing the above described processes. According to the pulse signal, the switching element 13 of the electric power conversion unit 12 is controlled.

As described above, the power supply apparatus according to the present embodiment generates a pulse signal to control the switching element 13 in a software process. Therefore, the output voltage of each power supply circuit, and the switching frequency, the response characteristics of the switching element 13 can be easily changed only by re-writing the program to be executed by the processor 41. For example, an output voltage can be determined by setting the reference value Vref. A switching frequency can be determined by setting the frequency of the triangular wave shown in FIG. 8. A response characteristic changes with a factor of the digital filter shown in FIG. 6B.

Thus, the operation unit 50 and the PWM unit 11 of the power supply apparatus according to the present embodiment performs the functions of the analog unit of the conventional power supply apparatus. As a result, the entire circuit can be smaller. Furthermore, according to the present embodiment, the analog unit of the conventional power supply apparatus is described in the software program. Therefore, even if it is necessary to change the function provided by the conventional analog circuit, it can be easily changed only by re-writing the program.

Described below are the operations directly related to the power supply apparatus according to the present invention. The power supply apparatus according to the present invention is based on the configuration explained by referring to FIGS. 2 through 9. The characteristics and specification of the power supply apparatus can be flexibly changed by the operations of the operation unit 50, that is, by the program to be executed by the processor 41. Three embodiments are described below.

First Embodiment

The first embodiment relates to the technology of optimizing the relationship between the gain and the phase of a power supply apparatus independent of external factors (input voltage, output current, temperature, output voltage, etc.), and more specifically to the technology of improving the output voltage precision by obtaining the largest possible gain without the oscillation of a feedback system for controlling the output of a power supply circuit.

Figure 10:
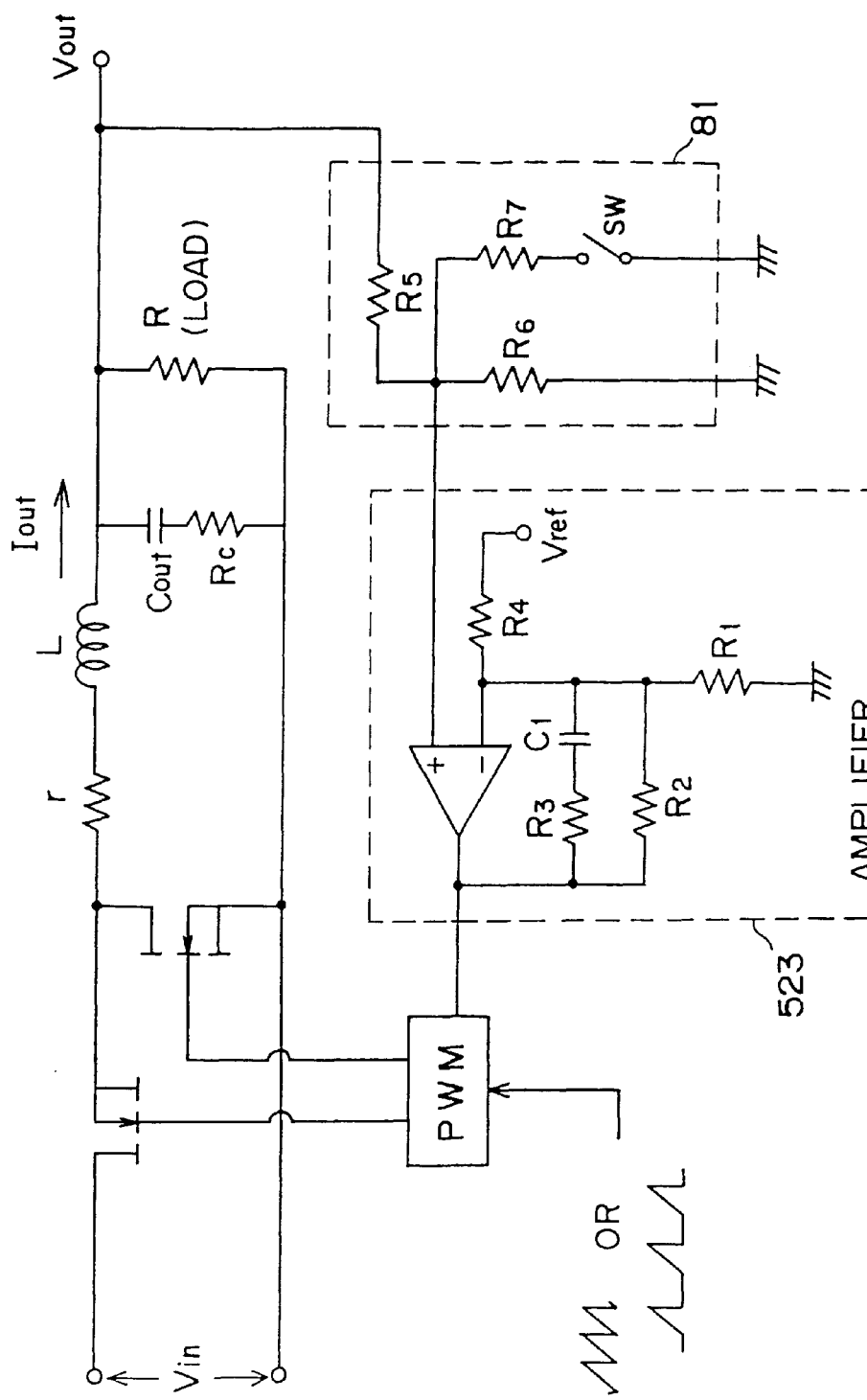
FIG. 10 shows the conventional power supply circuit.

FIG. 10 shows the circuit of the conventional power supply apparatus. This figure shows furthermore in detail the feedback system for controlling an output voltage shown in FIG. 1. In FIG. 10, the portions not directly related to the feedback system are omitted.

A resistor network (voltage divider) 81 divides the voltage Vout of the output terminal of the power supply circuit. Practically, the resistor network 81 outputs the voltage expressed by the following equation when the switch SW is in an opening state.

$$V = Vout \cdot R6/(R5+R6)$$

The resistor network 81 outputs the voltage expressed by the following equation when the switch SW is in a closing state.

$$V = Vout \cdot Rx/(R5+Rx)$$

$$Rx = R6 \cdot R7/(R6+R7)$$

The opening and closing states of the switch SW can be controlled by, for example, an instruction from the user or the personal computer including the power supply apparatus. Based on the state of the switch SW, the value of the output voltage to be maintained can be varied.

The amplifier 523 has been described by referring to FIG. 6A. The characteristics of its gain and phase (G-Φ characteristic) depend on resistors R1 through R4 and a capacitance C1. Although a resistor R4 is not shown in FIG. 6A, it is obvious that one of ordinary skill in the art can provide the resistor when a reference voltage is input. A resistor Rc is a serial resistor (ESR) to the output capacitor Cout. In FIG. 10, a MOS transistor replaces the rectifying diode shown FIG. 1. However, the replacement is not significant in the present invention.

Figure 11:
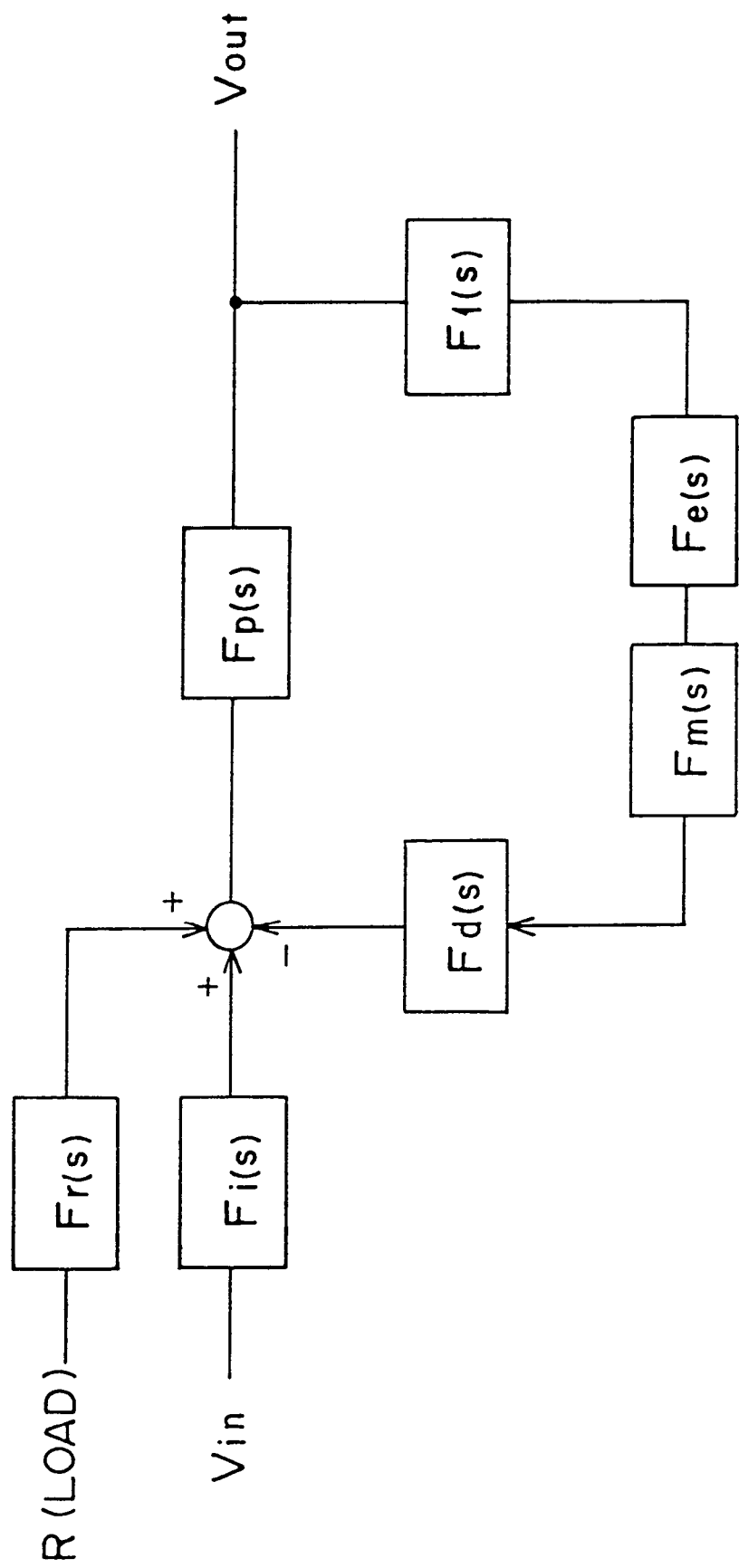
FIG. 11 is a block diagram showing the transfer function of the power supply apparatus shown in FIG. 10.

FIG. 11 is a block diagram showing the transfer function of the power supply apparatus shown in FIG. 10. In FIG. 11, Fr, Fi, Fd, and Fp are transfer functions in the electric power conversion unit 12. Among them, Fp is a factor that depends on the input voltage Vin. Fp is also a transfer function of an LC filter comprising an inductor L and an output capacitor Cout. These transfer functions are represented as follows.

$$F_r = \frac{Vout}{R^2} \cdot (sL + r)$$

$$F_i = D$$

$$F_d = Vin$$

$$F_p = \frac{k_p \cdot \left(s + \frac{1}{C \cdot R_c}\right)}{s^2 + a_1 \cdot s + a_2}$$

$$k_p = \frac{R \cdot R_c}{L(R + R_c)}$$

$$a_1 = \frac{r}{L} + \frac{R \cdot R_c}{L(R + R_c)} + \frac{1}{C(R + R_c)}$$

$$a_2 = \frac{r + R}{LC(R + R_c)}$$

F1 is a transfer function of a resistor network. Fe is a transfer function of the amplifier 523. Fm is a transfer function of the PWM control circuit 524. These transfer functions are represented as follows.

The open loop transfer function Ga(s) of the feedback system of the power supply circuit is represented as follows.

$$Ga(s) = F1 \cdot Fe \cdot Fm \cdot Fd \Phi Fp$$

With the above described configuration, the gain and phase of the transfer function Ga(s) change with the input voltage Vin, the output current Iout, the temperature around the power supply apparatus, and the $$F_1(SW: OPEN) = \frac{R_6}{R_5 + R_6}$$

$$F_1(SW: CLOSE) = \frac{R_x}{R_5 + R_x}; R_x = \frac{R_6 - R_7}{R_6 + R_7}$$

$$F_e = K_e \cdot \frac{S + \frac{R_3 + R_4}{c_1(R_3 \cdot R_2 + R_2 \cdot R_A + R_A \cdot R_3)}}{S + \frac{1}{C_1(R_3 + R_2)}}$$

$$K_e = \frac{R_3 \cdot R_2 + R_2 \cdot R_A + R_A \cdot R_3}{R_A \cdot (R_3 + R_2)}$$

$$R_A = R_4 // R_1$$

$$F_m = \begin{bmatrix} \frac{1}{2V_p} \left( \underset{T}{\overleftrightarrow{\diagup\diagup\diagup}} \updownarrow V_p \right) \\ \frac{1}{V_p} \left( \underset{T}{\overleftrightarrow{\diagup\diagdown\diagup\diagdown}} \updownarrow V_p \right) \end{bmatrix}$$

voltage Vout to be maintained by the power supply apparatus. Actually, the transfer function Fd changes with an input voltage. The transfer function Fp changes with the output current Iout and the temperature around the power supply apparatus. The transfer function F1 changes with the voltage Vout to be maintained.

With the above described configuration of the power supply apparatus, an oscillation should be suppressed in the above described feedback system. The oscillation in the feedback system arises when the phase of the transfer function Ga(s) satisfies a predetermined condition. The condition of an oscillation is, as it is well known, the phase delay=0 (2π) for positive phase amplification, and the phase delay=π for a phase shift. Since the power supply apparatus according to the present embodiment belongs to the positive phase amplification, an oscillation arises when the phase delay reaches 2π in the transfer function Ga(s).

Figure 12:
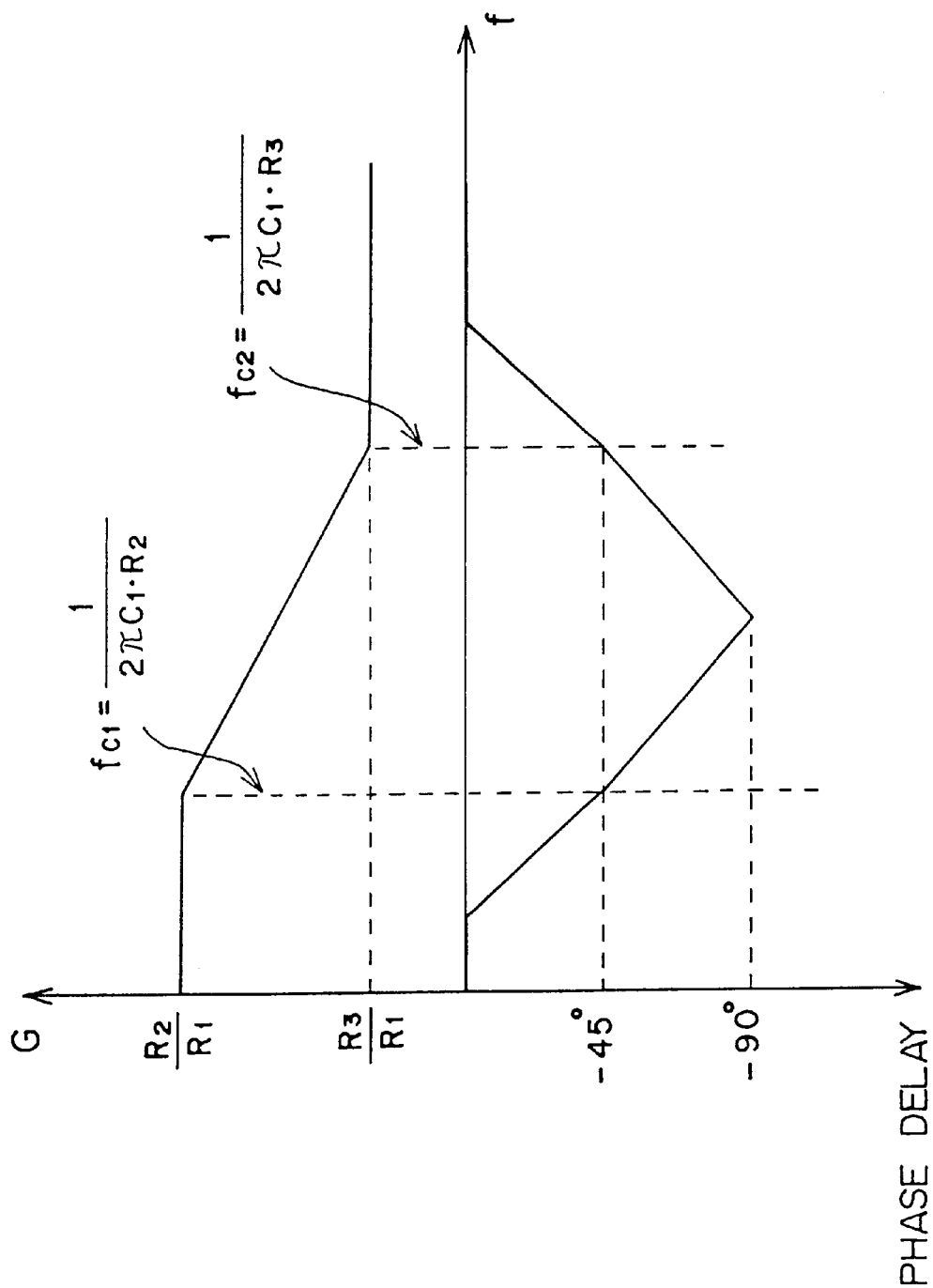
FIG. 12 shows an example of the G-Φ characteristic of an analog amplifier.

Each transfer function forming part of the transfer function Ga(s) has its own gain and phase depending on each frequency. For example, the G-Φ characteristic of the amplifier 523 is shown in FIG. 12.

To increase the reliability of the power supply apparatus, it is necessary under all conditions to completely suppress the oscillation in the feedback system. To attain this, the amplifier 523 is normally designed to have a characteristic to suppress the oscillation in the feedback system on the assumption that each of the transfer functions forming part of the transfer function Ga(s) is assigned the worst possible condition. Practically, the gain of the amplifier 523 is determined based on the worst possible condition for each transfer function. Therefore, under normal conditions, the gain of the amplifier 523 is set to a low value.

The first embodiment of the present invention has been developed to solve the above described problem, and designed to change the characteristic of the amplifier depending on the condition assigned to each transfer function forming part of the transfer function Ga(s). According to the present embodiment, the function of the above described amplifier is implemented in the digital filter shown in FIG. 5, and the characteristic of the amplifier is adjusted by changing the factor (such as, factors A, B, C in equation (3)) of the digital filter.

When the input voltage Vin applied to the power supply circuit changes, the phase delay of the transfer function Ga(s) changes with the transfer function Fd. Normally, in the power supply apparatus, when the input voltage Vin becomes high, the gain G becomes larger. As a result, a prolonged phase delay satisfies the condition for generating an oscillation in the feedback system. In this case, the input voltage Vin of the power supply circuit is monitored, and the characteristic of the digital filter 52 is optimized depending on the voltage according to the present embodiment. Practically, appropriate factors are selected as the factors A through C in the equation (3) above. The equation (3) above is described in the program executed by the processor 41, and relates to the characteristic of the digital filter 52.

The relationship between the input voltage Vin and the above described factors A through C is preliminarily obtained through simulation, etc. and the result is stored in a table as shown in FIG. 13. The table is, for example, stored in the ROM 42. The operation unit 50 periodically detects the input voltage Vin, retrieves factors A through C from the table shown in FIG. 13 using the detected voltage as a key, and updates the above described equation (3).

FIG. 14 is a flowchart of the process of controlling the output voltage while changing the characteristic of the amplifier depending on the input voltage. This process is performed at predetermined intervals by a timer interruption, etc.

In step S21, the voltage Vout is obtained. This process is the same as the process in step S1 shown in FIG. 7. In step S22, the input voltage Vin is obtained. This process corresponds to a process of transmitting a polling signal to the multiplexing unit 34, and then reading the digital data corresponding to the input voltage from the A/D conversion unit 35.

In step S23, the table shown in FIG. 13 is accessed using the input voltage data obtained in step S22 as a key to extract the factors A through C. In step S24, an equation describing a digital filter using each factor extracted in step S23 is updated. Then, in step S25, a digital filter operation is performed for the obtained input voltage Vin. In steps 26 and 27, which are the same as steps S5 through S9 shown in FIG. 7, the on-time of a pulse signal is computed and written to the on-time register 62 of the PWM unit 11.

In the above described process, the characteristic of the digital filter 52 is always optimized in response to a change in the input voltage. Therefore, an oscillation of the feedback system can be suppressed while a large gain is maintained. In the above described flowchart, since the input voltage is not suddenly changed, it is not necessary to perform the process of changing the characteristic of a digital filter depending on the input voltage Vin, that is, the process in steps S22 through S24, each time the on-time is computed.

In a power supply apparatus, an inductor L that has an inductance that changes with an electric current can be used. For example, an amorphous core coil has a characteristic in which its inductance is reduced if the electric current becomes strong.

If the inductor L with the above described characteristic is used, the transfer function Fp changes with the output current Iout provided from the power supply circuit to a load, thereby changing the phase delay of the transfer function Ga(s).

Figure 15A:
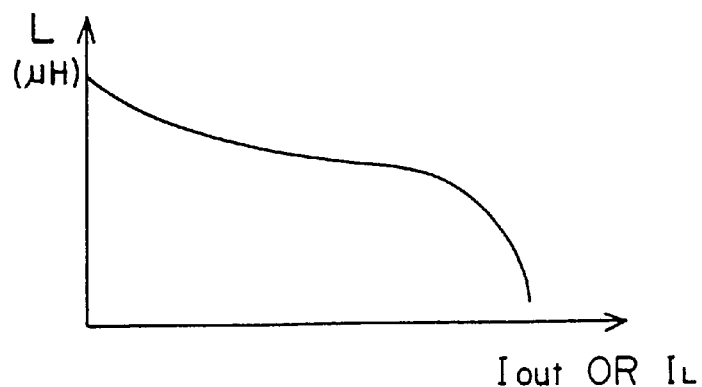
FIG. 15A shows the current dependency of the inductance of an amorphous coil.
Figure 15B:
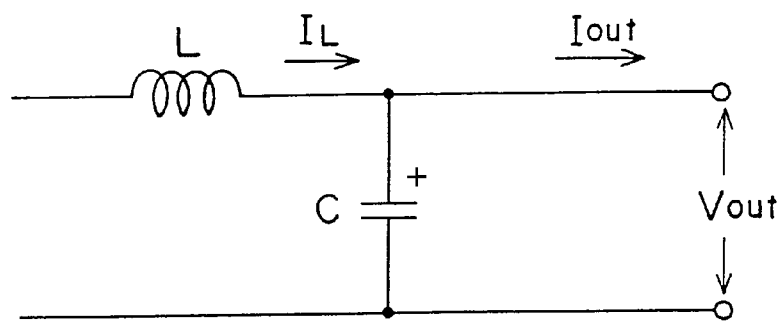
FIG. 15B shows an LC filter.
Figure 15C:
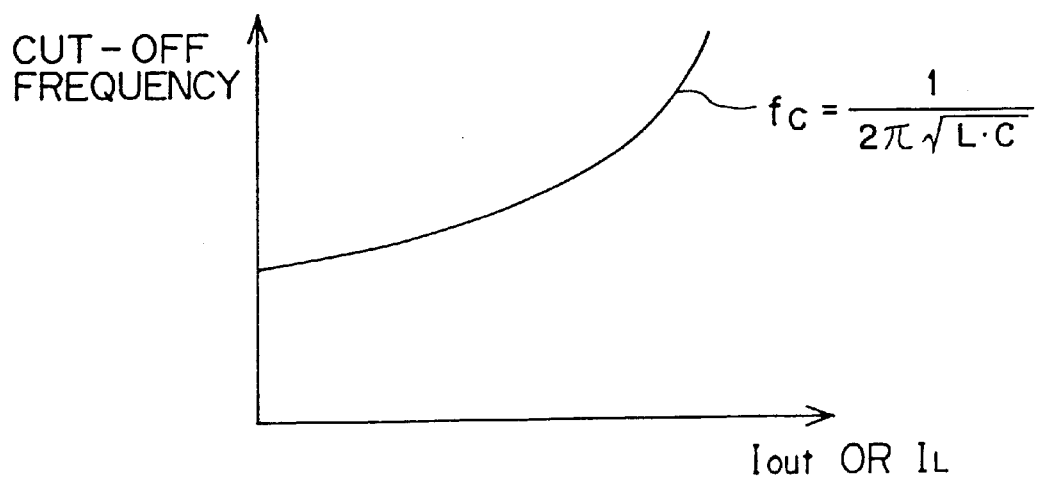
FIG. 15C shows the current dependency of the cut-off frequency.

FIG. 15A shows the current dependency of the inductance of an amorphous core coil. Using an inductor having such a characteristic, the cut-off frequency of the LC filter shown in FIG. 15B is shown in FIG. 15C. That is, the cut-off frequency of the LC filter is low when the output current Iout is weak, and is high when the output current Iout becomes strong. Therefore, in the power supply apparatus shown in FIG. 11, when the output current Iout is weak, the cut-off frequency of the LC filter becomes low. As a result, the phase delay is developed and the condition for generating an oscillation in the feedback system is also developed.

Figure 16:
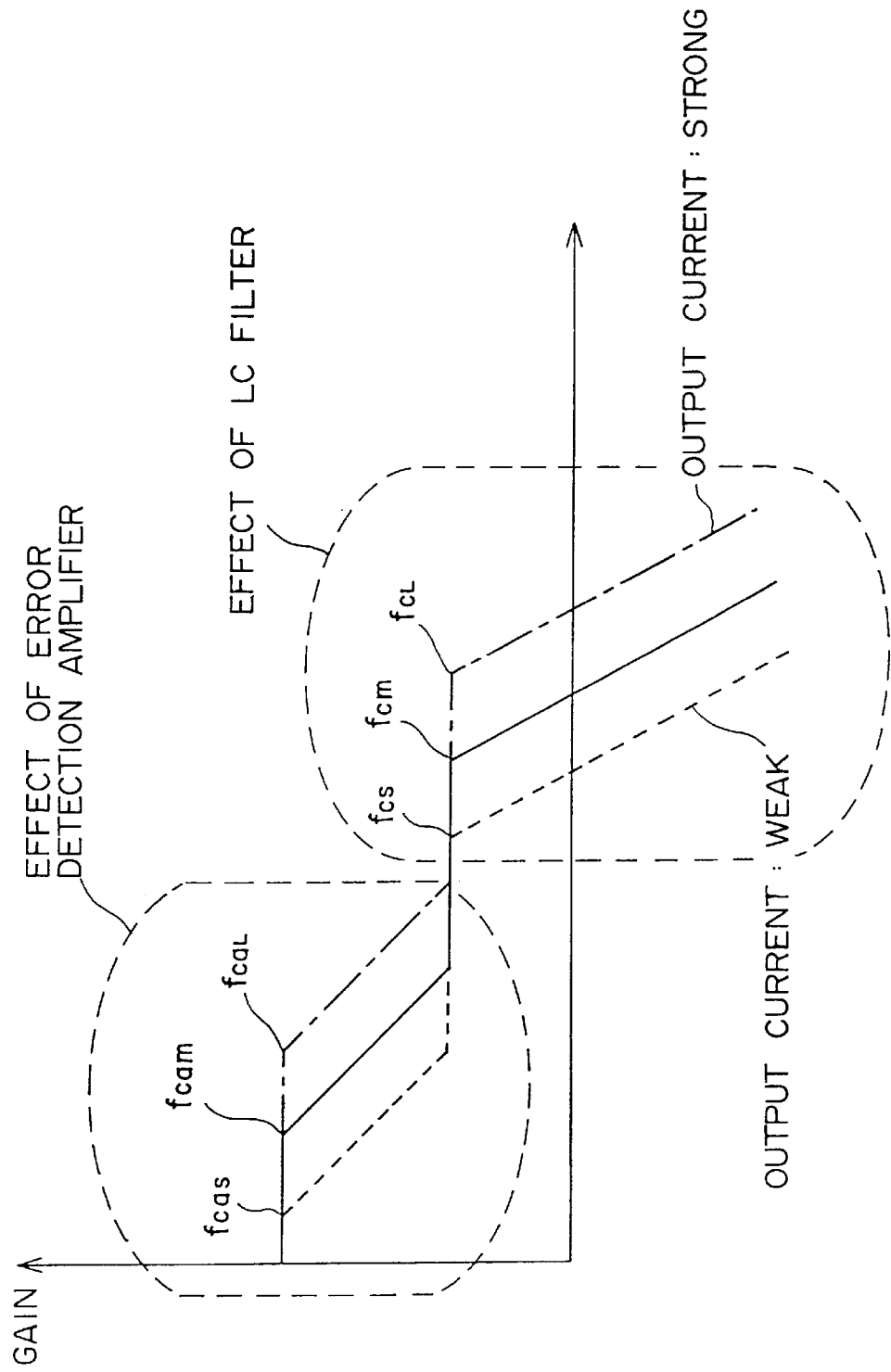
FIG. 16 shows the frequency characteristic of the gain through the error detection amplifier and the LC filter.

FIG. 16 shows the frequency characteristic of a gain by an error detecting amplifier (amplifier 523) and an LC filter. As described above, the cut-off frequency of the LC filter depends on an output current. In FIG. 16, the cut-off frequencies when the output current is weak, medium, and strong are represented by fcs, fcm, and fcL respectively.

When the output current Iout is weak, the feedback system tends to satisfy the condition of generating an oscillation due to the phase delay, as described above. Therefore, with the conventional analog configuration in which the G-Φ characteristic cannot be dynamically changed, the characteristic of the amplifier is determined based on a weaker output current Iout. That is, in FIG. 16, the resistance and the capacitance as shown in FIG. 6A are determined such that the cut-off frequency can be fcas, and an amplifier having the gain characteristic indicated by broken lines is used. As a result, when the output current Iout becomes strong, a necessary gain may not be obtained, and the precision of the control of the output voltage Vout may not be satisfactory.

According to the present embodiment, the output current Iout of the power supply apparatus is monitored, and the characteristic of the digital filter 52 is optimized depending on the electric current. Practically, the factors A through C in the equation (3) above are appropriately selected such that the gain is larger when the output current becomes strong. That is, it is set so that the gain of the error detecting amplifier has the characteristic indicated by the wave lines, solid lines, and dash-and-point lines when the output current Iout of the power supply circuit is weak, medium, and strong respectively. The settings depend on the cut-off frequency (fcas, fcam, fcaL) of the error detecting amplifier. The cut-off frequency of the amplifier is shown in FIG. 12.

The relationship between the output current Iout and the above described factors A through C is preliminarily obtained by simulation, etc. in the method described above by referring to FIG. 16, and stored in the table. The configuration of the table is basically the same as the configuration shown in FIG. 13, but is different in that the factors A through C are stored using the output current as a key. The operation unit 50 periodically detects the output current Iout, retrieves the factors A through C using the current as a key, and updates the equation (3) above.

FIG. 17 is a flowchart of the process of controlling the output voltage while changing the characteristic of the amplifier depending on the output current. This process is performed by replacing steps S22 through S24 shown in FIG. 14 with steps S31 through S33. In step S31, the output current Iout is obtained. This process corresponds to the process of transmitting a polling signal to the multiplexing unit 34, and then reading digital data corresponding to the output current from the A/D conversion unit 35. In step S32, factors A through C are extracted using the output current data obtained in step S31 as a key. In step S33, the equation relating to the digital filter is updated using each factor extracted in step S32.

In the equation described above, the characteristic of the digital filter 52 is always optimized for the change in the output current. Therefore, the oscillation of a feedback system with a large gain can be suppressed.

Normally, the capacitor has resistance elements (resistor Rc in FIG. 10) to be serially connected to the capacitance elements. The serial resistor can be referred to as an ESR.

The resistance value of the ESR depends on the temperature. For example, the resistance value of the ESR of a field capacitor becomes larger when the temperature drops, and becomes smaller when the temperature rises.

The resistance value of the ESR of the output capacitor Cout used in the above described LC filter also changes with the temperature. Therefore, when the temperature around the power supply apparatus changes, the transfer function Fp also changes, thereby changing the phase delay of the transfer function Ga(s).

Figure 18A:
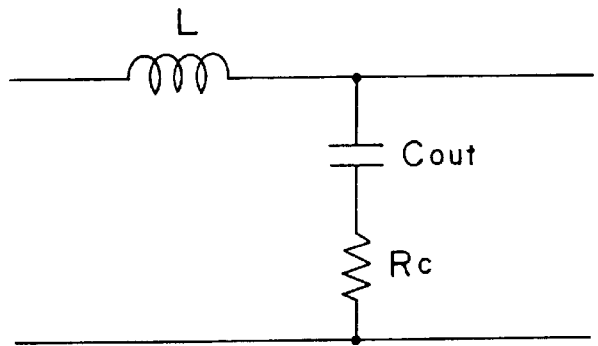
FIG. 18A shows the configuration of the LC filter.
Figure 18B:
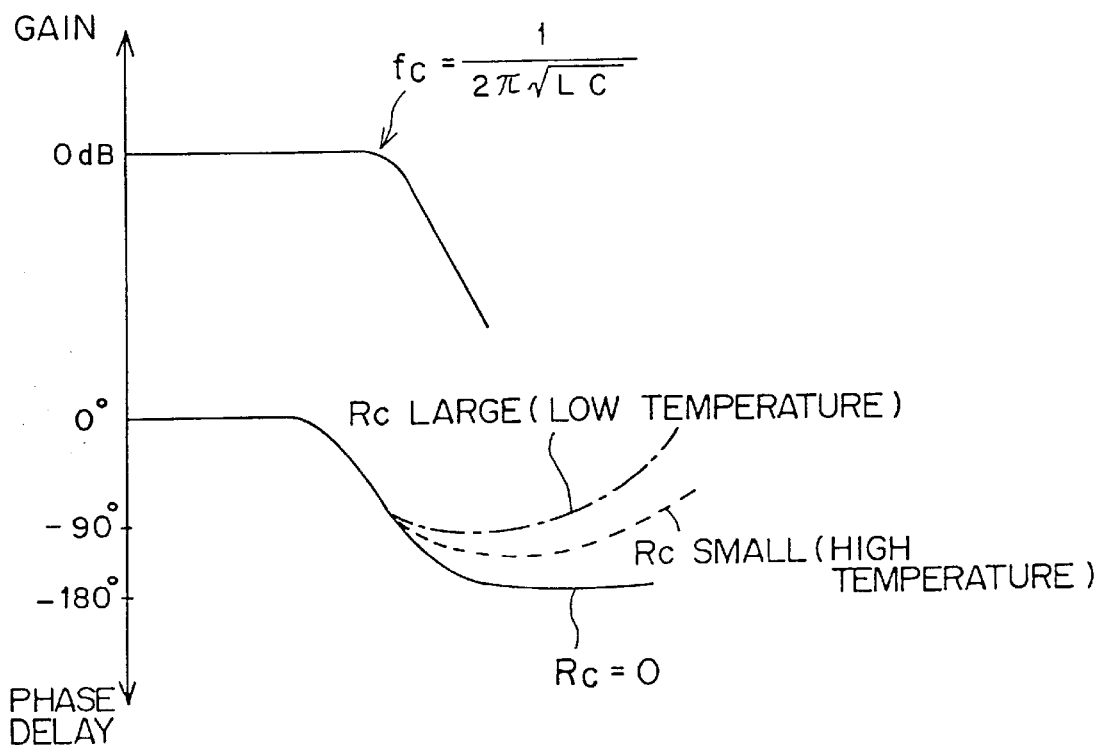
FIG. 18B shows the temperature dependency of the G-Φ characteristic of the LC filter.

FIG. 18B shows the temperature dependency of the G-Φ characteristic of the LC filter shown in FIG. 18A. The phase delay caused by the LC filter is small when the resistance value of the ESR is large, and becomes larger when the resistance value of the ESR is smaller. That is, the phase delay caused by the LC filter is small when the temperature is low, and large when the temperature is high if a field capacitor is used as an output capacitor Cout. Therefore, in the power supply apparatus shown in FIG. 11, the phase delay becomes large when the temperature in the vicinity of the power supply apparatus rises, thereby reaching the conditions which generate an oscillation in the feedback system.

According to the present embodiment, the temperature around the power supply circuit is monitored, and the characteristic of the digital filter 52 is optimized depending on the temperature. Practically, the factors A through C in the equation (3) above are appropriately selected such that the gain becomes larger when the temperature around the power supply circuit drops. To change the gain of the digital filter 52, the method used to change the cut-off frequency is the same as the method used when the gain is changed according to the output current.

The relationship between the temperature around the power supply apparatus and the above described factors A through C is preliminarily obtained by simulation, etc., and stored in the table. The table is basically the same as the configuration shown in FIG. 13, but the factors A through C are stored using the temperature around the power supply apparatus as a key. The operation unit 50 periodically detects the temperature around the power supply apparatus, retrieves the factors A through C using the detected temperature as a key, and updates the equation (3) above.

Figure 19:
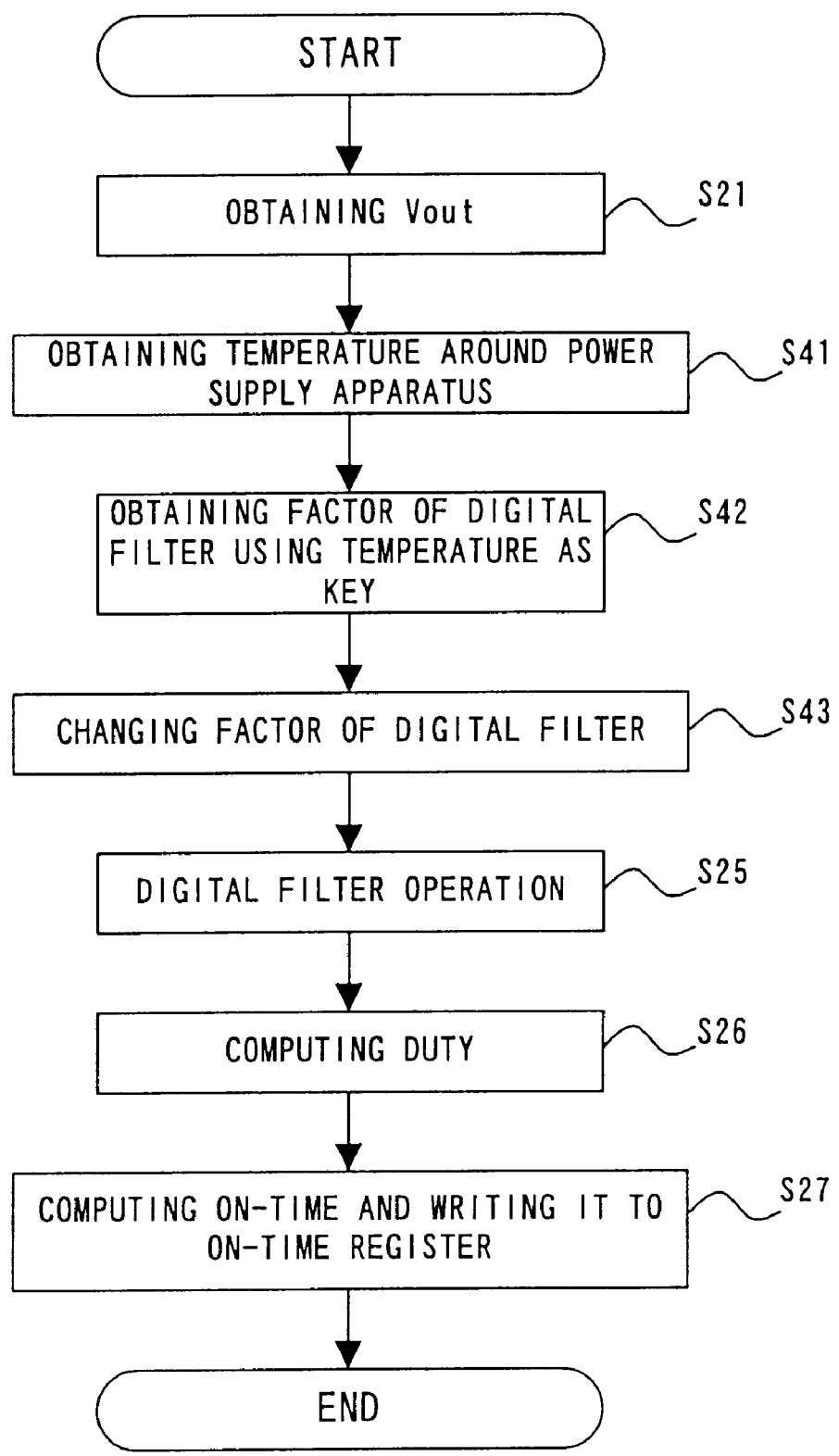
FIG. 19 is a flowchart of the process of controlling an output voltage while changing the characteristic of the amplifier depending on the temperature around the power supply apparatus.

FIG. 19 is a flowchart of the process used to control the output voltage while changing the characteristic of the amplifier depending on the temperature around the power supply apparatus. This process is performed by replacing steps S22 through S24 shown in FIG. 14 with steps S41 through S43. In step S41, the temperature around the power supply apparatus is obtained. This process corresponds to the process of transmitting a polling signal to the multiplexing unit 34, and then reading digital data corresponding to the output current from the A/D conversion unit 35. The temperature around the power supply apparatus is detected by the temperature sensor 46. In step S42, factors A through C are extracted using the temperature data obtained in step S41 as a key. In step S43, the equation relating to the digital filter is updated using each factor extracted in step S42.

In the equation described above, the characteristic of the digital filter 52 is always optimized for the change in temperature around the power supply apparatus. Therefore, an oscillation of the feedback system with a large gain can be suppressed.

A power supply apparatus may be able to change the output voltage to be maintained by the user operation or by an instruction from the CPU of the personal computer including the power supply apparatus. In the power supply apparatus shown in FIG. 10, the settings of the output voltage to be maintained can be switched by the opening or the closing state of the switch SW in the resistor network 81.

When the output voltage to be maintained changes, the gain of the transfer function Ga(s) is reduced by changing the gain of the transfer function F1 as described above. Practically, when the output voltage to be maintained increased, the gain is reduced because the partial pressure ratio of the resistor network 81 drops. Therefore, if the output voltage is overestimated, the precision in output voltage Vout is lowered.

According to the present embodiment, the output voltage is monitored, and the characteristic of the digital filter 52 is optimized according to the voltage. Practically, the factors A through C in the equation (3) above are appropriately selected such that the gain becomes larger when the voltage to be maintained becomes higher.

The relationship between the output voltage of the power supply circuit and the above described factors A through C is preliminarily obtained by simulation, etc., and stored in the table. The configuration of the table is basically the same as the configuration shown in FIG. 13, but the factors A through C are stored using the output voltage as a key. The operation unit 50 periodically detects the output voltage of the power supply apparatus, extracts the factors A through C using the voltage as a key, and updates the equation (3) above.

Figure 20:
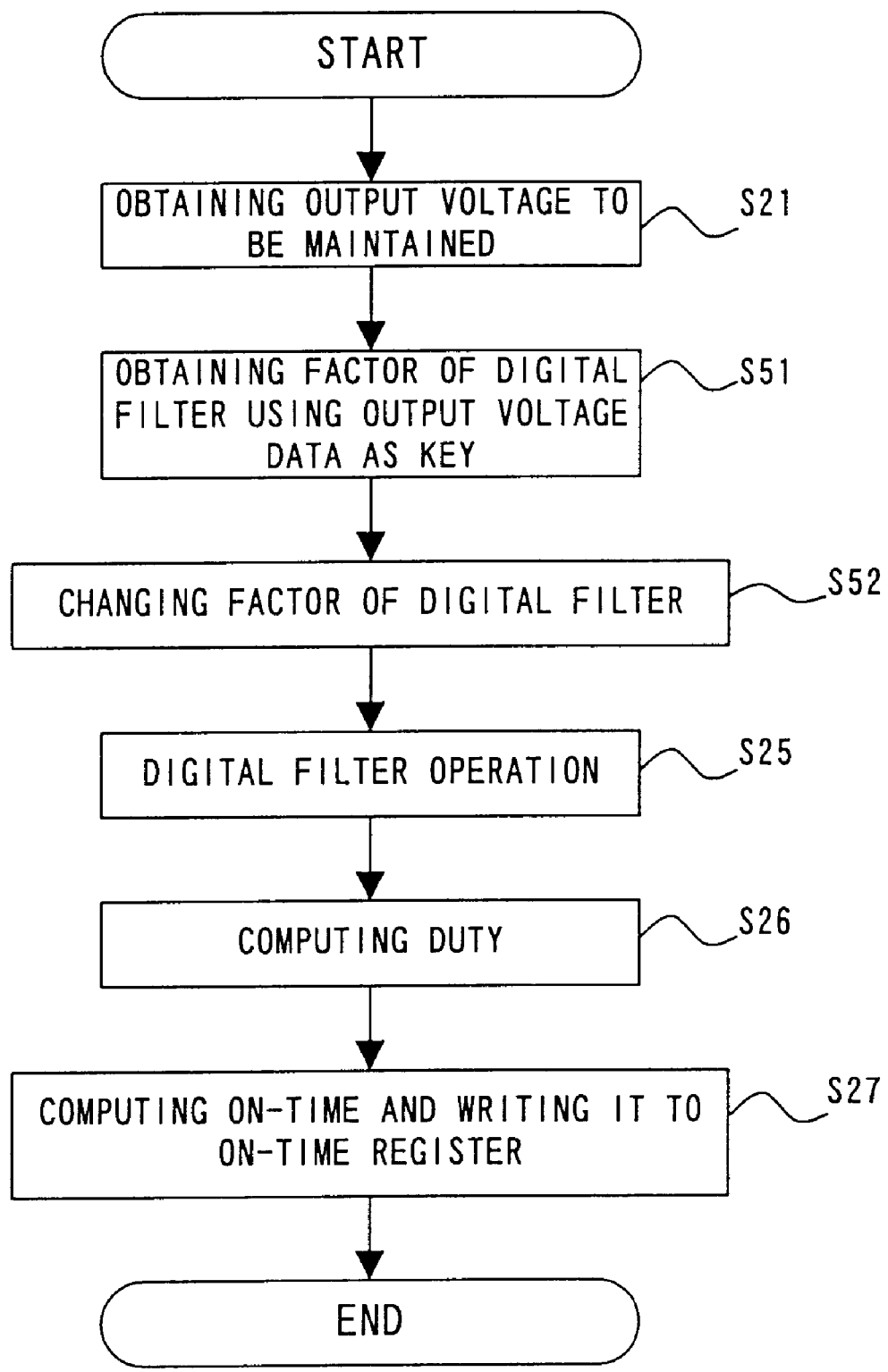
FIG. 20 is a flowchart of the process of controlling an output voltage while changing the characteristic of the amplifier depending on the output voltage Vout of the power supply circuit.

FIG. 20 is a flowchart of the process of controlling the output voltage while changing the characteristic of the amplifier depending on the output voltage Vout of the power supply circuit. This process is performed by replacing steps S22 through S24 shown in FIG. 14 with steps S51 through S52. In step S51, factors A through C are extracted using the output voltage data obtained in step S21 as a key. In step S52, the equation relating to the digital filter is updated using each factor extracted in step S51.

In the above described process, the characteristic of the digital filter 52 is always optimized even if the setting of the output voltage to be maintained by the power supply circuit is changed. Therefore, a large gain can be constantly obtained, and the output voltage can be controlled in high precision.

In the above described embodiment, the characteristic of the digital filter can be changed for any one of the input voltage, output current, environmental temperature, and output voltage as a parameter. However, it is intended that the power supply apparatus according to the present invention be designed to function appropriately even when a plurality of factors change simultaneously.

Second Embodiment

The second embodiment relates to the technology of reducing a digital error and a ripple in the power supply apparatus for digital-controlling the output from the power supply circuit.

The configuration of the power supply apparatus according to the present embodiment is shown in FIG. 4, and digitally computes the on-time (pulse width) of the pulse signal to be provided for the switching element 13 using the output voltage as a feedback signal. Then, a pulse signal with a computed on-time is generated and provided for the switching element 13, thereby maintaining the output voltage of the power supply circuit at a constant value.

However, when an analog parameter such as an output voltage is replaced with digital data, a digital error (quantization error) necessarily occurs. The error can be predicted by the resolution (quantization step) of a digital process. For example, when the resolution of a digital process is 100 ns in a power supply apparatus, and when the computation result of the on-time by the operation unit 50 is 3.34 μs, the PWM unit 11 generates a pulse signal with a pulse width of 3.3 μs or 3.4 μs. Such an error causes a ripple of the output of the power supply apparatus. In the above described example, assuming that the input voltage is 18 volts at maximum and the cycle of the pulse signal is 20 μs, the maximum value of the ripple due to the digital error is represented as follows.

$$V_{ripple} = 18 \text{ V} \times (100 \text{ ns}/20 \text{ μs})$$
$$= 90 \text{ mV}$$

To reduce the ripple, the resolution of the digital process should be enhanced (the number of quantizing steps should be reduced). However, to enhance the resolution, expensive parts are required. The power supply apparatus according to the present embodiment has been developed to solve this problem and suppress the ripple of the output voltage by averaging the digital error without enhancing the resolution in a digital process.

According to the power supply apparatus of the present embodiment, the difference (digital error) between the on-time of a pulse signal computed at a certain timing and the on-time actually generated based on the computed on-time is stored. When the on-time is computed at the next timing, the on-time is corrected such that the stored difference is zero. Hereinafter, the difference is referred to as a barometer.

FIG. 21 shows an example. In this example, the resolution of the digital process of the PWM unit 11 is 100 ns. When the computed on-time is represented in the order of 100 ns, a rounding up operation is performed.

When the on-time is computed by the digital filter operation at time T1, a correction value is obtained by adding a barometer value obtained at time T0 to the computed on-time. In this example, 3.35+(−0.07)=3.28 is obtained. A rounding-up operation is performed on the correction value, and 3.3 is obtained as an on-time to be output to the PWM unit 11. Then, the barometer value at time T1 is computed. The barometer value is obtained as the difference between the correction value of the on-time and the actually output on-time. In the present embodiment, 3.3−3.28=−0.02.

The above described process is hereinafter repeated. Thus, the barometer value is used as data for use in correcting the result in the next operation. Therefore, a digital error can be averaged. The on-time computing cycle is shorter than the response time (for example, a cut-off frequency) of the LC filter of the power supply circuit.

In FIG. 21, a rounding up operation is performed when the computed on-time is in the order of 100 ns. It is obvious that a rounding down operation or a rounding off operation can be performed. FIGS. 22 and 23 show examples of cases where a rounding down operation and a rounding off operation, respectively, are performed.

Figure 24:
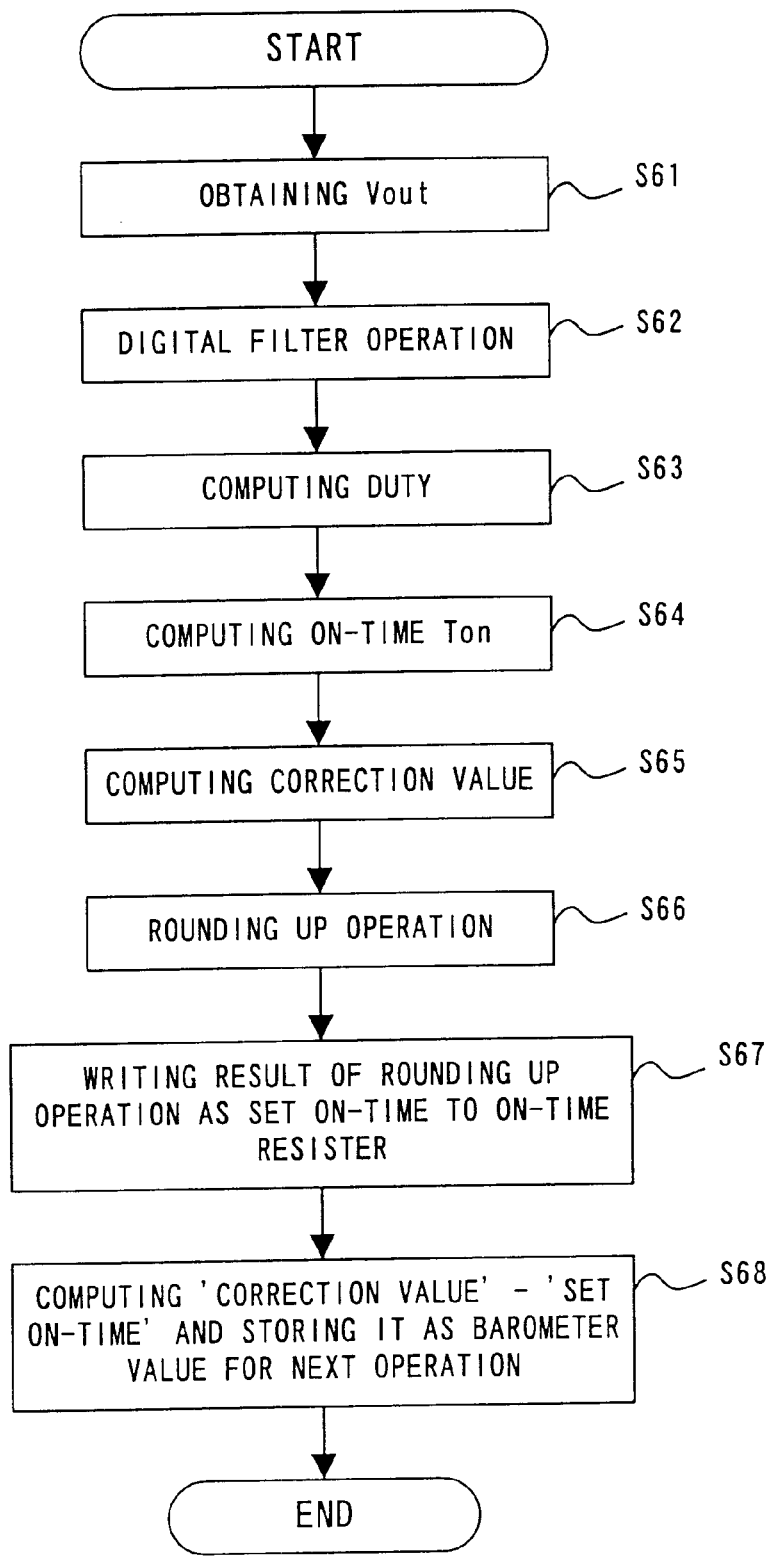
FIG. 24 is a flowchart (of performing a rounding up operation) of the process of averaging a digital error.

FIG. 24 is a flowchart of the process of averaging a digital error. In this process, a rounding up operation is performed in the order of the resolution in the digital process on the on-time computed in the digital operation. This process is performed at predetermined intervals through a timer interruption, etc. The timer interruption cycle is shorter than the response time of the LC filter of the power supply circuit.

Steps S61 through S64 are the same as steps S1 through S9 shown in the flowchart in FIG. 7. The on-time of the pulse signal is computed using the digital filter 52 based on the output voltage Vout of the power supply circuit. In step S65, the on-time computed in step S64 is corrected using the barometer value stored in the preceding process. In step S66, a rounding up operation is performed in the order of resolution in the digital process on the correction value obtained in the process in step S65.

In step S67, the result of the operation in step S66 is defined as the set on-time, and written to the on-time register 62 of the PWM unit 11. In step S68, the difference between the correction value obtained in step S65 and the set on-time written to the on-time register 62 in step S67 is stored as a barometer value for the next process.

Figure 25:
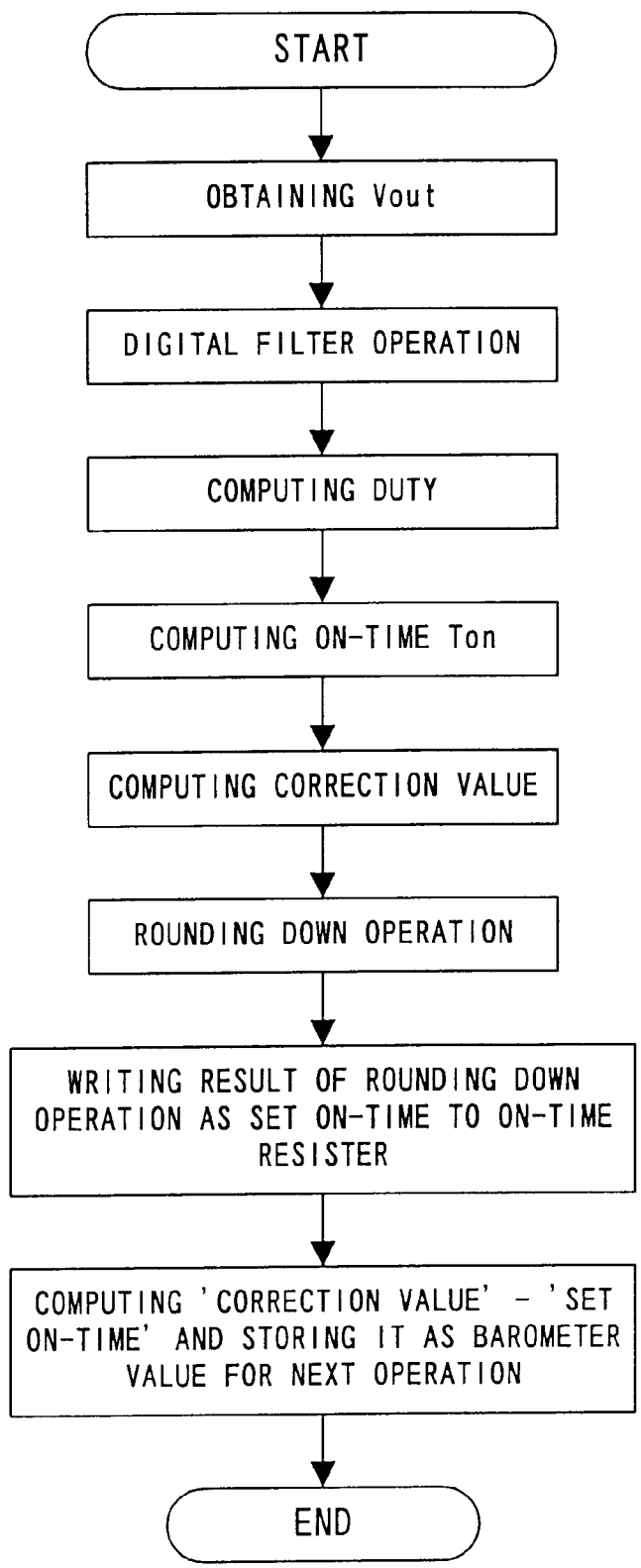
FIG. 25 is a flowchart (of performing a rounding down operation) of the process of averaging a digital error.
Figure 26:
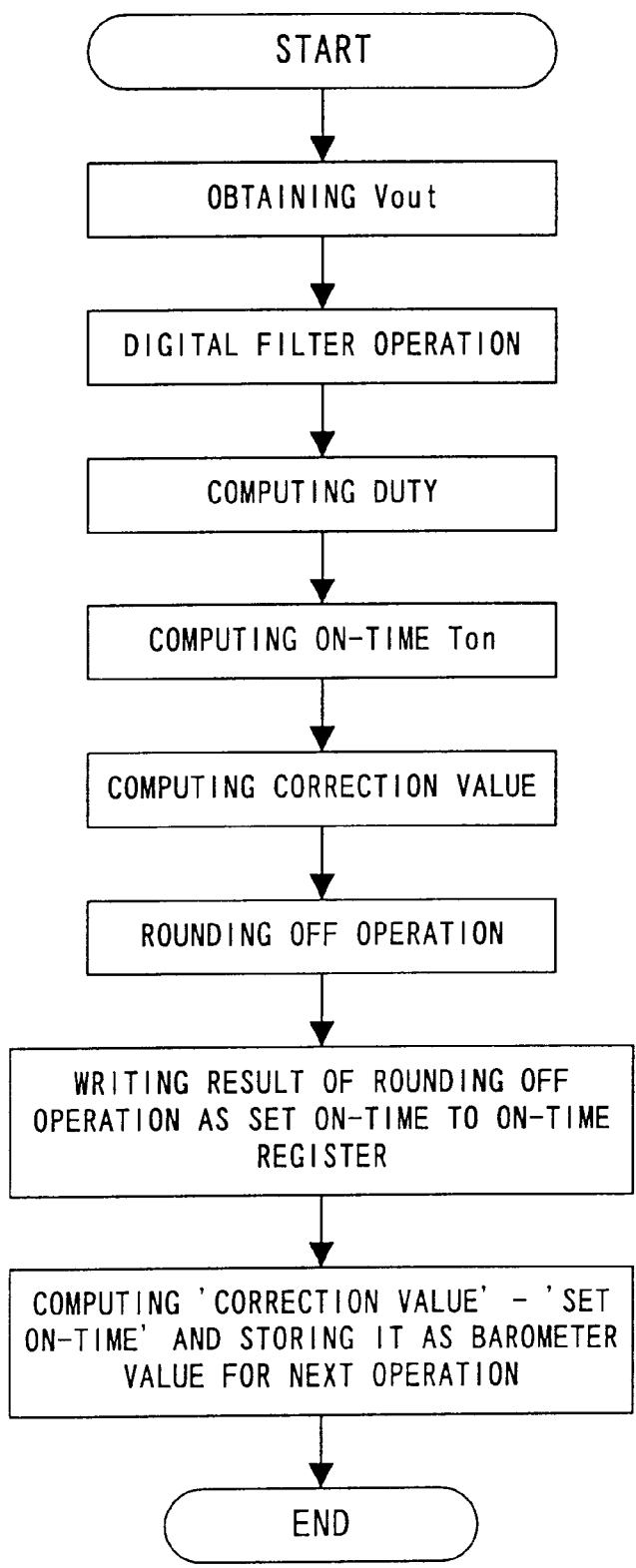
FIG. 26 is a flowchart (of performing a rounding off operation) of the process of averaging a digital error.

FIGS. 25 and 26 are flowcharts of the processes of averaging a digital error when a rounding down operation and a rounding off operation respectively are performed on the computed on-time. The processes according to the flowcharts are basically the same as the processes described by referring to FIG. 24. Therefore, the explanation is omitted here.

It has been experimentally confirmed that a ripple of an output voltage can be reduced by implementing the above described averaging process. The ripple of the output voltage has been lowered to 7 mV under the condition given in the above example (pulse signal cycle: 20 μs; input voltage: 18V; digital resolution: 100 ns).

The embodiment shown in FIGS. 21 through 26 is described assuming that the cycle of the pulse signal provided for the switching element 13 is fixed. However, the digital error can be further reduced by setting the cycle variable.

According to the present embodiment, the duty of a pulse to be generated is determined based on the output voltage of a power supply circuit. Then, an on-time is computed from the predetermined basic cycle and the above described duty. The computed on-time is rounded off in the order of the resolution of the digital process of the PWM unit 11 as in the above example. The on-time obtained in the rounding off contains an error.

According to the present embodiment, the cycle of a pulse signal is corrected such that the computed duty may not be changed when the digital process results in the computed value having an error. A practical example is shown below. In this example, it is assumed that the reference cycle of a pulse signal is 20 μ. Assuming that the duty D=15.75% is obtained by the digital filter operation, the on-time is computed from the above described reference cycle and the duty D.

$$20 \text{ μs} \times 0.1575 = 3.15 \text{ μs}$$

Assuming that the resolution of the PWM unit 11 is 100 ns, 3.2 μs is obtained as the on-time to be written to the on-time register 62 by the rounding off operation. Then, the pulse cycle is corrected such that the on-time to be output and the pulse cycle can maintain the duty obtained by the digital filter operation. That is, the pulse cycle is corrected by the following equation. cycle Ts=on-time to be written to on-time register 62/duty D=3.2 μs÷0.1575=20.3174 μs The pulse cycle obtained by the above described operation is rounded off in the order of the resolution of the digital process of the PWM unit 11. As a result, 20.3 μs is obtained as a pulse cycle to be written to the cycle register 61.

According to the method of the present embodiment, the on-time to be written to the on-time register 62 contains a digital error, but the ratio of the pulse cycle to be written to the cycle register 61 to the on-time to be written to the on-time register 62 is a value close to the duty computed according to the output voltage of the power supply circuit. Therefore, the ripple of the output of the power supply circuit can be minimized.

FIG. 27 is a flowchart of the process of reducing the digital error while changing a pulse cycle. In this example, the reference cycle of a pulse signal is predetermined.

Steps S71 through S73 are the same as steps S1 through S5 in the flowchart in FIG. 7. In step S74, an on-time is computed based on the predetermined pulse cycle and the duty computed in step S73. In step S75, a rounding off operation is performed on the on-time obtained in step S74 in the order of the resolution of the digital process. The operation result is defined as a set on-time.

In step S76, the set cycle is obtained based on the set on-time obtained in step S75 and the duty computed in step S73. Then, in step S77, the set on-time obtained in step S75, and the set cycle obtained in step S76 are written to the on-time register 62 and the cycle register 61, respectively.

In the above described step S75, the rounding off operation is performed, but the rounding up or the rounding down operations can also be performed.

The maximum value of the ripple of the output voltage generated by the method shown in FIG. 27 is estimated as follows. It is assumed that the conditions are the same as those in the above described example (reference cycle of pulse signal: 20 μs, input voltage: 18 volt, and digital resolution: 100 ns).

When a value in the order of 10 μs is 5 in the rounding off operation, an error indicates the maximum value. Therefore, it is assumed that the computed on-time is 3.05 μs. In this case, 3.1 μs is written to the on-time register 62. In addition, since the duty of the pulse signal is 3.05/20, the correction value of the pulse cycle is obtained by the following equation.

$$Ts = 20 \text{ μs} \times (3.1 \text{ μs} / 3.05 \text{ μs})$$
$$= 20.327 \text{ μs}$$
$$\rightarrow 20.3 \text{ μs (as rounded off)}$$

Therefore, the duty of the pulse signal actually generated by the PWM unit 11 is obtained as follows.

$$D = 3.1 \div 20.3 = 0.1527$$

The duty computed in the digital filter operation is output as follows.

$$D = 3.05 \div 20 = 0.1525$$

Therefore, the duty error is 0.13%, and the ripple of the output voltage is obtained as follows.

$$Vripple = 18 \text{ volt} \times (0.1525 - 0.1527)$$
$$= -3.6 \text{ mV}$$

According to the above described embodiment, the method shown in FIGS. 21 through 26 and the method shown in FIG. 27 are described separately. However, these methods can be combined. For example, when the process in the flowchart shown in FIG. 24 is combined with the process in the flowchart shown in FIG. 27, the on-time to be written to the on-time register 62 is first determined, and then the processes in steps S76 and S77 are performed.

Third Embodiment

The third embodiment relates to the technology of reducing the power consumption by changing the operation of the power supply apparatus, which itself depends on the current demanded by a load. More specifically, it relates to the technology of reducing the power consumption by changing the operation of the power supply apparatus itself when a personal computer, etc. is switched from the normal operation mode to the suspend mode (or sleep mode).

When a personal computer, etc. enters a suspend mode, the consumed current is considerably reduced with no substantial fluctuation in the consumed current. In this case, the output current of the power supply apparatus mounted in the personal computer is significantly reduced with no substantial fluctuation in the output current. Under the condition that the output current is thus reduced and small in fluctuation, the load (personal computer, etc.) is not seriously affected even if the response speed of the power supply apparatus is low.

When the power supply apparatus according to the present embodiment detects that the load has entered the suspend mode, it reduces the current consumption of the power supply apparatus itself by lowering the gain and lengthening the cycle of sampling the parameter relating to the output of the power supply apparatus.

Figure 28:
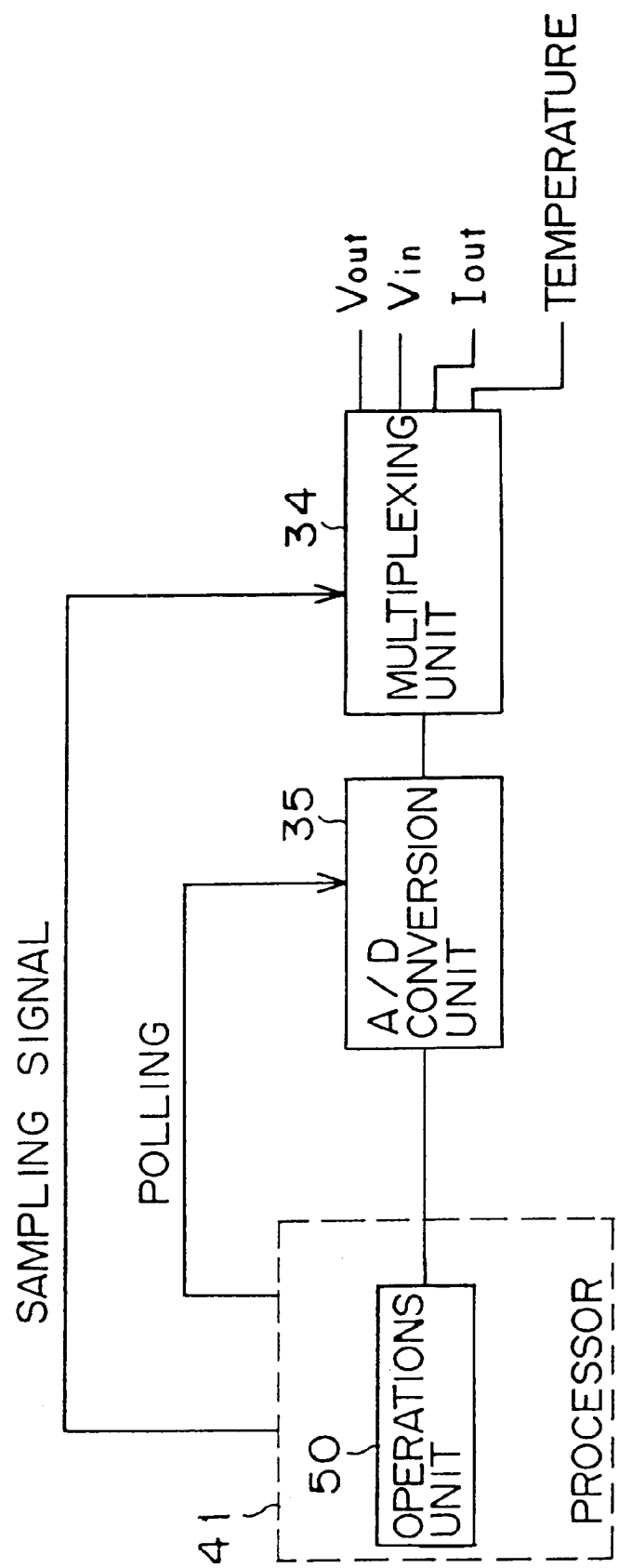
FIG. 28 shows the function of collecting various parameters.

FIG. 28 shows the function of collecting various parameters in the power supply apparatus according to the present embodiment. Parameters such as the output voltage Vout, the output current Iout, and the input voltage Vin of the power supply circuit, the temperature in the vicinity of the power supply apparatus, etc. are input to the multiplexing unit 34 as described above by referring to FIG. 2 or 4. The multiplexing unit 34 sequentially outputs parameters input according to the sampling signal from the processor 41. The sampling cycle is, for example, described in the program executed by the processor 41, or preliminarily set in the ROM 42. The processor 41 outputs a sampling signal for each sampling cycle, and the multiplexing unit 34 transmits the parameter input according to the sampling signal to the A/D conversion unit 35.

The A/D conversion unit 35 converts a parameter input from the multiplexing unit 34 into digital data. The output from the A/D conversion unit 35 is read by the processor 41 in a polling process. The polling cycle is basically equal to the sampling cycle, but can be set independently of the sampling cycle.

The process of the flowchart shown in FIG. 7 is performed in synchronization with a sampling signal and the polling process. In this case, the duty of a new pulse signal is determined each time each parameter is sampled, and the PWM unit 11 generates a pulse signal according to the newly determined duty.

FIG. 29 shows a part of the program executed by the processor. The program executed by the processor 41 contains programs to be executed in the normal mode and in the suspend mode. Each program contains an equation describing the feature of the digital filter, a sampling cycle, and a polling cycle.

Figure 30:
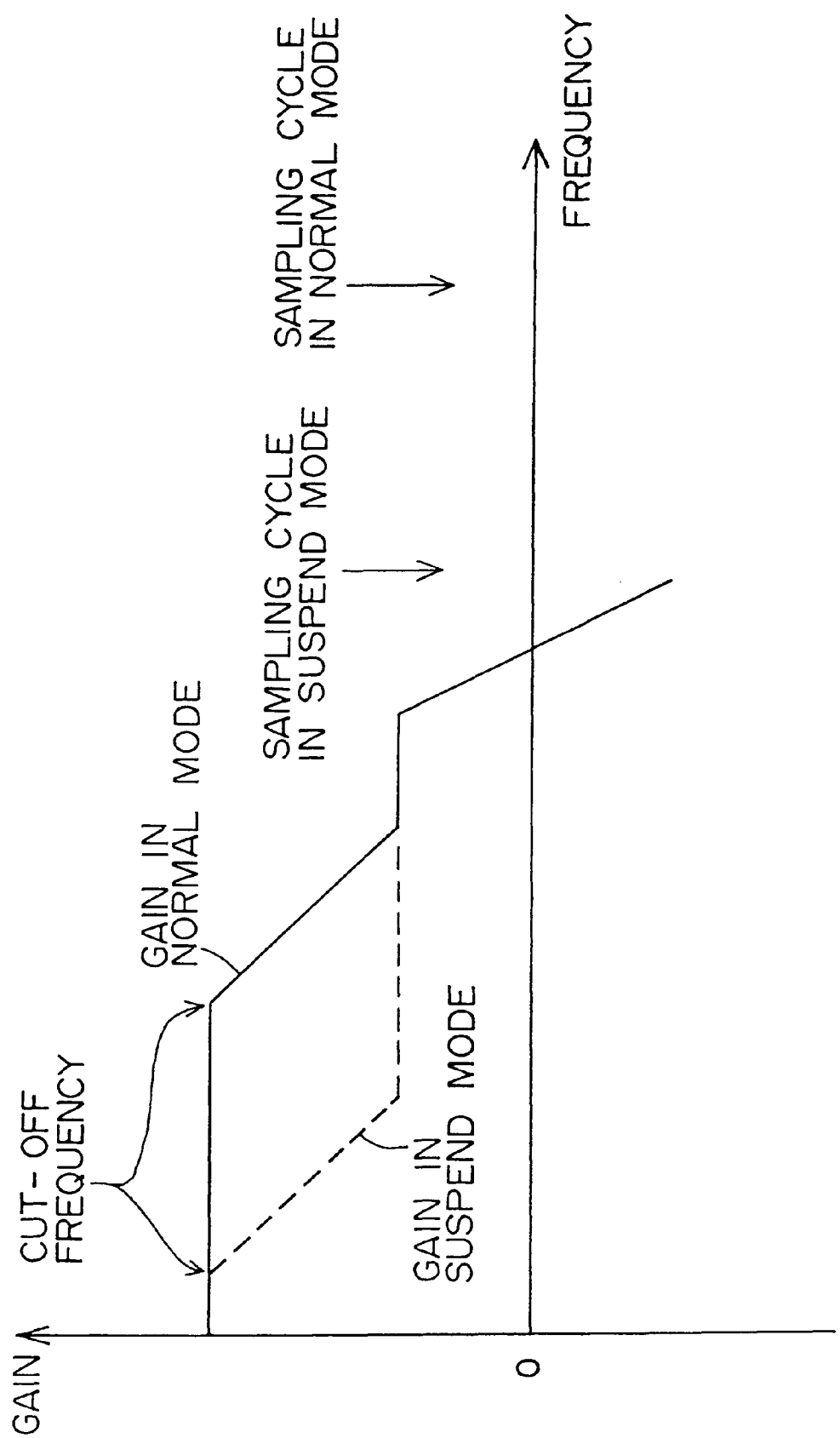
FIG. 30 shows the gain of the power supply apparatus obtained when a load is in the normal mode and the suspense mode.

A feature of the digital filter is described by the equation (3) above (containing the equations (4) through (6)). Equations described in a normal mode program and a suspend mode program are different from each other in factors A through C. Practically, the cut-off frequency defined by the equation described in the suspend mode program is lower than the cut-off frequency defined by the equation described in the normal mode program. FIG. 30 shows the gain of the power supply apparatus obtained by these two programs.

Both sampling cycle and polling cycle depend on the operation mode of a load. That is, the sampling cycle and the polling cycle described in the suspend mode program are shorter than the sampling cycle and the polling cycle described in the normal mode program. Practically, for example, each cycle in the normal mode is set to 50 μS, and each cycle in the suspend mode is set to 500 μs through 5 m.

Figure 31:
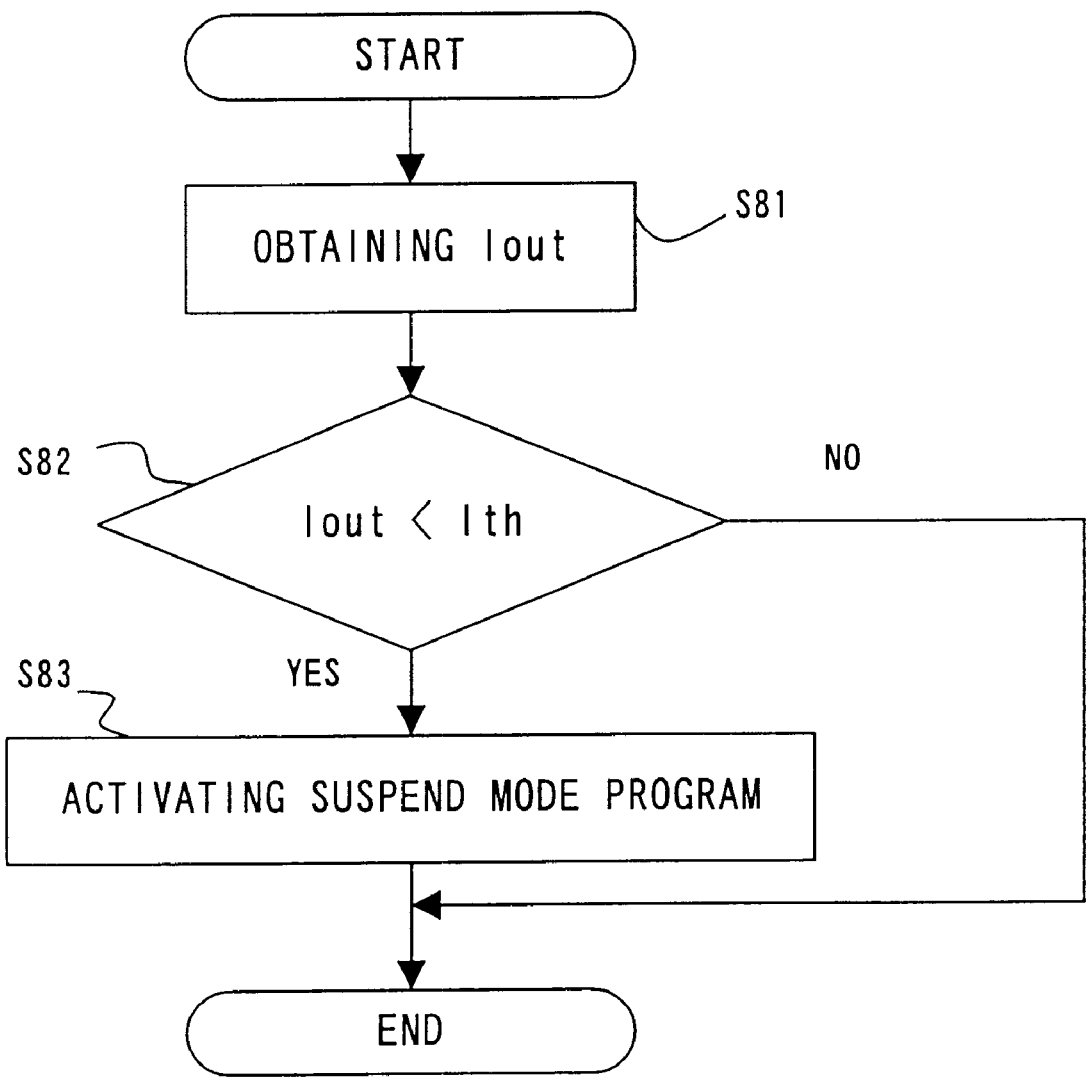
FIG. 31 is a flowchart of the process of switching the operation of the power supply apparatus depending on the operation mode of the load.

FIG. 31 is a flowchart of the process of switching the operations of the power supply apparatus depending on the operation mode of a load. The processes are performed for each sampling cycle, or the processes of the flowchart shown in FIG. 7 are performed in parallel. In this example, the processes are performed while the power supply apparatus is executing a normal mode program.

In step S81, the output current Iout of the power supply circuit is obtained. Then, in step S82, it is determined whether or not the output current Iout obtained in step S81 is weaker than a predetermined threshold current Ith. The threshold current Ith is a reference value for determining whether or not a load is operating in the normal mode or the suspend mode.

If the output current Iout is weaker than the threshold current Ith, then it is assumed that the load has entered the suspend mode, and a suspend mode program is activated in step S83. When the suspend mode program is activated, the sampling cycle and the polling cycle are shortened, and the gain of the power supply apparatus is reduced. If the output current Iout is equal to or stronger than the threshold current Ith, then it is assumed that the load is operating in the normal mode, and step S83 is omitted.

As described above, when the sampling cycle is extended, the frequency of the execution of the converting process by the A/D conversion unit 35 decreases. Therefore, the power consumption at the A/D conversion unit 35 is reduced. Furthermore, when the polling cycle is extended, the frequency of performing the operations by the processor 41 decreases as shown in FIG. 32, and the wait time is prolonged, thereby reducing the power consumption of the processor 41.

In the example above, the operations of the power supply apparatus are switched when the output current Iout becomes weaker than the threshold current Ith. However, the operations of the power supply apparatus can be switched according to other triggers. For example, some CPUs have a function to notify the power supply apparatus of the switch of the operation modes of the power supply apparatus. For such a load, the power supply apparatus switches the operations according to the notification of the load.

When it is determined that the load has entered the suspend mode in the above described example, the operations of the power supply apparatus are immediately switched. However, when it is actually detected that the load has entered the suspend mode, the normal mode program and the suspend mode program are first executed in parallel. Then, the operation result of the normal mode program is output to the PWM unit 11 until the operation result of the normal mode program and the operation result of the suspend mode program match each other, or until a predetermined time has elapsed since the suspend mode program was activated. Then, the operation result of the suspend mode program is output to the PWM unit 11. Then, the execution of the normal mode program is stopped. With the configuration above, stable control can be secured even at a timing when the operations of the power supply apparatus are switched.

When a polling cycle is set long, a suspend mode program indicates small power consumption. Therefore, the suspend mode program shows a slight increase in power consumption for the entire power supply apparatus even if it continues functioning regardless of the operation mode of the load. With the configuration, the operations of the power supply apparatus can be immediately switched.

FIG. 33 shows the sequence of the process of switching the operations according to the notification from the load. In this example, it is assumed that the load (CPU, etc.) is operating in the normal mode, and the power supply apparatus is executing a normal mode program. In the normal mode program, a high-speed response digital filter is used. On the other hand, in the suspend mode program, a low-speed digital filter is used. Therefore, the each program is described as HF and LF in FIG. 33.

When a load transfers its operation mode from the normal mode to the suspend mode, it first notifies the power supply apparatus of the transfer. After the notification, the load is immediately switched to the suspend mode. When the power supply apparatus receives the above described notification from the load, the power supply apparatus activates a suspend mode program. Then, the normal mode program and the suspend mode program are executed in parallel until the operations of the suspend mode program become stable. While the programs are executed in parallel, the normal mode program outputs its operation result to the PWM unit 11. When the operation result from the normal mode program matches the operation result of the suspend mode program, or when a predetermined time has elapsed since the suspend mode program was activated, it is assumed that the operations of the suspend mode program become stable.

When the operations of a suspend mode program become stable, the power supply apparatus outputs an operation result to the PWM unit 11 through the suspend mode program, and ends the normal mode program.

According to the above described sequence, stable control can be secured even at a timing when the operations of the power supply apparatus are switched.

Figure 34:
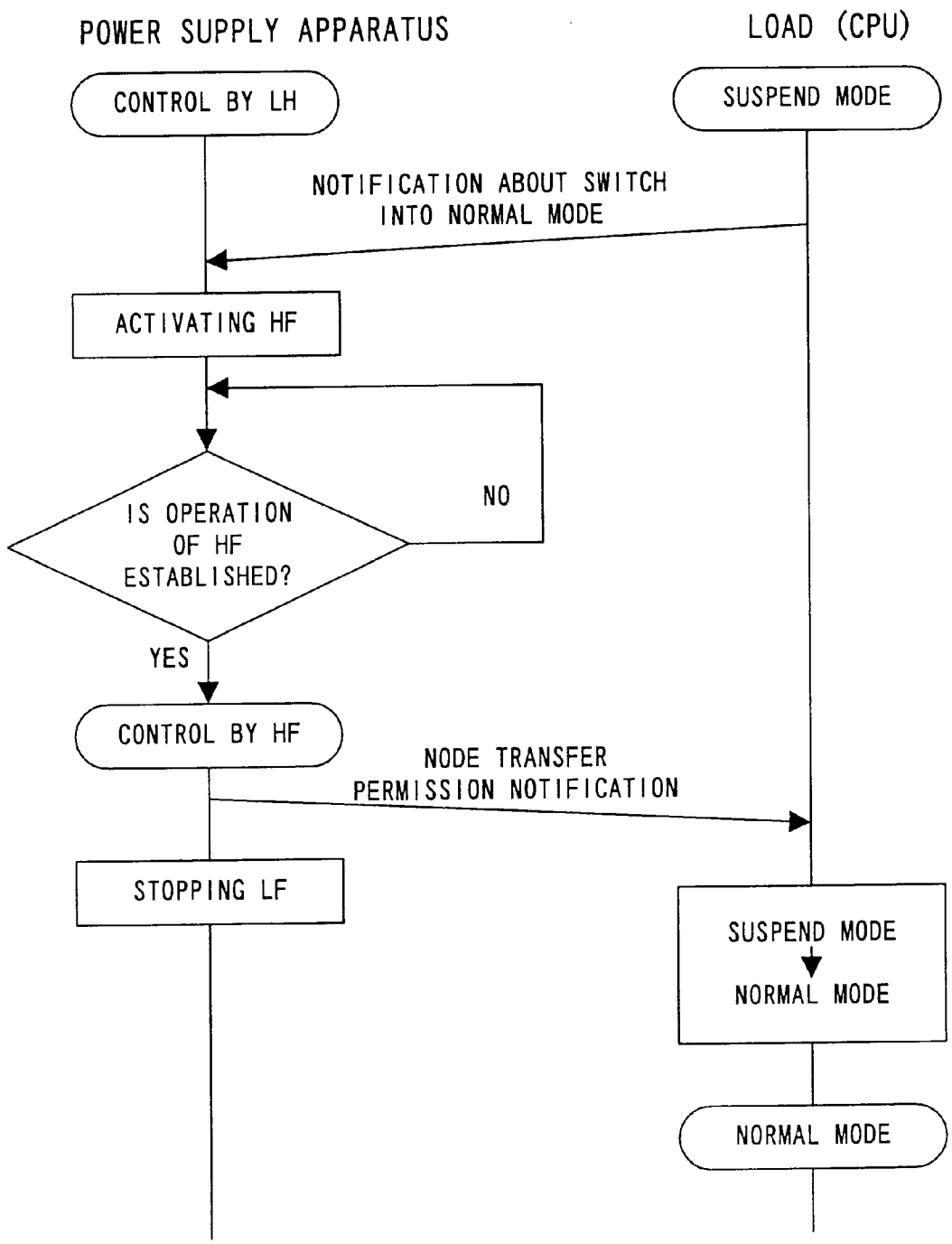
FIG. 34 shows the sequence (2) of the process of switching the operation according to a notice from the load.

FIG. 34 shows the sequence of the process of switching the operations according to a notification from a load, and shows the case where the load is returned from the suspend mode to the normal mode. Therefore, it is assumed that the power supply apparatus is executing a suspend mode program.

When the load transfers its operation mode from the suspend mode to the normal mode, it first notifies the power supply apparatus of the transfer. Then, the load waits for mode transfer permission notification from the power supply apparatus.

When the power supply apparatus receives the notification from the load, it activates a normal mode program, and waits for the stable operation of the program. When the operation of the normal mode program stabilizes, the power supply apparatus outputs the operation result of the normal mode program to the PWM unit 11, and transmits a mode transfer permission notification to the load. The load receives the notification, and transfers the operation mode from the suspend mode to the normal mode.

Thus, when the load transfers from a small current consumption mode to a large current consumption mode, it actually switches the modes after the operations of the power supply apparatus are completely switched. In this sequence, the malfunction of the load can be prevented.

The conventional power supply apparatus in the PWM system indicates a constant switching frequency regardless of the operating state. Therefore, even if the output current of the power supply apparatus becomes weak, the loss in a switching element is equal to the loss indicated when an output current is strong, that is, the efficiency is low. The embodiment described below has been developed to solve the problem.

According to the present embodiment, the switching frequency is lowered when an output current becomes weak.

However, it is necessary to heighten the switching frequency so it is much greater than the cut-off frequency of the LC filter. According to the present embodiment, the switching frequency is 100 times as high as the cut-off frequency of the LC filter.

Figure 35:
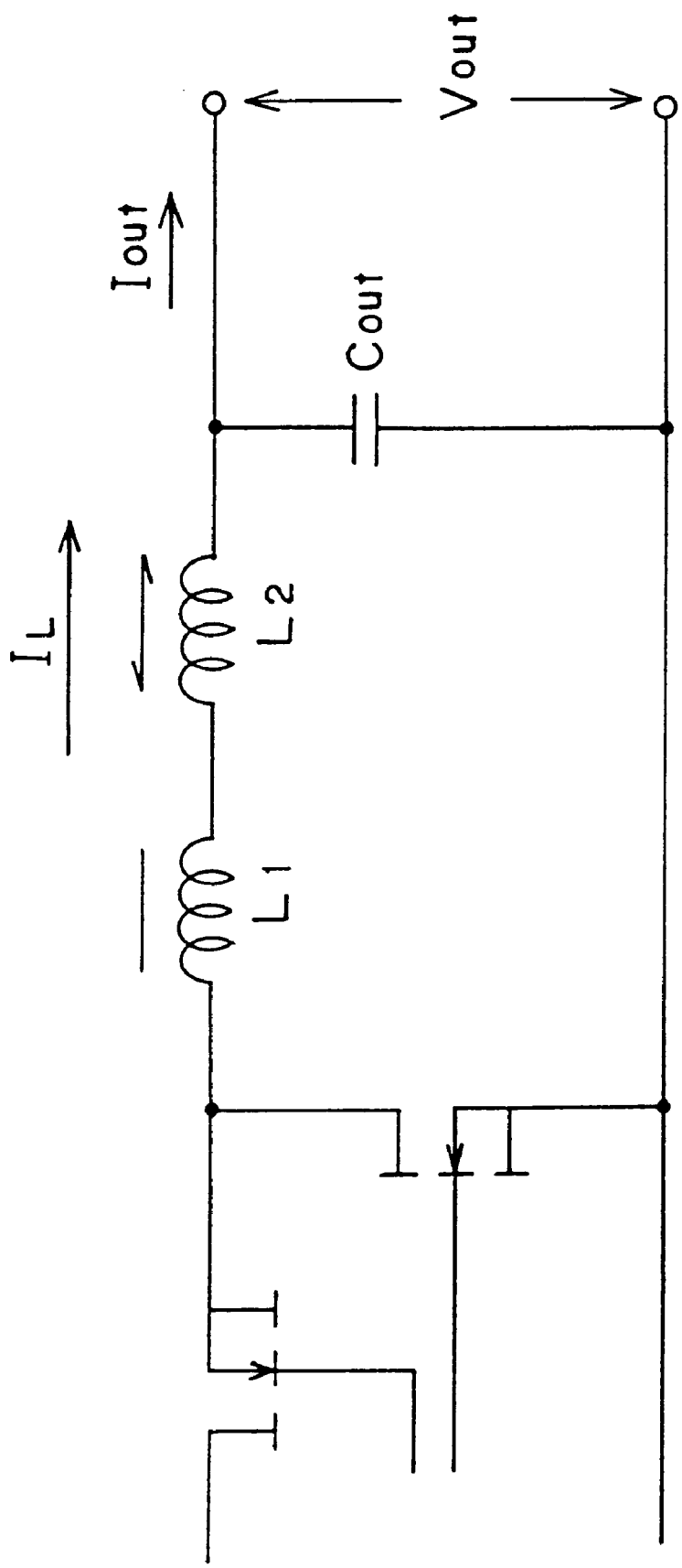
FIG. 35 shows the LC filter using an amorphous core coil and a saturable coil.

Therefore, when the switching frequency is lowered, the cut-off frequency of the LC filter also has to be lowered. According to the present embodiment, an inductor forming part of an LC filter changes with an electric current. The inductor to be used is, for example, an amorphous core coil. As shown in FIG. 35, a saturable coil L2 can be connected in series to the amorphous core coil L1.

Figure 36A:
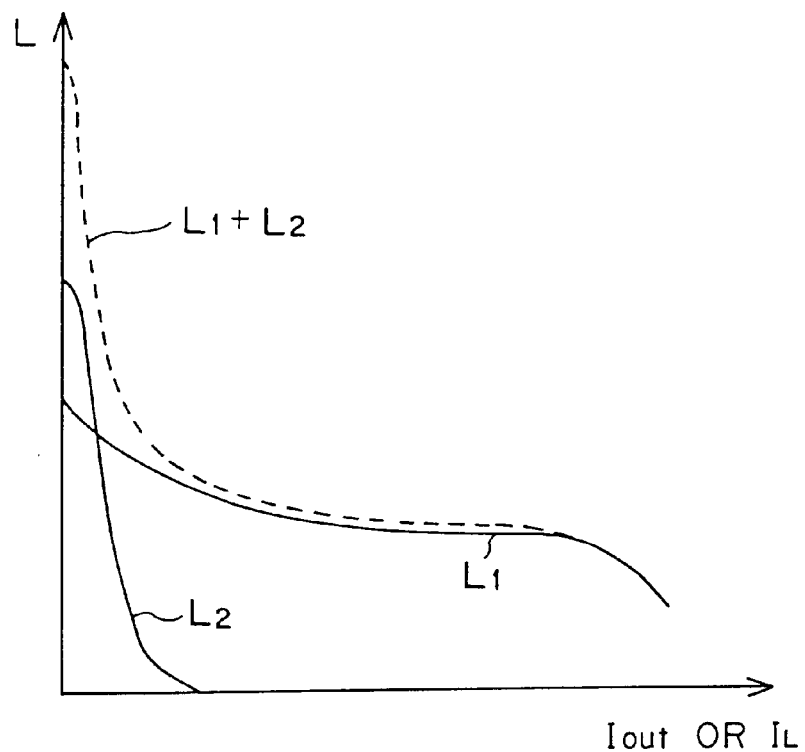
FIG. 36A shows the current dependency of the inductance.

FIG. 36A shows the current dependency of the inductance of the amorphous core coil L1 and the saturable coil L2. The amorphous core coil L1 has the characteristic that its inductance becomes smaller as an electric current becomes stronger. The saturable coil L2 has the characteristic that its inductance suddenly increases when an electric current drops.

Figure 36B:
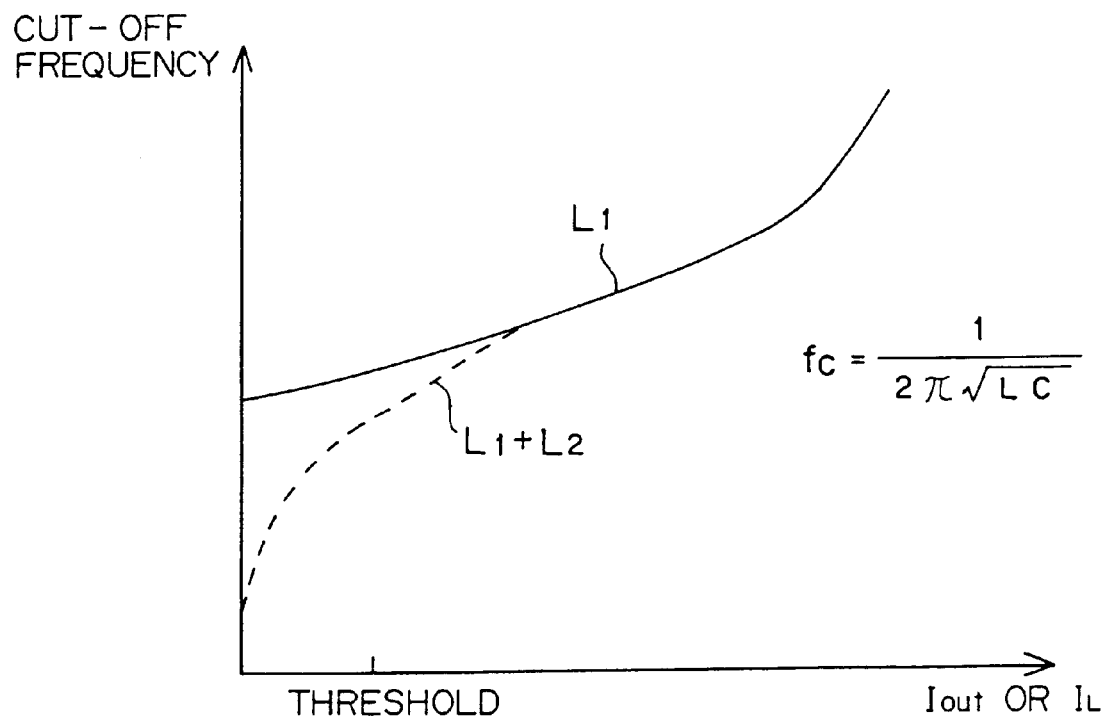
FIG. 36B shows the current dependency of the cut-off frequency of the LC filter.

FIG. 36B shows the cut-off frequency of an LC filter provided with the amorphous core coil L1 and the saturable coil L2. The cut-off frequency of the LC filter moderately decreases as the output current Iout becomes weaker when only the amorphous core coil L1 is provided as an inductor. When the amorphous core coil L1 and the saturable coil L2 are provided, the output current Iout decreases rapidly in the range in which it is smaller than a predetermined value. While a current consumption of a load is small (for example, the suspend mode of the CPU), the power supply apparatus has a small influence on the load even if the response speed of the control of the output voltage is low as described above.

The power supply apparatus according to the present embodiment changes the switching frequency with the output voltage Iout in the software process. Practically, it preliminarily obtains and stores information about the relationship between the output current Iout and the cut-off frequency of the LC filter (refer to FIG. 36B). Then, the power supply apparatus periodically monitors the output current, extracts the cut-off frequency corresponding to the monitored current value, and obtains the switching frequency from the cut-off frequency.

FIG. 37 is a flowchart of the process of changing the switching frequency according to the output current. This process is performed at predetermined intervals by a timer interruption, etc.

In step S91, the output current Iout is obtained. In step S92, the cut-off frequency fc of the LC filter is determined based on the output current Iout. This process retrieves a cut-off frequency from the memory in which the graph shown in FIG. 36B is stored. In step S93, the switching frequency fsw is computed from the cut-off frequency fc obtained in step S92. This process refers to, for example, an operation by multiplying the cut-off frequency fc by 100. In step S94, the pulse cycle is determined from the switching frequency fsw computed in step S93, and the pulse cycle is written to the cycle register 61 of the PWM unit 11. The pulse cycle is the inverse value of the switching frequency fsw.

Afterwards, the PWM unit 11 provides a pulse signal of an updated pulse cycle for a generated switching element 13.

Figure 38:
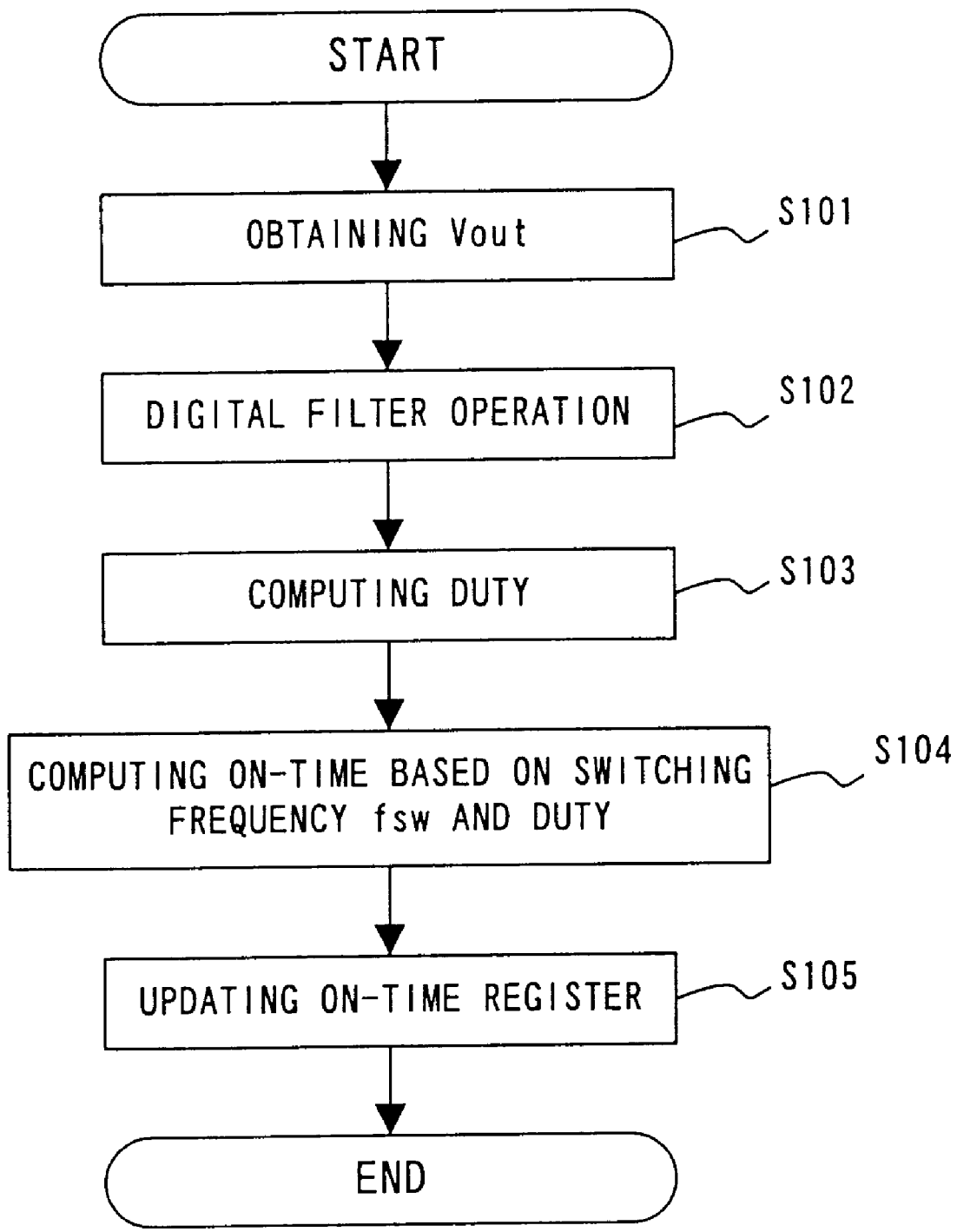
FIG. 38 is a flowchart of the process of computing the on-time of the pulse signal according to the updated switching frequency.

FIG. 38 is a flowchart of the process of computing the on-time of the pulse signal according to the updated switching frequency. This process is a variation of the flowchart shown in FIG. 7.

Steps S101 through S103 are the same as steps S1 through S5 shown in FIG. 7. In these steps, the duty of a pulse signal is obtained. In step S104, the on-time of a pulse signal is computed according to the switching frequency fsw computed in step S93 and the duty obtained in step S103. It is assumed that the switching frequency fsw computed in step S93 shown in FIG. 37 or the pulse cycle obtained from the switching frequency fsw is stored in the operations unit 50. In step S105, the on-time register 62 of the PWM unit 11 is updated using the on-time computed in step S104.

In the above described processes, the power supply apparatus lowers the switching frequency when the output current becomes weaker. Therefore, when the output current is weak, the loss in the switching element 13 is small. Especially when the saturable coil L2 is used as an LC filter, the cut-off frequency becomes very low if the output current of the power supply apparatus is smaller than a predetermined value, thereby considerably lowering the switching frequency. Thus, a switching loss can be successfully reduced.

The simplest method of realizing the power supply apparatus according to the above described embodiment is to determine whether the load is operated in the normal mode or the suspend mode, and to set the switching frequency to a small value when it is operated in the suspend mode.

The power supply apparatus according to the present embodiment realizes a configuration of a synchronous type. This configuration can be realized by replacing the rectifying diode shown in FIG. 4 with the switching element 15. Respective diodes are connected in parallel with the switching elements 13 and 15.

Figure 39A:
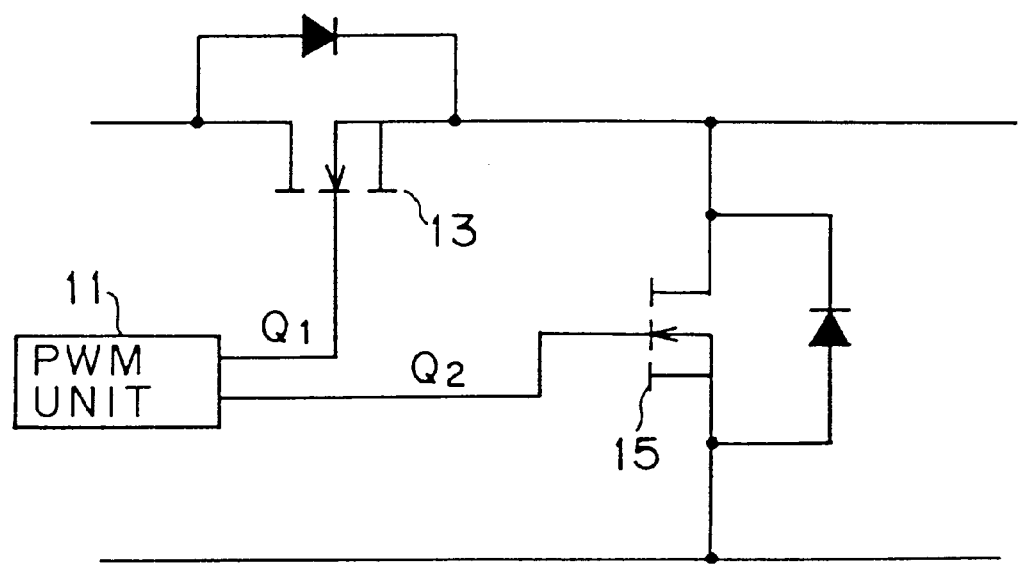
FIG. 39A shows the characteristic part of the synchronous power supply circuit.
Figure 39B:
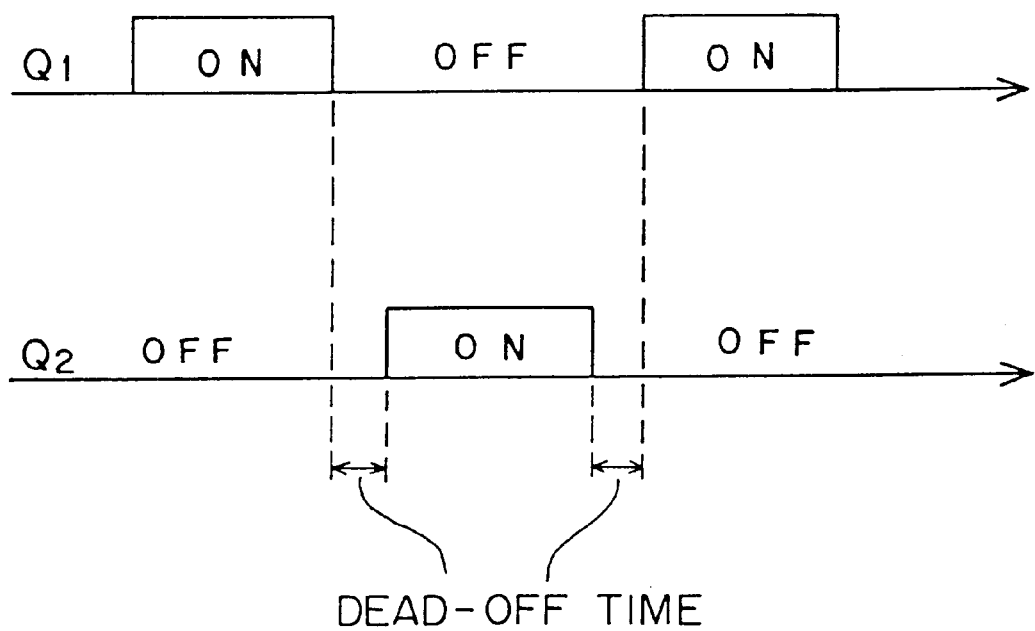
FIG. 39B shows the dead-off time.

The pulse signals given to the switching elements 13 and 15 are inverse to each other so that the two elements cannot be simultaneously set to an ON state. These two pulse signals are generated by the PWM unit 11. However, since the switching time of the switching elements 13 and 15 is limited, a dead-off time shown in FIG. 39B is defined for the pulse signals.

However, the switching speed of the switching elements 13 and 15 changes with the temperature in the vicinity of the power supply apparatus, the input voltage, the output current, etc. Therefore, the dead-off time contains a margin.

At the dead-off time, an electric current flows through the parasitic diodes of the switching elements 13 and 15, and the shot key barrier diode connected in parallel with the switching elements 13 and 15. However, the on resistance of these diodes is considerably higher than that of the switching elements 13 and 15 in the ON state. Therefore, at the dead-off time, a loss is large.

To solve the above described problem, the power supply apparatus according to the present embodiment preliminarily obtains information on the temperature dependency, the input voltage dependency, and the current dependency of the switching speed of a switching element, stores the information, and corrects the dead-off time based on the stored information such that the dead-off time refers to the smallest possible value.

Figure 40:
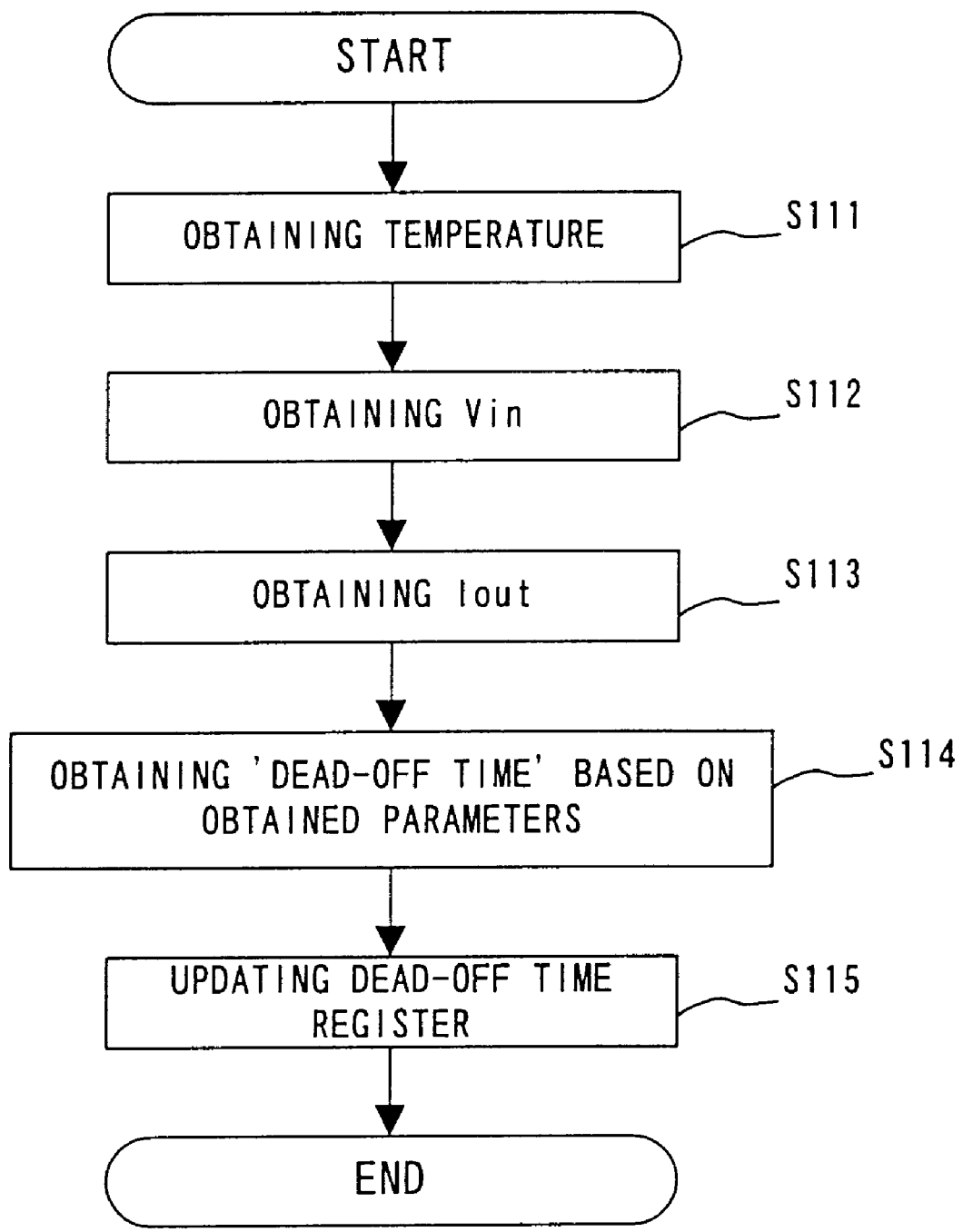
FIG. 40 is a flowchart of the process of adjusting the dead-off time.

FIG. 40 is a flowchart of the process of adjusting the dead-off time. The process is performed at predetermined intervals by a timer interruption, etc.

In steps S111 through S113, the temperature in the vicinity of the power supply apparatus, the input voltage Vin, and the output current Iout are obtained. In step S114, the dead-off time is obtained based on the parameters obtained in steps S111 through S113. It is assumed that the temperature dependency, the input voltage dependency, and the current dependency of the switching speed of the switching elements 13 and 15 are already known, and the shortest dead-off time determined based on the characteristics is stored in memory. In step S115, the dead-off time obtained in step S114 is written to a dead-off time register 65 of the PWM unit 11 shown in FIG. 41A.

Figure 41A:
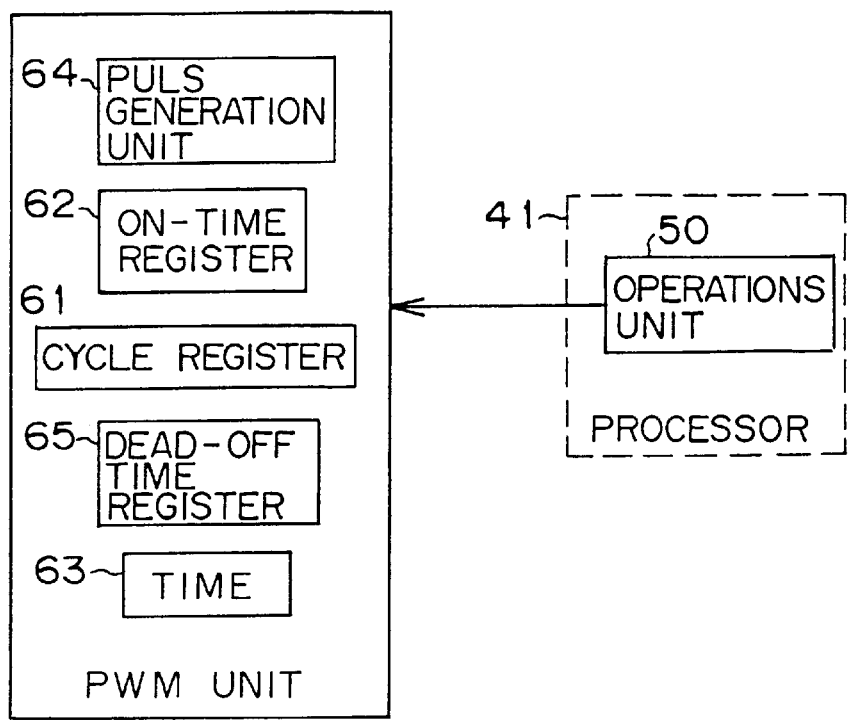
FIG. 41A shows the configuration of the PWM unit.
Figure 41B:
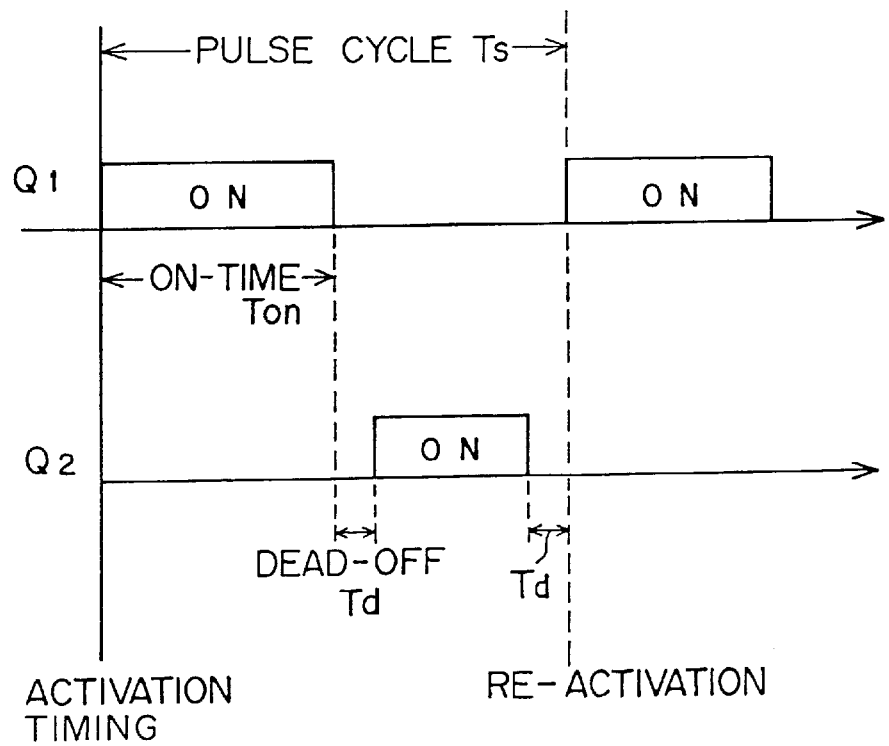
FIG. 41B shows the pulse signal generated by the PWM unit shown in FIG. 41A.
Figure 42:
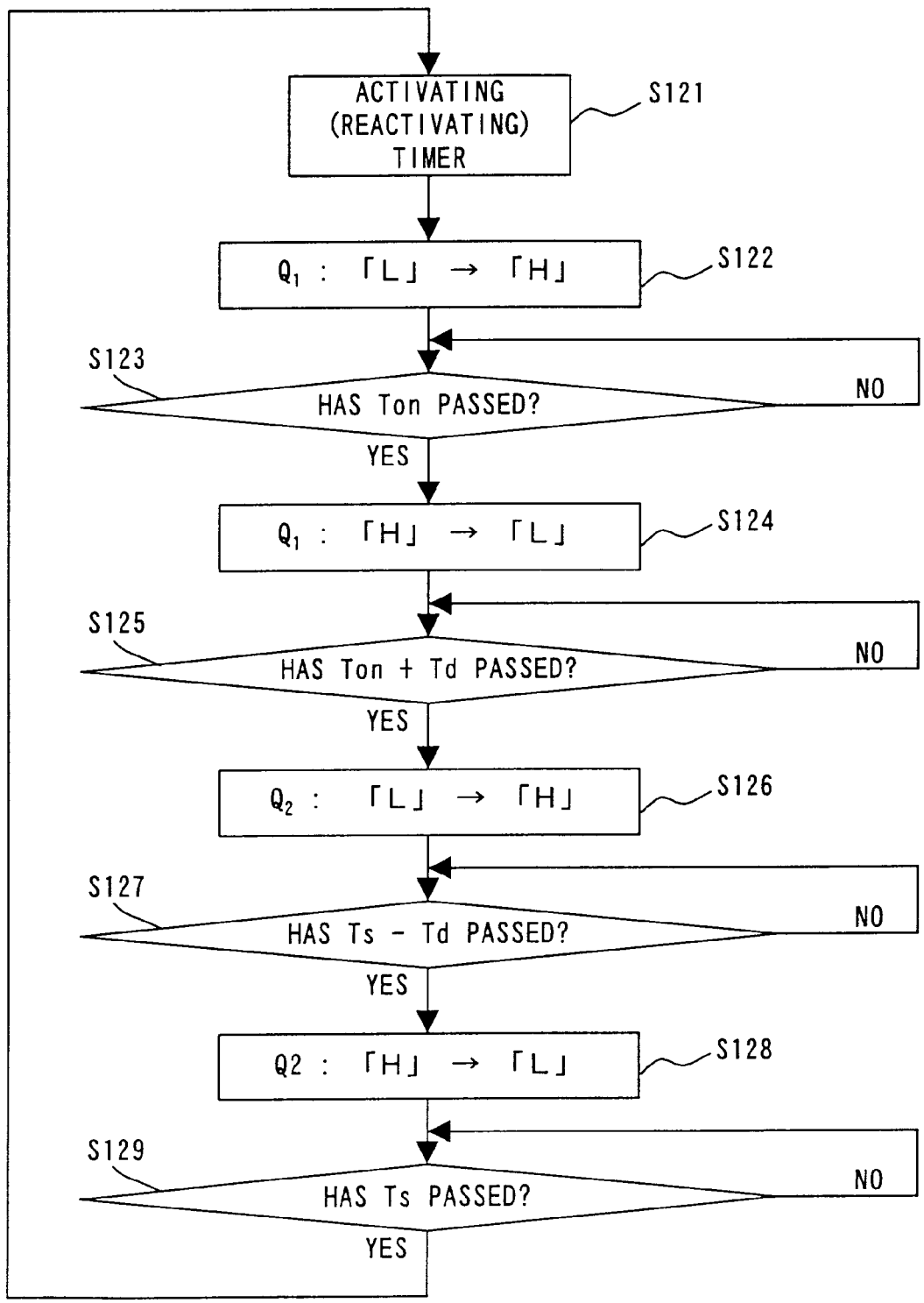
FIG. 42 is a flowchart of the operation of the PWM unit shown in FIG. 41A.

FIG. 42 is a flowchart showing the operation of the PWM unit 11 shown in FIG. 41A. The flowchart shows the process of generating the pulse signals Q1 and Q2 shown in FIG. 41B. The pulse signal Q1 is provided for the switching element 13, and the pulse signal Q1 is provided for the switching element 15.

When the timer 63 is activated (or re-activated) in step S121, the pulse signal Q1 is switched from an L level to an H level in step S122. At this time, the pulse signal Q2 is assumed to indicate the L level. In step S123, monitoring is performed to determine whether the elapsed time from the activation of the timer has reached the on-time Ton. When the monitor time elapses, the pulse signal Q1 is switched from the H level to the L level in step S124.

In step S125, monitoring is performed to determine whether the elapsed time from the activation of the timer has reached 'on-time Ton+dead-off time Td'. When the monitor time elapses, the pulse signal Q2 is switched from the level L to the H level in step S126. In step S127, monitoring is performed to determine whether the elapsed time from the activation of the timer has reached 'pulse cycle Ts−dead-off time Td'. When the monitor time elapses, the pulse signal Q2 is switched from the level H to the L level in step S128. In step S129, monitoring is performed to determine whether the elapsed time from the activation of the timer has reached 'pulse cycle Ts'. When the monitor time elapses, control is returned to step S121.

By repeating the above described processes, the pulse signal shown in FIG. 41B is generated. The dead-off time is the smallest value depending on the temperature, input voltage and current. Therefore, the period in which an electric current flows through the diode, etc., shown in FIG. 39A, can be shortened, thereby reducing a loss.

According to the third embodiment of the present invention, the operation of the power supply apparatus is changed when the current consumption of the load becomes small. There are other configurations with which the reference value Vref of a digital filter can be made small when it is detected that the current consumption of a load has become small.

According to the above described embodiment of the present invention, a power supply circuit is designed to maintain a constant value of an output voltage through PWM. However, the present invention is not limited to this configuration. The present invention can be, for example, applied to a power supply circuit for controlling the output voltage through PFM (pulse frequency modulation).

According to the present invention, the output of a power supply circuit is controlled by software. Therefore, the characteristic and specification can be flexibly changed. Especially, since the gain and phase of the power supply apparatus are optimized based on various parameters, the precision of the voltage control can be improved. Furthermore, since the digital error is averaged, the ripple of an output voltage is reduced. In addition, since the switching frequency is changed depending on the operating state of a load, the switching loss indicated when the output current is weak becomes small.

What is claimed is:

1. A power supply apparatus comprising:
a power supply circuit for generating DC output based on a pulse signal;
conversion means for converting a parameter relating to output of said power supply circuit into digital data;
amplification means for amplifying a difference between the digital data obtained by said conversion means and a reference value;
adjustment means for adjusting a characteristic of said amplification means based on an input voltage of said power supply circuit; and
generation means for generating a pulse signal to be provided for said power supply circuit based on the output of said amplification means.

2. A power supply apparatus comprising:
a power supply circuit for generating DC output based on a pulse signal;
conversion means for converting a parameter relating to output of said power supply circuit into digital data;
amplification means for amplifying a difference between the digital data obtained by said conversion means and a reference value;
adjustment means for adjusting a characteristic of said amplification means based on an output current of said power supply circuit; and
generation means for generating a pulse signal to be provided for said power supply circuit based on the output of said amplification means.

3. A power supply apparatus comprising:
a power supply circuit for generating DC output based on a pulse signal;
conversion means for converting a parameter relating to output of said power supply circuit into digital data;
amplification means for amplifying a difference between the digital data obtained by said conversion means and a reference value;
adjustment means for adjusting a characteristic of said amplification means based on a temperature around said power supply circuit; and
generation means for generating a pulse signal to be provided for said power supply circuit based on the output of said amplification means.

4. A power supply apparatus comprising:
a power supply circuit for setting a plurality of values for an output voltage to be maintained, and generating DC output based on a pulse signal;
conversion means for converting the output voltage of said power supply circuit into digital data;
amplification means for amplifying a difference between the digital data obtained by said conversion means and a reference value;
adjustment means for adjusting a characteristic of said amplification means based on an output voltage of said power supply circuit; and
generation means for generating a pulse signal to be provided for said power supply circuit based on the output of said amplification means.

5. The power supply apparatus according to claim 1, wherein
said amplification means is a digital filter.

6. A power supply apparatus comprising:
a power supply circuit for generating DC output based on a pulse signal;
conversion means for converting a parameter relating to output of said power supply circuit into digital data;
amplification means for amplifying a difference between the digital data obtained by said conversion means and a reference value;
adjustment means for adjusting a characteristic of said amplification means based on an input voltage of said power supply circuit, an output current of said power supply circuit, and a temperature around said power supply circuit; and generation means for generating a pulse signal to be provided for said power supply circuit based on the output of said amplification means.

7. A method of controlling an output voltage of a power supply circuit for generating DC output based on a pulse signal, comprising the steps of:

converting a parameter relating to output of the power supply circuit into digital data;

amplifying a difference between the digital data and a reference value using a digital filter through which a characteristic is adjusted based on an input voltage of the power supply circuit; and generating a pulse signal to be provided for the power supply circuit based on output of the digital filter.

8. A method of controlling an output voltage of a power supply circuit for generating DC output based on a pulse signal, comprising the steps of:

converting a parameter relating to output of the power supply circuit into digital data;

amplifying a difference between the digital data and a reference value using a digital filter through which a characteristic is adjusted based on an output current of the power supply circuit; and generating a pulse signal to be provided for the power supply circuit based on output of the digital filter.

9. A method of controlling an output voltage of a power supply circuit for generating DC output based on a pulse signal, comprising the steps of:

converting a parameter relating to output of the power supply circuit into digital data;

amplifying a difference between the digital data and a reference value using a digital filter through which a characteristic is adjusted based on a temperature around the power supply circuit; and generating a pulse signal to be provided for the power supply circuit based on output of the digital filter.

10. A method of controlling an output voltage of a power supply circuit for setting a plurality of values for an output voltage to be maintained and generating DC output based on a pulse signal, comprising:

converting a parameter relating to output of the power supply circuit into digital data;

amplifying a difference between the digital data and a reference value using a digital filter through which a characteristic is adjusted based on an output voltage of the power supply circuit; and generating a pulse signal to be provided for the power supply circuit based on output of the digital filter.

11. A power supply apparatus comprising:

a power supply circuit for generating DC output based on a pulse signal;

detection means for detecting an operating state of a load connected to the power supply circuit;

sampling means for sampling a parameter used for control of the output of the power supply circuit;

conversion means for converting the parameter sampled by said sampling means into digital data;

amplification means for amplifying a difference between the digital data obtained by said conversion means and a reference value;

adjustment means for adjusting a characteristic of said amplification means according to a detection result from said detection means; and generation means for generating a pulse signal to be provided for the power supply circuit based on the output of said amplification means.

12. A power supply apparatus comprising:

a power supply circuit for generating DC output based on a pulse signal;

detection means for detecting an operating state of a load connected to the power supply circuit;

sampling means for sampling a parameter used for control of the output of the power supply circuit;

adjustment means for adjusting a sampling cycle performed by said sampling means according to a detection result from said detection means;

conversion means for converting the parameter sampled by said sampling means into digital data; and generation means for generating a pulse signal to be provided for the power supply circuit based on the digital data obtained from said conversion means.

13. The power supply apparatus according to claim 12, wherein:

said generation means has a configuration with which digital data can be obtained from said conversion means in a polling process; and said adjustment means adjusts a cycle of the polling process according to the detection result from said detection means.

14. A power supply apparatus having a power supply circuit which has a smoothing coil and whose DC output is controlled based on a pulse signal; comprising:

conversion means for converting a parameter relating to the output of the power supply circuit into digital data;

adjustment means for adjusting a cycle of the pulse signal based on an output current or a coil current of the power supply circuit; and generation means for generating a pulse signal to be provided for the power supply circuit based on the digital data obtained by said conversion means and the pulse cycle adjusted by said adjustment means.

15. The power supply apparatus according to claim 14, wherein inductance of said smoothing coil can be changed according to an electric current.

16. A power supply apparatus having a power supply circuit which has a smoothing coil and whose DC output is controlled based on a pulse signal; comprising:

detection means for detecting an operating state of a load connected to the power supply circuit;

adjustment means for adjusting a cycle of the pulse signal based on a detection result from said detection means;

conversion means for converting a parameter relating to the output of the power supply circuit into digital data;

generation means for generating a pulse signal to be provided for the power supply circuit based on the digital data obtained by said conversion means and the pulse cycle adjusted by said adjustment means, wherein inductance of said smoothing coil can be changed according to an electric current.

17. A power supply apparatus having a power supply circuit which has a set of switching elements and whose DC output is controlled based on a pulse signal provided for the set of switching elements, comprising:

conversion means for converting a parameter relating to the output of the power supply circuit into digital data;

generation means for generating a pulse signal to be provided for the set of switching elements based on the digital data obtained from said conversion means; and adjustment means for adjusting a dead-off time of the pulse signal based on at least one of an input voltage of the power supply circuit, an output current of the power supply circuit, and a temperature around the power supply circuit.

18. A method of controlling an output voltage of a power supply circuit for generating DC output based on a pulse signal, comprising the steps of:

detecting a state of a load connected to the power supply circuit;

sampling a parameter for use in controlling the output of the power supply circuit;

adjusting a cycle of the sampling based on the state of the load;

converting the sampled parameter into digital data;

amplifying a difference between the digital data and a reference value using a digital filter;

adjusting a characteristic of the digital filter based on a state of the load; and generating a pulse signal to be provided for the power supply circuit based on the amplified data.

19. A method of controlling an output voltage of a power supply circuit which has a smoothing coil and whose DC output is controlled based on a pulse signal, comprising the steps of:

converting a parameter relating to output of the power supply circuit into digital data;

determining a cycle of the pulse signal based on an output current or a coil current of the power supply circuit; and generating a pulse signal to be provided for the power supply circuit based on the digital data and the determined cycle of the pulse signal.

* * * * *